(12) United States Patent
Chiou et al.

(10) Patent No.: US 12,229,390 B2
(45) Date of Patent: Feb. 18, 2025

(54) DETECTING KEYBOARD ACCESSIBILITY ISSUES IN WEB APPLICATIONS

(71) Applicant: University of Southern California, Los Angeles, CA (US)

(72) Inventors: Paul Chiou, Los Angeles, CA (US); Ali Alotaibi, Los Angeles, CA (US); William Halfond, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 18/425,743

(22) Filed: Jan. 29, 2024

(65) Prior Publication Data

US 2024/0192837 A1  Jun. 13, 2024

Related U.S. Application Data

(63) Continuation-in-part of application No. 17/891,695, filed on Aug. 19, 2022, now Pat. No. 11,886,648.

(60) Provisional application No. 63/235,559, filed on Aug. 20, 2021.

(51) Int. Cl.
  *G06F 3/0484* (2022.01)
  *G06F 3/023* (2006.01)
  *G06F 16/957* (2019.01)

(52) U.S. Cl.
  CPC .......... *G06F 3/0484* (2013.01); *G06F 3/023* (2013.01); *G06F 16/9577* (2019.01)

(58) Field of Classification Search
  CPC ..... G06F 3/0484; G06F 3/023; G06F 16/9577
  See application file for complete search history.

(56) References Cited

U.S. PATENT DOCUMENTS

| | | | |
|---|---|---|---|
| 6,249,812 B1 * | 6/2001 | Cromer | H04L 41/0681 |
| | | | 714/26 |
| 2006/0139312 A1 * | 6/2006 | Sinclair, II | G06F 3/0481 |
| | | | 345/156 |

* cited by examiner

*Primary Examiner* — Jared M Bibbee
(74) *Attorney, Agent, or Firm* — NIXON PEABODY LLP

(57) ABSTRACT

A method for detecting and/or localizing keyboard accessibility failures (KAFs) in a web page is disclosed. A document object model of a web page is read. A keyboard navigation flow model is generated from the document object model of the web page based on interactions of a user with the web page. The model includes states representing user interfaces displayed by the web page, nodes representing keyboard inputs in the states, and edges representing transitions that occur in the web page between the nodes. KAFs are detected based on an analysis of the keyboard navigation flow model. A report of the detected one or more KAFs on the web page is produced. The KAFs include unintuitive navigation failures, reflow related failures, and dialog related failures.

20 Claims, 16 Drawing Sheets

Figure 3: An overview of our approach

FIG. 4

Algorithm 1 Inaccessible Functionality Detection

Input:     $PCNFG*$: Mouse navigation model
Input:     $KNFG*$: Keyboard navigation model
Output:    True or False 1: $V_{IF} \leftarrow \emptyset, V_{NA} \leftarrow \emptyset$
2: $V_{PC} \leftarrow getReachableNodes(v_{user}, PCNFG*)$
3: for $v_{pc} \in V_{PC}$ do
4:     $v_k \leftarrow correspondingNodeInKNFG(v_{pc}, KNFG*)$
5:     if $\neg isReachable(v_0 \rightarrow v_k, KNFG*)$ then
6:         $V_{IF} \leftarrow V_{IF} \cup \{v_k\}$
7:     if $\neg \exists e \in outEdges(v_k) \land e.\delta == True$ then
8:         $V_{NA} \leftarrow V_{NA} \cup \{v_k\}$
9: return $(V_{IF} \cup V_{NA}) \neq \emptyset$

FIG. 5

Algorithm 2 Inaccessible Functionality Localization

Input:     $PCNFG*$: Mouse navigation model
Input:     $KNFG*$: Keyboard navigation model
Output:    Ranked list of suspicious edges 1: $E \leftarrow \emptyset$
2: for each $PCNFG \in PCNFG*$ do
3:     $KNFGState \leftarrow correspondingState(PCNFG)$
4:     if $KNFGState \in KNFG*$ then         ▷ /* Intra-state */
5:         $V_{PC} \leftarrow getReachableNodes(v_{user}, PCNFG)$
6:         $V_K \leftarrow correspondingNodesInKNFG(V_{PC})$
7:         $V_S \leftarrow getReachableNodes(v_0, KNFG)$
8:         $V_{KAF} \leftarrow V_K - V_S$
9:         for each $v_{kaf} \in V_{KAF}$ do
10:             $V_T \leftarrow backwardReachability(v_{kaf})$
11:             /* Assign suspiciousness scores for nodes in $V_S$ */
12:             for all $v_s \in V_S$ do $resetScore(v_s)$
13:             for all $v_t \in V_T$ do
14:                 for all $v_s \in V_S$ do $score(v_s) \mathrel{-}= distance(v_s, v_t)$
15:             /* Assign suspiciousness scores for nodes in $V_T$ */
16:             for all $v_t \in V_T$ do $score(v_t) = -rank(v_t, V_T)$
17:             for each $(v_s, v_t) \in V_S \times V_T$ do
18:                 $score((v_s, v_t)) \leftarrow score(E.(v_s, v_t)) + score(v_s) + score(v_t)$
19:                 $E \leftarrow E \cup addEdge((v_s, v_t))$
20:     else         ▷ /* Inter-state */
21:         $e \leftarrow getStateTransitionEdge(PCNFG)$
22:         $E \leftarrow E \cup addEdge(e, 0)$
23: return edges in $E$ sorted by score of each edge

FIG. 6

Algorithm 3 Keyboard Trap Detection

Input:   KNFG*: Keyboard navigation model
Output:  True or False

1: for each $KNFG \in KNFG*$ do
2:    $KNFG_{TAB} \leftarrow$ getEdgeInducedSubgraph($KNFG$)
3:    $KNFG_{SHIFTTAB} \leftarrow$ getEdgeInducedSubgraph($KNFG$)
4:    for each $KNFG_{TAB}$ and $KNFG_{SHIFTTAB}$ as $G$ do
5:       $G$.removeEdges($v_n \leftrightarrow v_0$)
6:       if $G$ contains a cycle then return True
7: return False

FIG. 7

Algorithm 4 Keyboard Trap Localization

Input:   KNFG*: Keyboard navigation model
Output:  Ranked list of suspicious edges 1: $E \leftarrow \varnothing$
2: for each $KNFG \in KNFG*$ do
3:    $KNFG_{TAB} \leftarrow$ getEdgeInducedSubgraph($KNFG$)
4:    $KNFG_{SHIFTTAB} \leftarrow$ getEdgeInducedSubgraph($KNFG$)
5:    for each $KNFG_{TAB}$ and $KNFG_{SHIFTTAB}$ as $G$ do
6:       $G$.removeEdges($v_n \leftrightarrow v_0$)
7:       $E_{bridge} \leftarrow$ Tarjan($G$)
8:       $G$.removeEdges($E_{bridge}$)
9:       for all $v \in G$ where degree($v$) = 0 do $G$.removeNode($v$)
10:      for each $V_{comp} \in G$ do
11:         for $edge \in V_{comp}$ do
12:            $E \leftarrow E \cup edge$
13:            score($edge$) += 1
14:         if $G$.instanceOf($KNFG_{TAB}$) then
15:            $e_{back} \leftarrow$ getEdge(min(rank($V_{comp}$)), max(rank($V_{comp}$)))
16:         else if $G$.instanceOf($KNFG_{SHIFTTAB}$) then
17:            $e_{back} \leftarrow$ getEdge(max(rank($V_{comp}$)), min(rank($V_{comp}$)))
18:         $E \leftarrow E \cup e_{back}$
19:         score($e_{back}$) += 1
20: return edges in $E$ sorted by score of each edge

800

| Tool | Inaccessible Functionality Failure | | | | | Keyboard Trap Failure | | | | | Run time(Minutes) |
|---|---|---|---|---|---|---|---|---|---|---|---|
| | DEP(%) | DER(%) | LOR(%) | #MEF | #AEF | DEP(%) | DER(%) | LOR(%) | #MEF | #AEF | Average |
| KAFE | 92 | 100 | 94 | 5 | 8.8 | 99 | 100 | 89 | 1 | 4 | 19.22 |
| aria-check | 68 | 100 | n/a | n/a | n/a | 0 | 0 | n/a | n/a | n/a | 0.03 |
| tabindex-counter | 93 | 39 | n/a | n/a | n/a | 0 | 0 | n/a | n/a | n/a | 0.03 |
| QualWeb | 83 | 27 | 6 | 6.9 | 12.4 | 0 | 0 | 0 | n/a | n/a | 2 |
| WAVE | 68 | 70 | 16 | 8.3 | 18.5 | 0 | 0 | 0 | n/a | n/a | 0.1 |

Table 1: Detection, localization, and timing results for each evaluated approach.

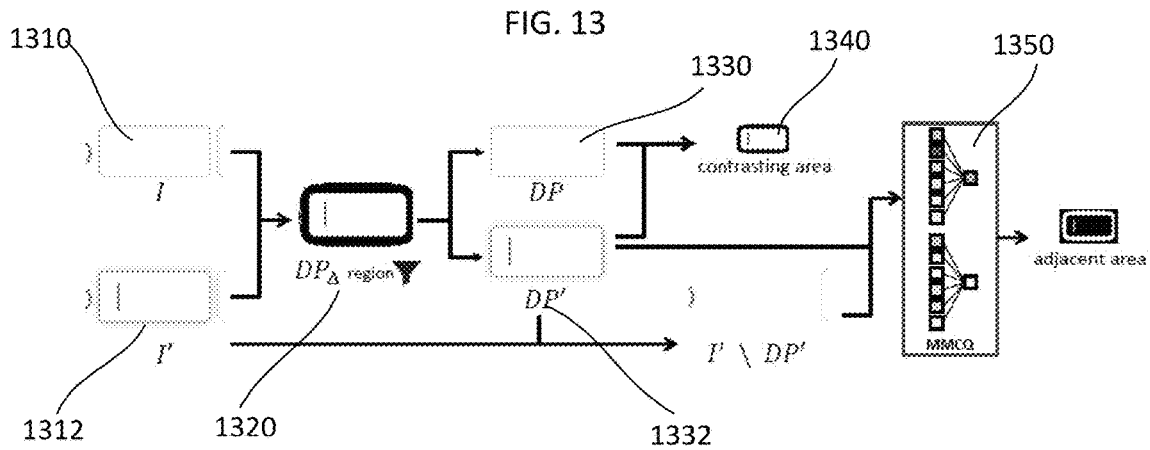

FIG. 14A

Table 1: Results of KNF detection accuracy for all tools (RQ1) and their average run-time per subject (RQ2).

| Tool | Unintuitive-Nav-Order Precision | Recall | Change-Of-Context Precision | Recall | Unapparent-Focus Precision | Recall | Run-time (min:sec) |
|---|---|---|---|---|---|---|---|
| BAGEL | 85% | 100% | 83% | 83% | 97% | 92% | 07:32 |
| Axe DevTools Pro | 49% | 42% | 0% | 0% | 0% | 0% | 00:10 |
| QualWeb | 57% | 80% | 0% | 0% | 0% | 0% | 00:23 |
| WAVE | 60% | 47% | 100% | 50% | 0% | 0% | 00:03 |
| Tenon Check | 0% | 0% | 0% | 0% | 0% | 0% | 00:19 |
| ARC Toolkit | 50% | 42% | 0% | 0% | 0% | 0% | 00:05 |

FIG. 14B

Table 2: Results of BAGEL's KNF detection accuracy (RQ1) and run-time (RQ2) detailed for each subject web page. The "n/a" represents that the precision/recall does not apply (usually due to the web page not including the specific type of KNF).

| Subject | Unintuitive-Nav-Order Precision | Recall | Change-Of-Context Precision | Recall | Unapparent-Focus Precision | Recall | Run-time (min:sec) |
|---|---|---|---|---|---|---|---|
| alibaba | 100% | 100% | 0% | 0% | 100% | 100% | 11:12 |
| arxiv | 100% | 100% | n/a | n/a | 100% | 94% | 04:21 |
| dickssportinggoods | 67% | 100% | n/a | n/a | 100% | 75% | 03:52 |
| disneyworld | 100% | 100% | n/a | n/a | 94% | 94% | 05:56 |
| engadget | n/a | n/a | n/a | n/a | 95% | 100% | 08:12 |
| experian | 100% | 100% | n/a | n/a | 100% | 100% | 03:18 |
| github | 100% | 100% | n/a | n/a | 100% | 100% | 03:02 |
| leagueoflegends | n/a | n/a | 100% | 100% | 100% | 89% | 03:23 |
| lenovo | n/a | n/a | 100% | 100% | 100% | 86% | 39:08 |
| mozilla | n/a | n/a | 100% | 100% | 100% | 77% | 12:26 |
| papajohns | 0% | 0% | 100% | 100% | 100% | 100% | 11:22 |
| researchgate | 100% | 100% | n/a | n/a | 94% | 100% | 03:49 |
| robinhood | n/a | n/a | n/a | n/a | 100% | 100% | 01:53 |
| samsclub | 56% | 100% | n/a | n/a | 67% | 100% | 03:40 |
| theguardian | n/a | n/a | n/a | n/a | 100% | 91% | 03:56 |
| ticketon | n/a | n/a | n/a | n/a | 100% | 89% | 04:19 |
| trello | n/a | n/a | 100% | 100% | 100% | 100% | 06:54 |
| woot | 100% | 100% | n/a | n/a | 89% | 89% | 03:10 |
| wsj | n/a | n/a | n/a | n/a | 98% | 100% | 10:11 |
| yelp | n/a | n/a | n/a | n/a | 100% | 81% | 06:34 |

*The URLs are for reference only. Experiments were conducted on the cached version of the subject web pages.

FIG. 18

```
Algorithm 1 Our Approach
Input:     Page Under Test (PUT),
Output:    F: Set of unavailable functionalities under reflow
 1: Initialize F ← ∅
 2: G ← construct UIIM model at full-size rendering of the PUT        ▷ /* Section 3.1 */
 3: G' ← construct UIIM model at reflow rendering of the PUT          ▷ /* Section 3.1 */
 4: F_G = F(G)                                                         ▷ /* Section 3.2 */
 5: F_G' = F(G')                                                       ▷ /* Section 3.2 */
 6: for all f_G ∈ F_G do
 7:     if ¬ isKeyboardAccessible(f_G) then continue;                  ▷ /* Section 3.3.2 */
 8:     isFuncInReflowAndAccessible ← False
 9:     for all f_G' ∈ F_G' do
10:         if S(f_G, f_G') ∧ isKeyboardAccessible(f_G') then          ▷ /* Equation (3), Section 3.3.2 */
11:             isFuncInReflowAndAccessible ← True
12:     if ¬ isFuncInReflowAndAccessible then
13:         add f_G to F
14: return F
15:
16: procedure F(G)
17:     V_G ← ∅                                                        ▷ /* Set of unique interactive elements of the PUT */
18:     for all q ∈ G do
19:         for all v ∈ q.V do
20:             V_G ← V_G ∪ v
21:     V_simSet ← ∅                                                   ▷ /* Set of set of similar interactive elements of the PUT */
22:     for all v_a ∈ V_G do
23:         isExist ← False
24:         for all V_sim ∈ V_simSet do
25:             for each v_b ∈ V_sim do
26:                 if S(v_a, v_b) then isExist ← True                  ▷ /* Equation (3) */
27:         if ¬ isExist then
28:             V_new-sim ← ∅ ∪ v_a
29:             V_simSet ← V_simSet ∪ V_new-sim
30:         else
31:             V_exist-sim ← the set of interactive elements where similarity was found
32:             V_exist-sim ← V_exist-sim ∪ v_a
33:     F ← ∅                                                          ▷ /* Set of UI functionalities of the PUT */
34:     for all f ∈ V_simSet do
35:         F ← F ∪ f
36:     return F
37:
38: procedure isKeyboardAccessible(f)
39:     V_sim ← the set of similar interactive elements of f
40:     Initialize isAccessible ← False
41:     for all v ∈ V_sim do
42:         v_0 ← the initial node in q.V where v resides
43:         if isReachable(v_0 → v) then                               ▷ /* Check for keyboard focusability */
44:             E ← the set of outgoing edges from v
45:             for all e ∈ E do
46:                 if e.φ = Enter ∨ e.φ = Space then                  ▷ /* Check for keyboard actionability */
47:                     if e.β then isAccessible ← True
48:     return isAccessible
```

Table 1: Approaches' RAF Detection Accuracy

|  | SALAD | ReDeCheck | KAFE | WAVE | Qualweb |
|---|---|---|---|---|---|
| Precision | 85% | 18% | 1% | 0.2% | 0% |
| Recall | 94% | 4% | 0.6% | 0.2% | 0% |

Table 2: Approaches' Runtime Performance (mm:ss)

|  |  | SALAD | ReDeCheck | KAFE | WAVE | Qualweb |
|---|---|---|---|---|---|---|
| Modeling | Avg. | 60:04 | n/a | 38.23 | n/a | n/a |
|  | Mdn. | 27:43 | n/a | 17:05 | n/a | n/a |
| Detection | Avg. | 02:51 | 02:22 | 00:01 | 00:01 | 00:02 |
|  | Mdn. | 02:39 | 00:50 | 00:01 | 00:01 | 00:02 |

FIG. 22

Algorithm 1 Detecting Focus Non-Initialization KDFs

Input:     $KDFG$: Keyboard navigation model
Output:   $F_{init-in}, F_{init-out}$: Sets of dialogs with non-init-in and non-init-out KDFs 1: $F_{init-in} = \varnothing$
2: $F_{init-out} = \varnothing$
3: $E_{inter-state} \leftarrow$ inter-state edges $e$ in $KDFG$ where $p(e.v_s).V \neq p(e.v_t).V$
4: $E_{init-in} = \{e \mid e \in E_{inter-state} \wedge |D(p(e.v_s))| < |D(p(e.v_t))|\}$
5: $E_{init-out} = \{e \mid e \in E_{inter-state} \wedge |D(p(e.v_t))| < |D(p(e.v_s))|\}$
6: for all edge $e_{in}$ of the form $(v_s, \phi, v_t) \in E_{init-in}$ do
7:     $d \leftarrow D(p(e_{in}.v_t)) \setminus D(p(e_{in}.v_s))$     ▷ /* the inserted dialog */
8:     $V_d \leftarrow d.nodes$
9:     /* check if focus is in the dialog */
10:    if $e_{in}.v_t$ is not in $V_d$ then
11:       /* check if advancing the focus puts focus in the dialog */
12:       if $e_{in}.v_t$ has no out edge with $\phi = \boxed{\text{Tab}}$ whose target node is in $V_d$ then
13:          add $d$ to $F_{init-in}$
14: for all edge $e_{out}$ of the form $(v_s, \phi, v_t) \in E_{init-out}$ do
15:     $e_\phi \leftarrow$ the $e_{in}$ edge that originally inserted the dialog that is dismissed by $e_{out}$
16:     $d \leftarrow D(p(e_\phi.v_t)) \setminus D(p(e_\phi.v_s))$     ▷ /* the dialog that is dismissed */
17:     $v_\phi \leftarrow e_\phi.v_s$
18:     /* check if focus is on the trigger */
19:    if $e_{out}.v_t$ is not $v_\phi$ then
20:       /* check if advancing the focus backward puts focus on the trigger */
21:       if $e_{out}.v_t$ has no out edge with $\phi = \boxed{\text{Shift}}\text{-}\boxed{\text{Tab}}$ whose target is $v_\phi$ then
22:          add $d$ to $F_{init-out}$

FIG. 23

Algorithm 2 Detecting Focus Non-Containment KDFs

Input:     $KDFG$: Keyboard navigation model
Output:   $F_{contain}$: Set of dialogs that contain non-containment KDFs 1: $F_{contain} = \varnothing$
2: $E_{inter-state} \leftarrow$ inter-state edges $e$ in $KDFG$ where $p(e.v_s).V \neq p(e.v_t).V$
3: $E_{init-in} = \{e \mid e \in E_{inter-state} \wedge |D(p(e.v_s))| < |D(p(e.v_t))|\}$
4: for all edge $e$ of the form $(v_s, \phi, v_t) \in E_{init-in}$ do
5:     $d \leftarrow D(p(e.v_t)) \setminus D(p(e.v_s))$     ▷ /* the inserted dialog */
6:     if $d.backdrop$ is not empty then
7:       $V_d \leftarrow d.nodes$
8:       $\overline{V_d} \leftarrow p(e.v_t).V \setminus V_d$
9:       /* check the modal dialog state for crossing edges */
10:      for all edge $e_{inState}$ of the form $(v_s, \phi, v_t) \in p(e.v_t).E$ do
11:          if $p(e_{inState}.v_s) = p(e_{inState}.v_t)$ then
12:             if $e_{inState}.v_s \in V_d \wedge e_{inState}.v_t \in \overline{V_d}$ then add $d$ to $F_{contain}$

FIG. 24

Algorithm 3 Detecting Non-Dismissable KDFs

Input: $KDFG$: Keyboard navigation model
Output: $F_{dismiss}$: Set of dialogs that contain non-dismissable KDFs 1: $F_{dismiss} = \emptyset$
2: $E_{inter\text{-}state} \leftarrow$ inter-state edges $e$ in $KDFG$ where $p(e.v_a).V \neq p(e.v_t).V$
3: $E_{init\text{-}in} = \{e \mid e \in E_{inter\text{-}state} \wedge |D(p(e.v_a))| < |D(p(e.v_t))|\}$
4: for all edge $e$ of the form $(v_a, \phi, v_t) \in E_{init\text{-}in}$ do
5:     $d \leftarrow D(p(e.v_t)) \setminus D(p(e.v_a))$    ▷ /* the dialog under test */
6:     $v_{d0} \leftarrow e.v_t$
7:     $V_{reachable} \leftarrow$ nodes reachable from $v_{d0}$
8:     $isDismissFailure = \texttt{true}$
9:     for all node $v_{reachable} \in V_{reachable}$ do
10:        if $v_{reachable}$ is in a state $g.V$ and $d \notin D(g)$ then
11:            $isDismissFailure = \texttt{false}$
12:     if $isDismissFailure$ then add $d$ to $F_{dismiss}$

FIG. 25

TABLE I: Results for KDF detection accuracy (RQ2) and run time (RQ3).

| Tool | Non-Init-In | | Non-Init-Out | | Non-Containment | | Non-Dismissable | | Run-time | |
|---|---|---|---|---|---|---|---|---|---|---|
| | P | R | P | R | P | R | P | R | Model Building | Detection |
| LOTUS (auto) | 71% | 89% | 71% | 77% | 70% | 90% | 40% | 83% | 26:41 | 00:02 |
| LOTUS (perfect) | 85% | 94% | 71% | 87% | 90% | 93% | 63% | 83% | 26:41 | 00:02 |
| Axe (trigger only) | 17% | 10% | 0% | 0% | 59% | 36% | 0% | 0% | n/a | 01:30 |
| Axe (full manual) | 45% | 70% | 0% | 0% | 59% | 64% | 0% | 0% | n/a | 03:00 |

DETECTING KEYBOARD ACCESSIBILITY ISSUES IN WEB APPLICATIONS

PRIORITY CLAIM

This application is a continuation in part of U.S. application Ser. No. 17/891,695, filed on Aug. 19, 2022, now U.S. Pat. No. 11,886,648 issued on Jan. 30, 2024, which claims priority and the benefit of U.S. Provisional Application No. 63/235,559 filed on Aug. 20, 2021.

STATEMENT REGARDING FEDERALLY SPONSORED RESEARCH OR DEVELOPMENT

This invention was made with government support under Grant No. 2009045 awarded by the National Science Foundation. The government has certain rights in the invention.

TECHNICAL FIELD

The present disclosure relates to detecting flaws in web page user interfaces to promote web accessibility.

BACKGROUND

The following description includes information that may be useful in understanding the present invention. It is not an admission that any of the information provided herein is prior art or relevant to the presently claimed invention, or that any publication specifically or implicitly referenced is prior art.

The Web is fundamentally designed to work for "all people" yet, 15% of the world's population possesses some type of disability that can hinder their ability to use the Web. For them, access to web applications is particularly important as the Web provides connections to services and information that might otherwise be unavailable. Despite legislation that mandates companies to provide equally accessible websites, web accessibility issues are widespread. As of 2019, 70% of internet sites contained "accessibility blockers" that made critical functionality inaccessible to disabled users, resulting in considerable disadvantages for people with disabilities.

Users with disabilities are often unable to use a traditional point-and-click or touch-operated device and must use other mechanisms to interact with web applications. For example, users with disabilities may employ Assistive Technology (AT), such as screen readers, speech-based controllers, and switch devices. Since the keyboard is the most universally supported alternative input method operable by people with disabilities, most AT generate emulated keystrokes to navigate a web application's User Interface (UI). Unfortunately, keyboard accessibility is one of the most common and prevalent accessibility issues. Studies show that as many as 48% of popular websites lack keyboard accessible mechanisms and 4% contain accessibility bugs that make the keyboard completely unusable. The manifestation of these issues are referred to herein as Keyboard Accessibility Failures (KAFs), which include failures that prevent the user from interacting with the web app's UI features using the keyboard.

Testing for KAFs is challenging due to the highly complex nature of client-side UIs in modern web applications. These UIs provide responsive and dynamic interfaces that are highly mutable and contain content that can be dynamically created and binded with JavaScript. This poses several challenges: First, the static HTML source code may not resemble the Document Object Model (DOM) with which end-users actually interact, making traditional static analysis on HTML source code inadequate. Second, the keyboard interaction governed by the event-driven execution environment may be constantly changing as the web application enters different UI states. This makes it necessary to identify a web application's possible behaviors, beyond simply a one-time "snapshot." Finally, the JavaScript code responsible for event handlers and their interactions can be difficult to analyze using static analysis, which makes it difficult to statically model keyboard handling in a UI. Together, these challenges can make it very difficult to adequately test for keyboard accessibility issues.

There are several disadvantages with previous testing approaches for identification of KAFs. As one example, existing techniques for identifying keyboard inaccessibility issues have limitations in their usage and applicability. For example. Fona statically analyzes a web page's DOM content to identify KAFs. However, Fona only analyzes specific attributes of DOM elements and does not completely capture all the different ways KAFs can be introduced into a web page. Other approaches, such as Pyccuracy and aria-check allow developers to write or use scenario based tests to check keyboard accessibility requirements. However, these techniques require developers to employ manually generated test cases for each of their pages and anticipate the problems that may occur. As a result, keyboard accessibility testing largely remains a manual effort that requires visual inspections of a web page, which makes it a time consuming, costly, and error-prone process.

Further, Guideliner is a tool that assesses web UI element conformance to a predefined set of usability guidelines. It focuses on visual characteristics of web UIs, such as the position of elements on the screen, the distance between the elements, and the length of scrolling. VizAssert uses formal verification methods to attempt detection and repair on inaccessible layout properties. Both approaches focus on accessibility relating to layout properties and are not capable of interacting with the page under test (PUT) to expose KAFs.

AXERAY is an automated approach that infers semantic groupings of elements across various regions of a web page to test if these elements violate their WAI-ARIA roles' semantic structure. Research work verifies ARIA specifications on dynamic content and UI components to detect interactive accessibility issues. Although ARIA is useful in providing custom attributes via the browser's Accessibility API, it alone does not ensure these interactable control elements are properly scripted to be accessible. Past work evaluates various dynamic UI elements that can cause AT accessibility issues. They characterize complex custom widgets and navigation elements such as drop-down menus, tab widgets, menu popups, date picker, slideshows and Carousels widgets to ensure they behave according to accessibility standards. Although useful for inspiring best practices for implementing IAF conformance, these ad-hoc approaches cannot be generalized to handle keyboard on a more diverse scale.

Many techniques focus on mobile accessibility issues and their conformance measures based on violations, and particularly toward developed accessibility checkers to identify and categorize the identified issues. While the majority of this research is related to mobile accessibility failure detection, some research focuses on repairing these failures as well as other deep learning based repair. Latte is another technique that automatically executes use cases using assistive services to detect accessibility failures. However, these approaches only work on Android applications, not web based applications.

SUMMARY

In order to at least partially address some of the above-mentioned disadvantages, the present disclosure is directed toward systems and methods for automatically detecting and localizing KAFs in web pages. In one example, a method for detecting keyboard accessibility failures (KAFs) is disclosed. A document object model of a web page is read. A keyboard navigation flow model from the document object model of the web page based on interactions of a user with the web page is generated via a processor of a computing system. The keyboard navigation flow model includes states representing user interfaces displayed by the web page, nodes representing keyboard inputs in the states, and edges representing transitions that occur in the web page between the nodes. KAFs are detected based on an analysis of the keyboard navigation flow model. A report of the detected KAFs on the web page is produced.

In another implementation of the disclosed example method, the example method includes bezel modifying the document object model of the web page to eliminate the detected one or more KAFs. In another implementation, the KAFs include an unintuitive navigation failure. In another implementation, the unintuitive navigation failure is a navigation order failure. The example method also includes clustering visual user interface elements of the web page from the keyboard navigation flow model by corresponding similar functions in functional sets. The example method also includes determining whether there are more than one incoming edge entering each of the functional sets to indicate the navigation order failure. In another implementation, the unintuitive navigation failure is a change of context failure. The example method further determines an outgoing edge from a node whose corresponding action is a non-activation action. In another implementation, the unintuitive navigation failure is an unapparent keyboard focus failure. The method further includes capturing a screenshot of a focus indicator of a node in a focused state and capturing a screenshot of the focus indicator in an unfocused state. A contrast area of the screenshots of the focus indicator is compared to determine the contrast ratio between the focused and unfocused states. The unapparent keyboard focus failure is determined based on the contrast ratio. In another implementation, the example method further includes determining whether the contrast area satisfies a minimal area. In another implementation, the example method further includes determining surrounding colors of the contrast area of the screenshots of the focus indicator to determine the contrast ratio of the surrounding colors between the focused and unfocused states. The unapparent keyboard focus failure is determined based on the contrast ratio of the surrounding colors. In another implementation, the example method includes determining whether the focus indicator is not obscured by content. In another implementation, the KAFs include a responsive accessibility failure from a reflow version of the web page. In another implementation, the keyboard navigation flow model is generated from a full size of the web page and the example method includes generating a keyboard navigation flow model of a reflow version of the web page. In another implementation, the example method includes executing all possible keyboard operations on the web page from the models. It is determined whether a change of state occurs for the keyboard operations. Functionalities are compared to determine which are available via the keyboard for the full size web page and not available in the reflow web page from the models to determine the responsive accessibility failure. In another implementation, the one or more KAFs include a dialog related failure. In another implementation, the example method includes mapping sets of dialogs contained in each interface from the keyboard navigation flow model. Dialog is identified from the sets of dialog and elements in an identified interface that change property are identified. In another implementation, the dialog related failure is a non-initialization-in dialog. The example method further includes determining a dialog appears in a user interface in the model. It is determined whether a focus after the dialog appears is not on a node inside the dialog. It is determined whether the focus is not on the dialog after advancing from the node. In another implementation, the dialog related failure is a non-initialization-out dialog. The example method further includes determining if a dialog is dismissed in the user interface in the model. It is determined whether a focus does not return to a trigger node of the dialog. It is determined whether if an element is in focus after the dialog is dismissed. In another implementation, the dialog related failure is a non-containment dialog. The example method further includes determining whether a modal dialog exists in the model. It is determined whether navigation takes a focus from a node within the modal dialog to a node outside of the modal dialog. In another implementation, the dialog related failure is a non-dismissible dialog. The example method further includes determining whether there is an existing dialog; and determining if the existing dialog can be dismissed by determining whether navigation is possible away from the dialog display.

Another disclosed example is a system for detecting and/or localizing a keyboard accessibility failure (KAF). The system includes a control system having one or more processors and at least one non-transitory memory. The system includes a keyboard. The control system is configured to execute the machine executable code stored in the non-transitory memory to cause the control system to read a document object model of a web page. The control system generates a keyboard navigation flow model from the document object model of the web page based on interactions of a user with the web page. The keyboard navigation flow model includes states representing user interfaces displayed by the web page, nodes representing keyboard inputs in the states, and edges representing transitions that occur in the web page between the nodes. The control system detects one or more KAFs based on an analysis of the keyboard navigation flow model. The control system produces a report of the detected one or more KAFs on the web page.

Another disclosed example is a non-transitory machine readable medium having stored thereon instructions for performing a method comprising machine executable code which when executed by at least one machine, causes the machine to read a document object model of a web page. The instructions cause the machine to generate a keyboard navigation flow model from the document object model of the web page based on interactions of a user with the web page. The keyboard navigation flow model includes states representing user interfaces displayed by the web page, nodes representing keyboard inputs in the states, and edges representing transitions that occur in the web page between the nodes. The instructions cause the machine to detect one or more keyboard access failures (KAF)s based on an analysis of the keyboard navigation flow model. The instructions cause the machine to produce a report of the detected one or more KAFs on the web page.

BRIEF DESCRIPTION OF DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings:

FIG. 4 is an example inaccessible functionality detection algorithm, according to one or more embodiments of the present disclosure;

FIG. 5 is an example edge localization algorithm, according to one or more embodiments of the present disclosure;

FIG. 6 is an example keyboard trap detection algorithm, according to one or more embodiments of the present disclosure;

FIG. 7 is an example keyboard trap localization algorithm, according to one or more embodiments of the present disclosure;

FIG. 13 is a process diagram of analyzing keyboard focus, according to one or more embodiments of the present disclosure;

FIG. 14A is a table of the results of a tool incorporating the example unapparent navigation failure detection method, according to one or more embodiments of the present disclosure compared to known tools;

FIG. 14B is a table of the specific web page results of detected failures from the example tool, according to one or more embodiments of the present disclosure;

FIG. 18 is an algorithm for detection of reflow based accessibility failures, according to one or more embodiments of the present disclosure;

FIG. 22 is an example non-initialization in or out dialog failure detection algorithm, according to one or more embodiments of the present disclosure;

FIG. 23 is an example non-containment dialog failure detection algorithm, according to one or more embodiments of the present disclosure;

FIG. 24 is an example non-dismissible dialog failure detection algorithm, according to one or more embodiments of the present disclosure; and FIG. 25 is a table of accuracy and speed results for an example LOTUS tool incorporating the example method, according to one or more embodiments of the present disclosure.

DETAILED DESCRIPTION

Figure 1A:
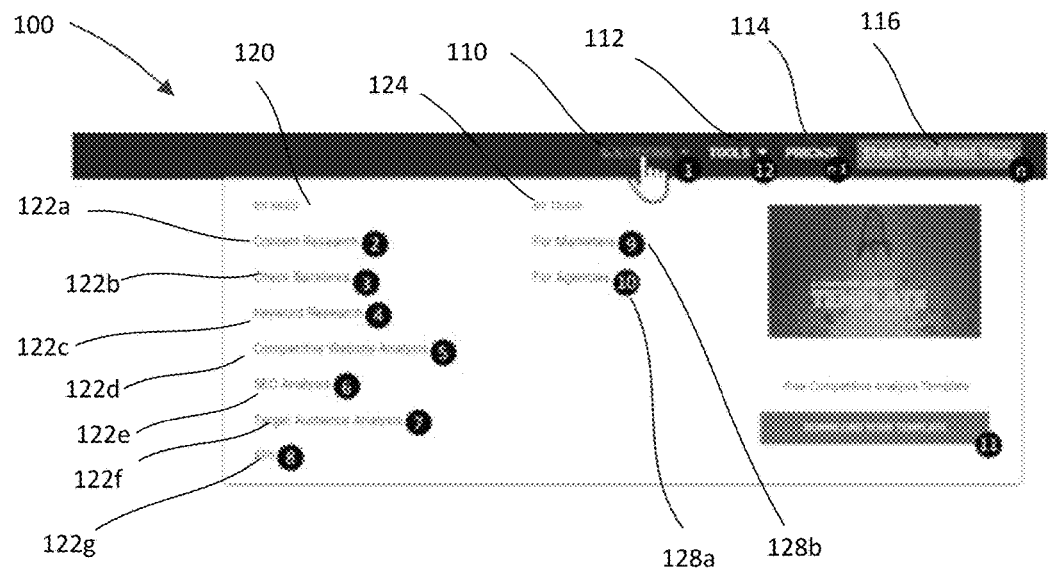
FIG. 1A shows an example prior art web page user interface including one or more Keyboard Accessibility Failures (KAFs)

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described. For example, the Figures primarily illustrate the present invention in the gastrointestinal tract, but as indicated throughout, the disclosed systems and methods can be used for other applications.

In some embodiments, properties such as dimensions, shapes, relative positions, and so forth, used to describe and claim certain embodiments of the invention are to be understood as being modified by the term "about."

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The keyboard is the most universally supported input method operable by people with disabilities. Yet, many popular websites lack keyboard accessible mechanism, which could cause failures that make the website unusable. The present disclosure is directed toward a method and system for automatically detecting and localizing keyboard accessibility failures in web applications. Evaluation of the example process on real world web pages demonstrates that the example process detects keyboard failures in web applications with high precision and recall and was able to accurately identify the underlying elements in the web pages that led to the observed problems.

Keyboard usage is one of the foundational requirements for web accessibility and it is reflected in Guideline 2.1 of the W3C Web Accessibility Initiative (WAI)'s Web Content Accessibility Guideline (WCAG) 2.1. These guidelines require web UIs to be usable by the many users that operate the computer solely with a keyboard-based input device. Keyboard-based users utilize a set of standard keyboard commands to navigate to different items of interest in web applications and carry out a desired action.

Point-and-click based users and keyboard based users interact with a web page's UI elements in a very different manner. In the point-and-click (PNC) modality, users move a cursor using a pointing device (e.g., mouse) and press buttons to activate a UI element underneath the cursor. In the keyboard modality, users must press keyboard buttons, such as "Tab" and "Shift" plus "Tab", to move the browser's focus to a UI element that the user wants to interact with. Unlike the PNC modality, moving between UI elements with a keyboard happens sequentially; meaning that if a user is currently on element n and wants to interact with element n+i, then the user must press the "Tab" key i times until focus is on the desired element. The user may also press "Shift" key and "Tab" key simultaneously to move backwards through the elements. The ordering of the elements is determined by the browser based on the structure of the DOM, but may be overridden by a developer using JavaScript or HTML attributes, such as tabindex. Herein, the ordering of the elements in this sequence is termed the keyboard navigation flow of the web page's UI. Once an element has focus, a keyboard user can carry out actions on it by pressing other keyboard buttons. For example, when the focus is moved onto a group of elements, such as menu lists or radio-buttons, the arrow keys ↑ ↓ ↓ → can be used to move between the elements of the group. The "Space" or "Enter" keys are used to manipulate the element currently in focus and the "Esc" key is typically used to exit a user prompt or dialog. All web browsers are required by the W3C's User Agent Accessibility Guidelines to support this standard set of keyboard strokes through their keyboard API.

Although Keyboard Accessibility Failures (KAFs) can refer to a wide range of keyboard related accessibility issues. Herein, the term Keyboard Accessibility Failures (KAFs) in this disclosure to specifically refer to two common types of KAFs that impact the keyboard navigation flow of a web page's UI. These are: (1) Inaccessible Functionalities (IAFs) and (2) Keyboard Traps (KTFs), which are formally defined under WCAG Success Criteria (SC) sections 2.1.1 and 2.1.2.

Inaccessible Functionalities

SC 2.1.1 requires all functionality of a web page to be available via the keyboard interface. The term Inaccessible Functionality (IAF) is used to describe failures of a web page UI to conform with this guideline. This type of KAF occurs when an interactive element is not included in the keyboard navigation flow of the UI or an element in the navigation flow does not have a keyboard event handler. This means that a keyboard based user is either unable to use the standard keyboard navigation keys to put focus on one or more elements in the page's UI or that the element is not actionable and the user is unable to activate the UI element's functionality. There are many root causes of this type of failure, which we discuss in depth below, but most relate to custom control elements that do not have event handlers properly defined.

An example of inaccessible functionality occurs in the header navigation menu of an example web page for search engine optimization (SEO) services. A screen image 100 of the website is shown in FIG. 1A. The website in the screen image 100 includes a solutions menu item 110, a tools menu item 112, a pricing menu item 114, and a promotion (start your own free trial) item 116. A by need area 120 includes a series of different links 122a, 122b, 122c. 122d, 122e, 122f and 122g. A by team area 124 includes a marketers link 126a and a for agencies link 126b. A download template link 130 is provided for a competitive analysis template. In the website 100, the "solutions" menu item 110 and the "tools" menu item 112 expand respective sub-menu items when the mouse cursor is hovered over them. These menu items are implemented with <div> elements that have the :hover CSS pseudo-class defined in the web page's static CSS declarations to make them interactable. Since the expansion of the sub-menus are only triggered with mouse hover, the contained links 122a-122g, 128a-128b, and 130 are not accessible to keyboard-based users, resulting in a situation where none of the sub-menu items 122a-122g, 128a-128b, and 130 can be seen by a keyboard based user.

Keyboard Traps

SC 2.1.2 requires that if keyboard focus can be moved to a UI element of the page using the keyboard interface, then focus must also be able to move away from that element using only the keyboard interface. The term Keyboard Trap (KTF) is used to describe failures of a web page UI to conform with this guideline. This type of KAF occurs when focus becomes "stuck" on a sequence of one or more interactive elements and the user is unable to interact further with other parts of the web page via the keyboard. As with the first type of KAF, there are many possible root causes for this kind of KAF, which we discuss in depth in Section below, but the most common is the use of third-party widget plugins that once receiving focus, prevented the user from returning to content outside of the plug-in via the keyboard.

Figure 1B:
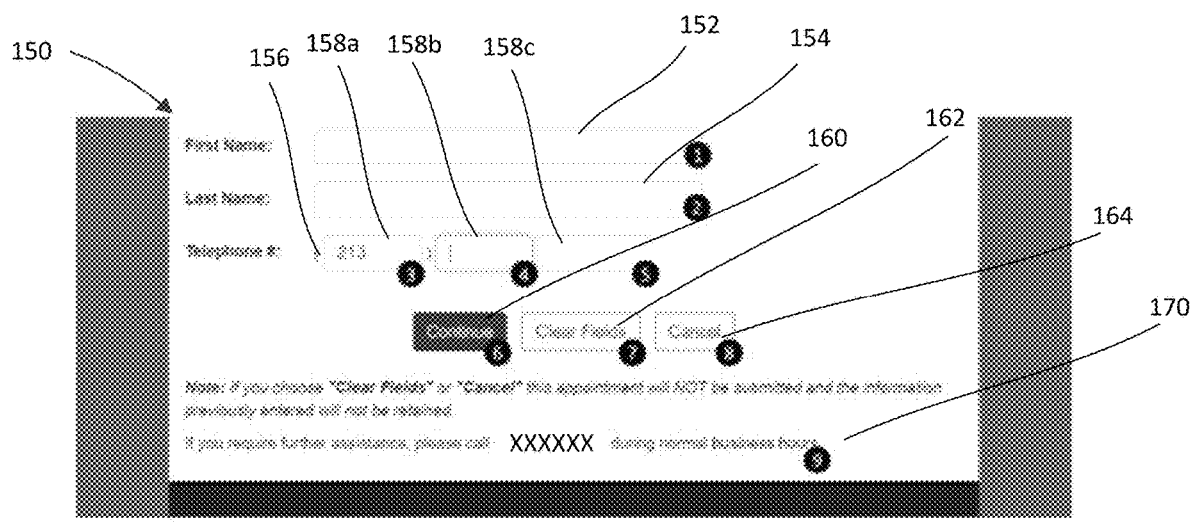
FIG. 1B shows another example prior art web page user interface including one or more KAFs.

FIG. 1B a screen image 150 of an example of another keyboard accessibility failure (KTF) in an example registration web page. The example registration page 150 is an organization's appointment registration page. The web page shown in the 150 includes a series of fill in fields including a first name field 152, a last name field 154, and a telephone field 156. The telephone field 156 has three input fields, an area code input field 158a, and two other input fields 158b and 158c. Three control buttons are provided such as a continue button 160, a clear fields button 162, and a cancel button 164. Various instructions 170 are shown.

In this example, a user has filled in the area code input field 158a and thus is advanced to the next input field 158b. A trap occurs because a user may not return to the code input field 158a from the input field 158b. A trap may also occur because a user may not return to the code input field 158b from the input field 158c. These traps are caused by JavaScript that auto advanced the keyboard cursor when the user typed part of a phone number. When three numbers were entered into an area code input field 158a, developer-defined JavaScript code automatically advanced the cursor to put focus on a next input field 158b. Consequently, a keyboard user is not able to make a correction to the area code by moving backwards, since on each attempt to shift focus to the area code input box would cause the JavaScript to again advance focus to the next input field 158b. In fact, any interactive element prior to the trap such as the first name field 152, the last name field 154 or the area code filed 158a is no longer accessible to the keyboard user after entering an area code.

Web Application Modeling

To perform the detection and localization of KAFs on a web page, the example process first builds models of the ways users can interact via keyboard and point-and-click with a Page Under Test (PUT). The first model is a Keyboard Navigation Flow Graph (KNFG), which models the different ways a keyboard user can interact with a page under test. The second model is a Point-Click Navigation Flow Graph (PCNFG), which represents the ways a point-and-click user can interact with a web page's UI and is similar to existing representations, such as the state flow graph. The graph-based approach allows generalization of the problem domain across different web application.

Modeling Keyboard Navigation Flow

To model keyboard navigation flow of a web page, a Keyboard Navigation Flow Graph (KNFG) is defined. A keyboard navigation flow of a page under test is represented by a set of KNFGs. Each KNFG represents the ways a web page's UI can be navigated from the perspective of a keyboard (KB) user. Formally, a KNFG is represented as a tuple (V, $V_s$, $v_0$, $\Phi_K$, E), where V is the set of all nodes in the graph and each $v \in V$ corresponds to a unique HTML element in the page under test, $V_s \subseteq V$ represents a state of the page under test, which is defined as the set of HTML elements that are visible in the page under test, $v_0 \in V$ is the entry node of the graph (i.e., the first HTML element that keyboard-based users can interact with when the page under test renders in the browser): ØK is the set of standard keyboard-based actions that may cause a focus transition between nodes in the graph; and E is the set of directed edges that represent the transitions that can occur in the page under test.

The node set of a KNFG, comprises a node for each HTML element in the page under test. The example process identifies the nodes by rendering the page under test in a browser and then analyzing the DOM of the page under test to identify each unique HTML element. Each node is uniquely identified by its XPath in the DOM. Syntactically linked nodes such as a<label> and its bounded form element and elements wrapped within other inline control elements are grouped, since these nodes are intended to represent a single functionality. A node $v_0 \in V$ represents the entry node of the graph and is the HTML element in the page that is the starting point for keyboard based navigation of the page. An initial 0 node of a page under test can be identified by determining the XPath of the element that initially has focus after the page renders in the browser.

The inclusion of state ($V_s$) in the KNFG enables modeling modern web applications where new HTML elements may be enabled or added to a page under test. $V_s$ is defined as the subset of all nodes in the page under test that are visible in the browser. This definition is well-suited for this problem domain, since only visible elements can be interacted with via the keyboard and any change in the set of visible elements may introduce a new navigation flow.

Figure 2A:
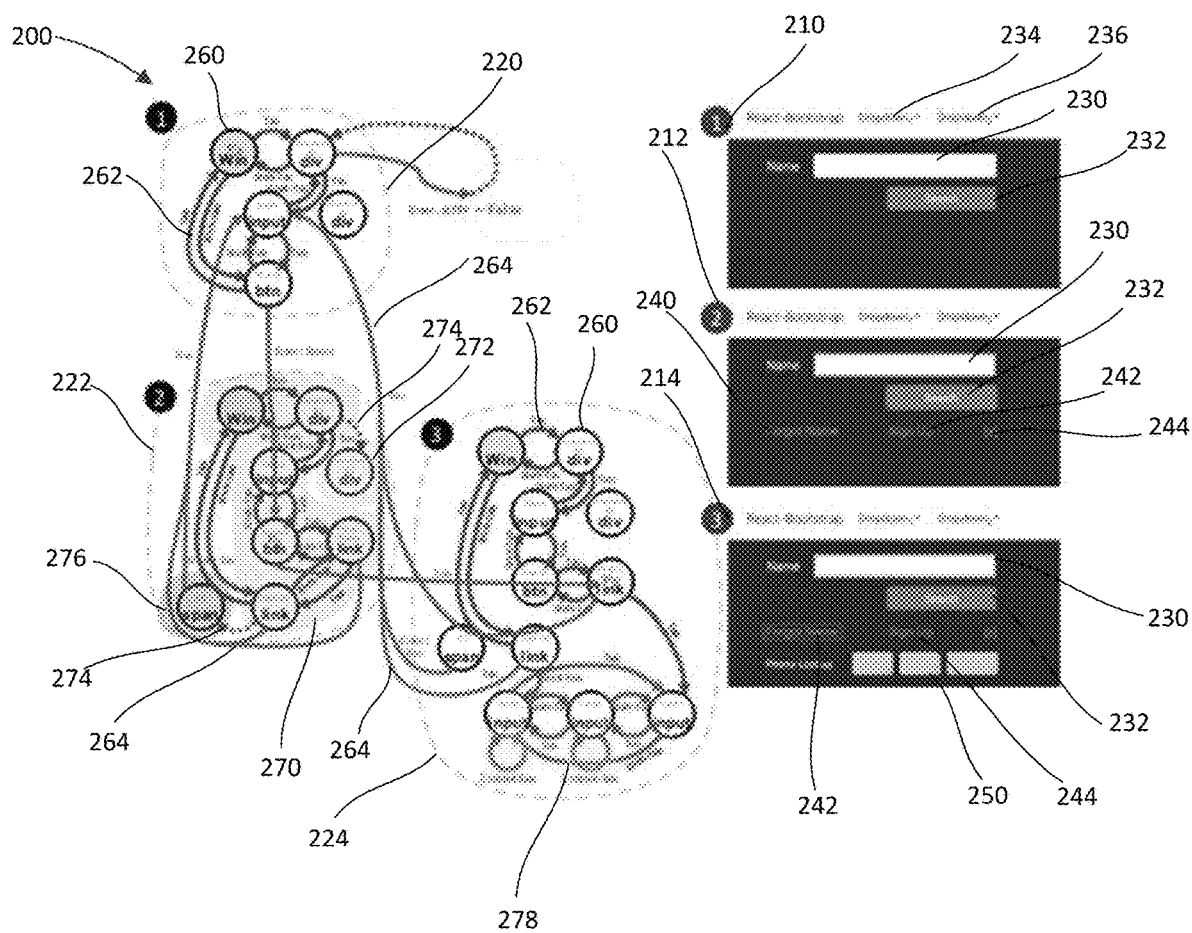
FIG. 2A shows an example keyboard navigation flow graph (KNFG) of a web page, according to one or more embodiments of the present disclosure.

An example of the example process may be shown in relation to an example page under test web page shown as different images 210, 212, and 214 that may be displayed from user navigation via keyboard in a keyboard navigation flow graph 200 as shown in FIG. 2A. The page under test is also shown in a point-click navigation flow graph 202 in FIG. 2B that includes two other images 216 and 218 that may be displayed via point-click navigation of the web page. Each of the images 210, 212, 214, 216, and 218 in FIGS. 2A-2B have a corresponding state map 220, 222, 224, 226, and 228 that determine the logic for navigating and displaying different fields and links in each of the different images 210, 212, 214, 216, and 218.

Figure 2B:
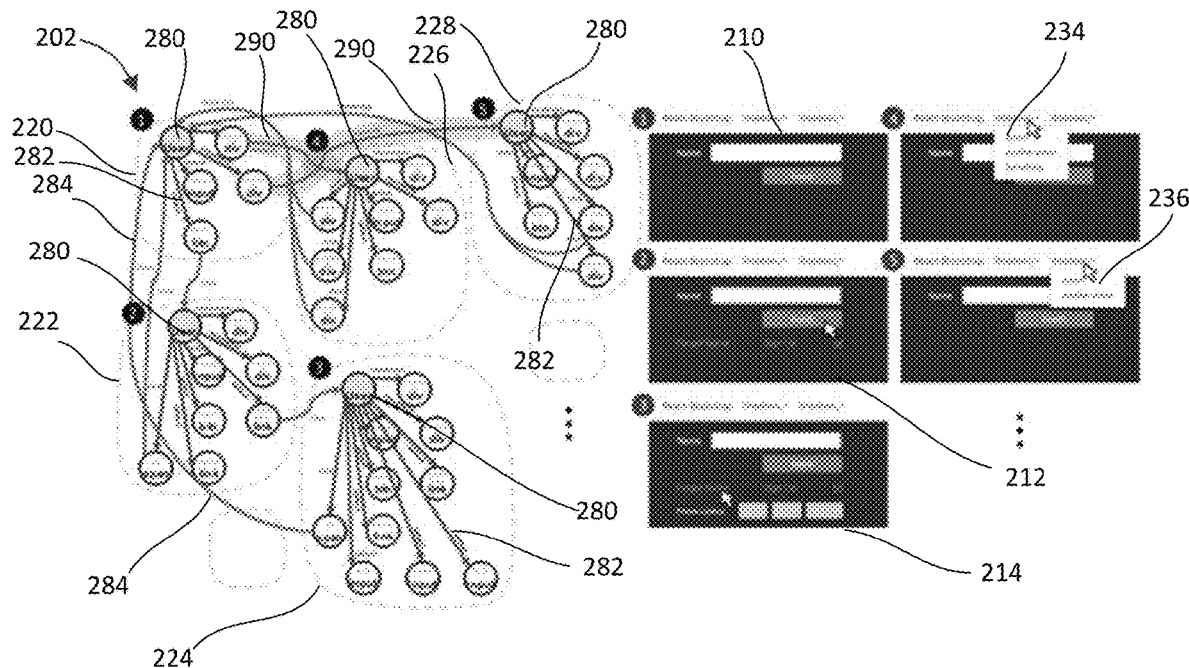
FIG. 2B shows an example point-click navigation flow graph (PCNFG) of the web page, according to one or more embodiments of the present disclosure.

The web page displays the first image 210 that includes a name input field 230 and a search button 232. Two menu dropdowns 234 and 236 may be activated in two other states 226 and 228 as shown in FIG. 2B in images 216 and 218. Links such as a forgot name link 240, a sign up link 242 and a close link 244 may be shown based on different buttons being activated. A phone number entry field 250 may also be shown based on activating the forget name link 240. The close link 244 closes the forgot name link 240, sign up link 242, and phone entry field 250 and thus returns to the first image 210.

The keyboard navigation flow graph 200 in FIG. 2A shows the example web page broken into the three states 220, 222, and 224 that reflect the keyboard inputs. Each of the states, such as the state 220 includes a series of nodes 260 that represent HTML elements such as <Win>, <div>, <input>, <btn>, and <span>. Each of the nodes 260 represents an interactive element in the UI, denoted by the type of the element. For example, the two <div> nodes correspond to the dropdown menu elements 234 and 236, which are implemented using <div> type elements. Likewise, the <input> node corresponds to the name text input, and the <btn> element corresponds to the search button. The <Win> node is a special node that is not an actual element in the UI. Instead, it represents the browser window in which the user can TAB through to circle back to the beginning of the web page (from TAB the end of the page) and vice versa. Navigation between nodes 260 within a state may be joined by intra-state edges represented by lines 262. Inter-state edges are transitions between states and may be shown through lines 264. Each of the edges represents a keyboard entry such as Tab that may allow movement between nodes.

The point-click navigation flow graph 202 in FIG. 2B shows the example web page broken into the five states 220, 222, 224, 226 and 228 that represent point and click navigation. Each of the states, such as the state 220 includes a series of nodes 280 that represent HTML elements such as <Win>, <div>, <input>, <btn>, and <span>. As will be explained, the point-click navigation flow graph 202 in FIG. 2B also includes special input node representing an entry node. Navigation between nodes 280 within a state may be joined by intra-state edges represented by lines 282. The lines 282 represent that the focus can be programmatically put onto any element via point-and-click devices such as the mouse. Inter-state edges are transitions between states and may be shown through lines 284. Each of the edges represents a keyboard entry such as Tab that may move between nodes.

To illustrate the example process, in FIG. 2A, a hidden <div> component is the phone look up entry fields 250 in the image 214 that is not displayed until the user tabs to the "Forgot Name" link 240. The focus event triggers and expands the hidden <div>, displaying the encompassed three "Phone Lookup" text fields 250. The example process considers the images 210, 212, and 214 to be distinct states 220, 222, and 224, since the additional displayed links in the images 212 and 214 will define a new navigation flow through the page under test. Identifying the HTML elements that comprise $V_s$ is challenging because due to the complex interactions between HTML and CSS attributes, there is no canonical way to determine if a given node 260 is visible. Therefore, a set of heuristics are complied that the example process uses to determine if an element is visible. These are three types of elements. First, non-disabled elements that do not exhibit a final computed DOM layout style of type="hidden", visibility:hidden, display:none, or inherit their ancestor's rendered hidden properties. Second, elements that are not rendered with a height or width of zero pixels. Third, elements that are excluded from the visual flow of the page under test (e.g., elements inside another tab-menu, or inside containers that are collapsed whose contents aren't shown). All of these heuristics can be identified by analyzing the attributes of the elements in the DOM of the page under test when it has been rendered in the browser.

A keyboard user can manipulate interactive elements of a web page using a standard set of actions, which are represented by $\Phi_K$. This set of actions includes all standard keyboard commands used to navigate a web application's user interface as defined by W3C and web accessibility testing communities. Keyboard action. $\Phi$'s operations, can be broken into four categories: navigation (Tab, Shift+Tab), selection (↑, ↓, ←, →), actuation (Enter, Space) and dismissal (Esc). The example process does not model keyboard shortcuts or scrolling keys such as PgUp, PgDn, Home, and End since they only change how contents are displayed (or move the keyboard cursor within a text input-based control) and serve no interactive purposes. To trigger navigation behaviors that require text input, two actions are included that represents the entry of text. The first is $\Sigma$ and represents the entry of a random length string of alphanumeric characters. The second is $\Sigma_M$ and represents the entry of a maximum length string into the text input, where maximum length is determined by the maxlength attribute of the text input, if defined. Both text entry actions are followed by the Tab, Shift+Tab, or no action. This simulates the common user behavior of entering input or interacting with a control, and then moving to either the next or prior element in a page. In the text, these sequences are denoted by showing both relevant symbols as the action, even though they can be represented as a single compound action (e.g., entering max length text and then pressing tab would be represented as $\Sigma_M$ Tab). At a high level, the intra-state edges 262 in the example keyboard navigation flow graph 200 in FIG. 2A are identified by iteratively exploring the page using only keyboard based actions (i.e., $\Phi_K$) until no new navigation information is found (i.e., the graph has reached a fixed point). The first iteration of this process begins by interacting with each node $v \in V_s$. For a given v, the process first sets the browser's focus on and then executes every action in $\Phi_K$ on v. After each action, the process analyzes the page to determine the focus transition that occurred. If an action causes a new state to be created, then the new state is added to a worklist of states that will be explored in subsequent iterations of the edge building process. If the action causes the page to attempt to navigate to a different page, the process intercepts this event and prevents it from happening. The process also includes two edges that link the last element in a page's tab order to the first (i.e., $v_n \rightarrow v_0$ and $v_n v \downarrow_0$). This is done in order to exclude browser controls, which are accessible via Tab, from the KNFG. An edge can be either an intra-state or inter-state edge. The details of handling each kind of edge are described below.

Intra-state edges describe the navigation flow in a page as a result of an action on a node when there is no new page state created. After triggering an action $\phi \in \Phi_K$ on a node $v_i$, the process detects the focus change from $v_i$ to $v_{i+1}$ and creates an edge in the graph $(v_i, v_{i+1}, \phi, \delta, V_s)$, indicating that the browser focus could shift from a source node $v_i$ to a target node $v_{i+1}$ by pressing keystroke $\phi$ while $v_i$ is in focus. The process detects a change in focus by querying the browser to identify the element currently receiving focus in the page under test. If an action does not trigger a focus-shift (e.g., executing Space to tick a checkbox), a self edge is created. The edge creation mechanism can capture a shift (or no shift) in focus that is caused by JavaScript event handlers since it simply observes the response of the page to the keyboard action, which would include any JavaScript actions. Lastly, if $\phi$ causes any sort of change in the DOM's attributes' values, then the $\delta$ flag is set to True, otherwise it is set to False. For example, in FIG. 2A, an intra-state edge 262 exists between the "Name" input-field 230 to the "Search" button 232 since focus can transition between the two elements by pressing the Tab and no new visible HTML elements appear (i.e., there is no new state created). This intra-state edge and other intra-state edges 262 for this example are shown in a bold border around the name input field 230 in the images 212 and 214 in FIG. 2A.

Inter-state edges describe the navigation flow in a page when an action on a node leads to the creation of a new UI state. When the example process detects a new state, it creates an edge in the same way that an intra-state edge would be created with the exception of the target node. In this scenario, the target node is in the new state ($V_s'$) and is the node $v_0 \in V_s'$ to which focus is transferred to by the browser. An example of an inter-state edge 264 can be seen in FIG. 2A where pressing Esc on the "Forgot Name" link 240 and "Sign Up" link 242 in the image 212 (when the <div> component containing these links is active) will dismiss the <div> component and return the navigation to the state 220 representing the image 210. This edge and other inter-state edges are represented as edges 264 in FIGS. 2A-2B.

The KNFG construction is sound under the assumption that the keyboard navigation is deterministic (i.e., executing $\phi$ on every node would always transition the focus to the same node and a node has exactly one predecessor/successor through an intra-state edge). In some examples, where non-determinism may occur (an element could transition to different elements), such cases are always accompanied by some kind of visual state change, which would be captured in the KNFG building process. The edge construction is complete because it simulates all of the W3C default set of standardized keyboard navigation keys on each node. Further, the example process described herein could be applied to handle other key set, for example, if a web page were to use non-standard keys for interaction. The node identification is complete, since all nodes in a page can be identified by examining the DOM of the page at runtime.

Modeling Point and Click Navigation

The navigation and interactions available to a PNC user in a page under test are represented by a set of point-click navigation flow graphs (PCNFGs) such as the point-click navigation flow graph 202 in FIG. 2B. Each PCNFG represents the ways a web page user interface can be interacted with from the perspective of a PNC user for a particular state of the user interface of the page under test. Formally, a PCNFG is represented as a tuple $\langle V, V_s, v_{user}, \Phi_M, E \rangle$, where V is the set of all nodes in the graph, $V_s$..V represents the state, which is defined by the set of nodes that are visible in the page under test, $v_{user} \in V$ is the initial node: $\Phi_M$ is the set of mouse event types; and E is the set of edges that represent the mouse navigation control flow.

Information about the nodes in the PCNFG is defined similar to that of the KNFG. Specifically, the node set (V) and state ($V_s$) of the PCNFG are defined and identified in the same way as those for the KNFG. The one exception to this is the definition of the entry node $v_{user}$ of the graph. Unlike the case of keyboard-based navigation, there is not a single node in the page under test that represents the starting point for PNC based navigation. Therefore, a special node $v_{user}$ is defined that conceptually represents the entry to the page under test and connects to all of the nodes that a PNC user can interact with in the page under test.

A PNC based user can manipulate a page's interactive elements using a set of actions, which are represented by $\Phi_M$. This set includes all mouse event types that implement the MouseEvent interface, such as mousedown, mouseup, click, mouseover, mouscenter, mouseleave, or mouseout. The edges 282 and 284 in the PCNFG are defined using a standard iterative crawling exploration similar to the construction of the state flow graph proposed by Crawljax. In the example process, the target elements that will have events triggered on them are represented by $V_s$ and the events to be triggered on them are represented by $\Phi_M$.

Detection and Localization of KAFS

Figure 3:
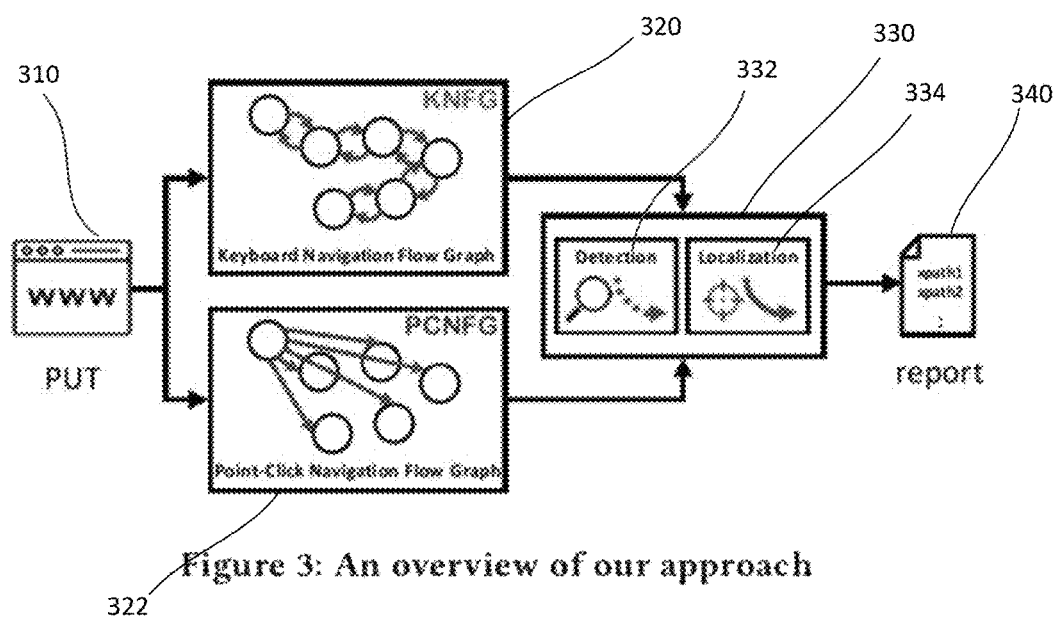
FIG. 3 shows a block diagram illustrating an overview of an example method for detecting and localizing keyboard accessibility failures, according to one or more embodiments of the present disclosure.

The example process detects and localizes Inaccessible Functionalities and Keyboard Traps by analyzing and comparing the KNFGs and PCNFGs generated for the page under test. FIG. 3 shows the workflow of the example process. A web page 310 that rendered in a browser on a display portion of a computing system is input for analysis. The web page 310 is parsed by a keyboard navigation flow graph generator 320 and a point-click navigation flow graph generator 322. The keyboard navigation flow graph generator 320 generates keyboard navigation flow graphs such as that shown in FIG. 2A, while the point-click navigation flow graph generator 322 generates point-click navigation flow graphs such as that shown in FIG. 2B. The resulting analysis process 330 includes a detection process 332 and a localization process 334. The detection process 332 detects different inaccessible functionalities and keyboard traps. The localization process 334 localizes the inaccessible functionalities and the keyboard traps. The result of the example process is a list of faults 340 that causes these inaccessible functionalities and keyboard traps as well as the locations of the inaccessible functionalities and keyboard traps. A revised web page may then be generated by creating and inserting remedies for the list of faults in the code for the web page. The revised web page thus eliminates the KAFs and may be accessed by keyboard users in a more efficient manner.

Detection of Inaccessible Functionalities

An inaccessible functionality occurs when functionality available to a point-and-click (PNC) user is not available to a keyboard (KB) user. At a high level, the example process in FIG. 3 identifies all of the interactive HTML elements available to a PNC user by analyzing the PCNFGs produced by the generator 322 and then, by analyzing the KNFGs produced by the generator 320, checks that the same elements can be navigated to and activated by a KB user.

FIG. 4 shows the algorithm for inaccessible functionality detection that detects Inaccessible Functionalities (IAFs). The inputs to the inaccessible functionality detection algorithm in FIG. 4 are the set of point-click navigation flow graphs and keyboard navigation flow graphs that were previously constructed from the generators 320 and 322 in FIG. 3. These sets of graphs are denoted as PCNFG* and KNFG*, respectively. First, the algorithm in FIG. 4 identifies the functionality (i.e., interactive elements) available to a PNC based user (line 2). This is done by calculating $V_{PC}$ the set of nodes in the PCNFG* that are reachable from $v_{user}$ (i.e., the entry node) of the initial state of the PCNFG*. Next the approach iterates over each node $v_{pc} \in V_{PC}$ and checks if it is also accessible to a KB user (lines 3-8). For each $v_{pc}$, the approach finds the corresponding node ox in the KNFG* (line 4). For a given state, both the PCNFG and KNFG have the same V set, and therefore there will always be a corresponding node if the corresponding KNFG state exists. The first accessibility check (line 5) determines if $v_k$ is reachable from $v_0$ of the KNFG*. If it is not, then this implies a KB user cannot navigate to ox using the keyboard navigation flow defined by the PUT and ox is considered to be inaccessible and added to $V_{IF}$, the set of elements inaccessible due to flow problems (line 6). The second accessibility check (line 7) determines if $v_k$ is actionable. A naive way to detect this would be to simply examine the DOM and determine if $v_k$ has either an explicit or implicit keyboard event handler associated with it. However, a keyboard event handler may be assigned through complex event delegation, which may not be visible via DOM inspection, or $v_k$ may handle some key presses (e.g., Tab and Shift+Tab) that simply change the browser focus without actually activating the element. Therefore, to determine if ox is actionable it is necessary to check in the KNFG whether it has any outgoing edges that modify the DOM state (i.e., δ is set to True). The presence of such an edge indicates that there exists some keyboard action on the element that can be triggered and do something other than transfer focus to another element. WCAG only requires actionable as an accessibility criteria when the element can be triggered by the mouse. This is accounted for in the example process since $v_k$ is the corresponding node of a node already in the PCNFG, and, by definition, a node is only in the PCNFG if it has an associated mouse event handler. Once all nodes in $V_{PC}$ have been analyzed, the detection returns a True/False based on whether any nodes have been identified as inaccessible (line 9). This algorithm can be optimized for page-level detection by returning True the first time any inaccessible element is identified (i.e., at lines 6 and 8).

In the keyboard navigation flow graph 202 from the example in FIG. 2A, the algorithm in FIG. 4 identifies that in state 220, $v_{dropdown2}$ must be accessible via the keyboard because it is reachable in the flow graph 202. However, in the keyboard navigation flow graph 202, it is unreachable from $v_0$ via intra-state flow edges 262, thus putting this node in $V_{IF}$. Similarly for $v_{dropdown1}$, the detection finds it is reachable from $v_0$ but finds there is no outgoing edge with δ=True. Such an edge would exist if its enter edge could have explored state 226 in FIG. 2B. Therefore this node is put into $V_{NA}$.

Localization of Inaccessible Functionalities

When inaccessible functionalities occur, it implies that there is either: (a) an edge missing from the KNFG that would connect the accessible components to the inaccessible components; or (b) an element is missing a required keyboard handler. The localization of elements identified under condition (b) is exactly the set of elements identified as $V_{NA}$ in the inaccessibility detection Algorithm in FIG. 4 and no further localization is needed for those elements. Therefore, the goal of the localization approach for IAFs is to find the missing edges. To do this, the example process analyzes the PCNFG* and KNFG* and assigns a suspiciousness score to various edges that could represent the most likely connection point. At a high-level, the intuition of the example process is to split the localization into two parts. The first part tries to identify the most likely source node of the missing edge and the second part tries to identify the most likely target node of the missing edge. The example process computes suspiciousness scores for each of these two node sets and then presents a ranking of the edges based on the combined suspiciousness of the source and target nodes of the edge. The algorithm for computing suspiciousness of each edge is shown in FIG. 5. The inputs to the edge localization algorithm in FIG. 5 are PCNFG* and KNFG*, as defined above.

The edge localization algorithm in FIG. 5 iterates over each state's PCNFG and checks to see if the state of the PCNFG exists in the KNFG*. Since both types of graphs have the same V set and define their states in the same manner, this check only needs to determine if the $V_s$ for the PCNFG* exists in the KNFG*.

If the state is present in the KNFG*, the approach examines the state to determine if it comprises nodes that are inaccessible to a KB based user. Lines 5-8 of the edge localization algorithm in FIG. 5 compute the set of nodes that are inaccessible for the keyboard user ($V_{KAF}$), using a process similar to that defined in the detection Algorithm in FIG. 4. The example process then iterates over each node $v_{kaf} \in V_{KAF}$ in order to determine the most likely source and target nodes for the missing edge that caused $v_{kaf}$. The possible source nodes are represented as $V_s$, which was already computed as the set of nodes reachable in the KNFG from $v_0$ at line 7 in FIG. 5. Since these nodes are reachable from the entry point, one of them will be the node that represents the source node of the missing edge. Conversely, $V_T$ represents the set of possible missing edge target nodes. The example process computes $V_T$ by finding all of the nodes that can reach to $v_{kaf}$. It may be assumed that the missing edge target node would always be $v_{kaf}$, however it is possible that $v_{kaf}$ may be part of a larger component, which is also inaccessible. In this scenario, these other nodes should also be considered as possible targets. For nodes in $V_T$, line 16 in FIG. 5 computes their suspiciousness score. The intuition of this score is that nodes in $V_T$ represent a subgraph of the KNFG and nodes higher in the topological ordering of this subgraph are most likely the correct target node, since they can themselves connect to the most nodes in the subgraph. Therefore, the algorithm in FIG. 5 rank assigns these nodes a higher suspiciousness. Specifically, the DOM based rank of each of the nodes in $V_T$ is used to assign suspiciousness. A suspiciousness score is also computed for nodes in $V_s$. In lines 13-14 of FIG. 5, the algorithm iterates over each of the nodes in $V_s$ and assigns a suspiciousness score to each of the nodes. The basic idea is that nodes in $V_s$ are considered more likely to be the source node if they are spatially "close" to nodes in $V_T$. "Close" is defined as the DOM tree based distance between the two nodes, which is calculated by the number of edges that must be traversed in the DOM tree for one node to reach another. This definition of closeness represents the design practice that keyboard navigation generally transitions between nodes that have some kind of locality. The approach then takes the Cartesian product of $V_s$ and $V_T$ and assigns the suspiciousness score of the edge ($v_s$, $v_t$) based on the sum of the suspiciousness scores of $v_s$ and $v_t$. The approach resets the node scores for $V_s$ and $V_T$ every time it processes a $v_{kaf}$ so the scores always reflect the suspiciousness with respect to the inaccessible components. The final scores of the edges in E are cumulative across all states (lines 18-19 in FIG. 5).

In the example in FIG. 2A, the localization algorithm in FIG. 5 identifies that in state 222, $v_{dropdown2}$ and $v_{span}$ must be accessible via the keyboard, but since neither node is reachable from v0 in that state, both are in the set $V_{KAF}$. When identifying the edges responsible to connect these nodes, the algorithm first identifies V, as a cluster 270 reachable from $v_0$ and $v_T$ as a cluster 272 where $v_{dropdown2}$ resides. The algorithm then identifies an edge represented by a dashed line 274 as the candidate faulty edge with the highest suspiciousness score due to their proximity in the DOM. This concept also applies to $v_{span}$ in another cluster 276.

If the current PCNFG state does not match a state in the KNFG, then the identification of the missing edge is simplified (line 4 and 21-22 in FIG. 5). Because of the way the example process constructs the KNFG*, a new state in the KNFG* is only defined if there exists some action (an edge) that during the crawling of the current KNFG state transitions the state's $V_s$ to $V_s'$. Thus, if a state exists in the PCNFG* and not in the KNFG*, it indicates: (1) there exists some missing keyboard navigational transition leading to the V' state: and (2) the state transition edge to V' state in the PCNFG* is the edge most likely to be faulty. Line 22 in FIG. 5 classifies the missing state transition edge with the highest possible suspiciousness score of 0.

For example, in the point-click navigation flow graph 202 in FIG. 2B, state 226 and state 228 are explored via mouse-hovering on menu (Dropdown1) 234 and menu (Dropdown2) 236. The algorithm identifies the inter-state edge (represented by area 290) that transition from these nodes to the states 226 and 228 as suspicious edges because these states are not in the keyboard navigation flow graph 200 in FIG. 2A.

Detection of Keyboard Traps

Keyboard Traps cause KB based users to become "stuck" in a sequence of one or more nodes. The navigation flows that cause this to occur are identifiable as cycles in the KNFG. This represents a situation where once a KB user has entered the cycle with either a Tab key or a shift+tab key, they will be unable to navigate away from the elements in the cycle using the keyboard.

The approach to detect Keyboard Traps is a keyboard trap detection Algorithm shown in FIG. 6. The algorithm begins by iterating over each KNFG in the KNFG* (Line 1). For each KNFG, the approach extracts two edge-induced subgraphs, one based on edges labeled with the tab key action and the other one based on edges labeled with the Shift+Tab keys. The two subgraphs are computed by iterating through the edge set E of the KNFG and retaining the subset of edges where $\phi$=Shift+Tab or the Tab key alone. These two subgraphs represent the two ways KB based users are able to navigate among elements and that would be affected by a cycle. Using the edge induced subgraphs enables the approach to avoid false-positives that would be caused by cycles defined by the forward-backward edges created for each node due to the Tab and Shift+Tab navigation and by edges whose actions may not cause a focus shift, such as the ↑, ↓, ←, →, Enter, or Space keys. The approach then iterates over the two subgraphs (Line 4). The approach first removes the specially created edges that link the last element in a page's tab order and the first element (i.e., $v_n \leftrightarrow v_0$) (Line 5). The reason for this removal is that this specially added edge creates a cycle in the KNFG to enable users to cycle from the last node in the tab order to the first, but does not represent a Keyboard Trap. After the edge removal, the process analyzes the subgraph to determine if it comprises a cycle, in which case the approach has identified that a KTF exists in the KNFG (Line 6).

In the state 224 of the keyboard navigation flow graph 200 in FIG. 2A, four cycles represented by an area 278 is detected. The first cycle occurs when the user executes the compound action $\Sigma_M$ on the node Tel #1 and [Shift+Tab] on node Tel #2 (entering the max length of a numeric string in the area code text input (node Tel #1) and then navigating backward using Shift+Tab). The self-cycle is formed on node Tel #2 as a result of the auto-tabbing feature preventing the focus from going backward. Therefore the focus loops back to itself. The second cycle is formed similarly by the auto-tabbing from node Tel #2 to node Tel #3 where the focus is always automatically advanced to node Tel #3 upon filling in Tel #2 and going backward using Shift+Tab. The third cycle puts the focus back to node Tel #1 when navigating forward from node Tel #3 using Tab. Conversely, the fourth cycle puts the focus back to node Tel #3 when navigating backward from node Tel #1 using Shift+Tab. The third and fourth cycles are part of a common feature that contains the keyboard focus within the three telephone number textboxes by looping around them to prevent the user from leaving these components until all three inputs have been filled in.

The two cycles of size 1 formed by edge $\langle v_{tel1}, v_{tel2}, \Sigma_M$ [Shift+Tab], $V_s \rangle$ and $\langle v_{tel3}, v_{tel3}, \Sigma_M$ [Shift+Tab], $V_s \rangle$ are results of the auto-tabbing mechanism. The larger two cycles of size 3 formed by edges $\langle v_{tel1}, v_{tel2}, \text{Tab}, V_s \rangle$, $\langle v_{tel2}, v_{tel3},$ Tab, $V_s \rangle$, $\langle v_{tel3}, v_{tel1},$ Tab, $V_s \rangle$ and $\langle v_{tel1}, v_{tel3},$ Shift+Tab, $V_s \rangle$, $\langle v_{tel3}, v_{tel1},$ Shift+Tab, $V_s \rangle$, $\langle v_{tel2}, v_{tel1},$ Shift+Tab, $V_s \rangle$ are the result of the mechanism that prevents the user from leaving the three telephone boxes in the telephone field 250 unless entries have been filled.

Localization of Keyboard Traps

When a keyboard trap (KTF) occurs it indicates that an edge has been created that should not be present in the navigation. The key insight is that a KTF is caused by an edge that already exists but whose transition to the next node in the navigation flow is incorrect. Therefore, the example process tries to identify which edge in the KNFG is mostly likely to be incorrect. Since there is not a definitive way of identifying this edge, a suspiciousness score based approach is employed that encodes heuristics that we found useful in identifying the likely faulty edge.

The approach for computing suspiciousness of the edges is shown in a keyboard trap localization Algorithm shown in FIG. 7. Lines 2-6 in the algorithm in FIG. 7 employ the same preparatory steps used in the detection algorithm in FIG. 6. Namely, the approach iterates over each KNFG of the page under test, identifies the two edge induced subgraphs in the KNFG, and then removes the edges between v and v0 of each subgraph. Both heuristics employed by the example process focus on the nodes and edges that are part of a cycle (i.e., the detected KTF). Therefore, the next steps of the algorithm (lines 7-9) identify and extract the connected components in the graph. The example process does this by using Tarjan's bridge-finding algorithm to find and remove all bridges (i.e., edges that disconnect a component when removed) in G (lines 7-8). This leaves only connected components in G. Since this set of components may include components of size one with no self-loops, the approach removes these nodes (line 9). These nodes can be safely removed from consideration since, by definition, they cannot be part of a trap (i.e., they do not contain a self-loop and are not part of a larger cycle).

The next part of the algorithm in FIG. 7 (lines 10-19) applies the localization heuristics of the example process. The example process employs two heuristics for localization. The first heuristic is that edges in a connected component are more likely to be a faulty edge than those not in the component. This heuristic is reasonable since typically one of the edges in the component's cycle should actually be directed to a node not in the cycle (i.e., breaking the cycle), and the failure to do so is the cause of the KTF. This heuristic is implemented in lines 11-13 of FIG. 7, which iterate over the edges in the component and increase the suspiciousness score of each of them. The second heuristic focuses on identifying the edge in the cycle that is most likely to represent the back-edge with respect to the page's navigation flow. The key insight to doing this is that the default tab navigation rendered by the browser is determined by a depth first. pre-order traversal of the DOM tree. In most cases, unless scripting was used to alter the tab sequence, the DOM rank determines the keyboard navigation flow. In lines 14-17 of FIG. 7, the example process leverages this information to identify the most suspicious edge within the cycle. Specifically, for the Tab induced subgraph, this edge is the one that flows from the lowest (min) DOM ranked element to the highest (max) DOM ranked element (line 15). For the Shift+Tab induced subgraph, since this goes in the reverse direction, it is the edge that flows from the highest (max) DOM ranked node to the lowest (min) DOM ranked node (line 17). Such a back-edge may not exist if the default sequence of tab navigation is violated. In such extremely uncommon cases, the heuristic would still work, but not as well (i.e., lower the fault's ranking). The back-edge identified by this heuristic has its suspiciousness score increased (line 19). These heuristics are applied for each KNFG and once all of them have been analyzed, the approach returns a list of all edges ranked in order of their score, highest to lowest (line 20).

In the example in FIGS. 2A-2B, the cycle formed across $v_{tel1}$, $v_{tel2}$, and $v_{tel3}$ that prevents the user from leaving the three telephone boxes consists of three edges in either the Tab and Shift+Tab direction. The order of appearance of these three text fields in the DOM sequence would make the edge $\langle v_{tel3}, v_{tel1}, Tab, V_s \rangle$ and $(v_{tel1}, v_{tel3}, Shift+Tab, V_s)$ as the respective "back-edge" that is more suspicious.

Evaluation

To assess the effectiveness of the example process, an empirical evaluation was conducted that focused on three research questions: 1) What is the accuracy of the example process in detecting KAFs in web applications; 2) If a KAF is detected, what is the quality of the localization results provided by the example process; and 3) How much time does the example process need to detect and localize KAFs.

The example process was implemented as an example Java-based prototype tool, Keyboard Accessibility Failure Detector (KAFE). The KAFE implementation employs a crawler-based exploration and is fully automated that requires no manual effort by a user. The implementation uses Selenium Web-Driver to load, render, and interact with the subject web pages to build the KNFG and PCNFG. All web pages were rendered with a fixed screen resolution of 1920×1080 pixels on Firefox version 68.0 controlled by Selenium version 3.141.5. During interaction with a subject web page, the WebDriver API was used to send key presses to the page and monitor the switch in focus. JavaScript-based code was written and executed to detect changes to the subject page and capture the page's DOM for further analysis. The KAFE and all experiments were run on a single AMD Ryzen Threadripper 2990WX 64-bit machine with 64 GB memory and Ubuntu Linux 18.04.4 LTS.

Subject Web Pages/Accessibility Tools

The evaluation was conducted on a set of real-world subject web pages gathered from (1) government and higher education web sites that are required by law to comply with WCAG, (2) frequently visited e-commerce web sites, and (3) sites from the Moz Top 500 most visited websites list. Subjects from these sources were chosen due to their obligation for accessibility by the ADA and their popularity. Manual interaction with each web page's UI was performed and the underlying functional components per keyboard accessibility testing techniques. 40 of those web pages that contained at least one KAF were used for examination by the testing. Overall, the 40 web pages examined contained 168 IAFs and 28 KTFs. For each KAF, the edge(s) were identified that would either enable access to IAFs or remove cycles causing KTFs, while at the same time remaining consistent with the page's pre-existing navigation flow. To help measure the false-positive detection rate in RQ1, 20 subjects were included that did not contain any KAFs. The dynamic UI contents in the subjects comprised of modern HTML5 and custom JavaScript widgets, such as sliders, dropdown menus, calendars, and tooltips components. A complete version of each subject web page was captured using an interactive HTTP proxy.

For the purpose of evaluating the performance of the example process, the results of the process were compared against a set of state-of-the-art tools from two sources: (1) existing web accessibility testing tools described in research literature, and (2) the Web Accessibility Evaluation Tools List provided by the W3C. From the existing web accessibility testing tools, the aria-check, tabindex-counter (the implementation of the Fona approach), and QualWeb were selected because these tools detected failures that at least partially overlapped KAFs. From the Web Accessibly Evaluation Tools list (2), the popular WAVE tool was selected because it had the most complete handling of keyboard accessibility issues of the listed tools.

Protocols

In relation to determining the accuracy of the example technique in detecting KAFs in web applications, the KAFE was run against the subject web pages and measured how accurately it could detect both types of KAFs. In this experiment, the precision and recall of the detection results from the KAFE were measured and compared against the accuracy of existing state-of-the-art approaches. For each subject web page, a detection was considered correct (i.e., a true-positive) if KAFE indicated the page contained a KAF of a type and had previously been determined that the page contained a KAF of that type. False-positives, true-negatives, and false-negatives were calculated in an analogous way.

The four state-of-the-art tools compared against the example process each had their own way of reporting detections. The results of these tools were normalized so they could be compared against the KAFE. QualWeb and WAVE target several different types of accessibility related failures, such as low color contrast and missing alternative texts, therefore they generate many issue reports unrelated to KAFs. For these two tools, reports were considered with any mention of keyboard accessibility issues as a KAF detection for the corresponding web page. The tabindex-counter tool scans and reports a ratio (0 to 1 (100%)) for a web page based on the number of interactive elements that have valid tabindex and ARIA role attributes. Any ratio less than 100% was considered to be a detection for the page. The aria-check tool uses behaviour-based acceptance tests to evaluate a page's dynamic behaviour with respect to accessibility requirements through 23 pre-defined usage scenario test cases. The failure of any of these tests was considered to constitute a detection. For all four tools, the example mechanism for recognizing a detection was consistent with the tool's intended usage and resulted in the most favorable accuracy scores for the tool. The result of accuracy is shown in a table 800 in FIG. 8. The columns DEP' and DER' in the table 800 show each tool's detection precision and recall for each type of KAFs.

In relation to the ability of the KAFE to accurately identify the faulty element(s) responsible for the KAF, the KAFE was compared against only the QualWeb and WAVE tools since the tabindex-counter and aria-check tools do not provide localization information. To measure localization quality, the effort metric frequently used in the fault localization communities was used by calculating the expected number of elements a developer, using the output of each tool, would have to examine to find the fault. This metric reflects an assumption about developers behavior and provides a normalization that allows quantification and relatively comparison of results.

To calculate localization quality of the KAFE for subjects containing only a single KAF, the rank of the faulty edge in the ranked list of edges produced as the output of the localization algorithms was used. For subjects containing multiple failures, the rank of each faulty edge was calculated using a methodology reporting the rank of the first faulty element that appears in the result set, simulates the fix of that fault, and then reruns the localization analysis to get the ranking of the next highest fault. The intuition behind using this methodology is that it approximates the workflow of a developer who scans the results, fixes a fault, and then reruns the analysis to see if any more faults remain.

To calculate the localization quality of the results generated by the QualWeb and WAVE tool, a slightly different process was employed since neither tool ranks the reported HTML elements. Therefore, a methodology approximating average rank was used under the assumption that the faulty element is uniformly distributed in an unordered set. For a single fault, the average rank is, on average, half the size of the unordered set. In the case of multiple faults, this generalizes to a linear search for k number of items (faults) in an unordered set of size n where the distribution of the k items is uniformly random. The equation for calculating this values is $(n+1)/(k+1)$. Lastly, since both tools return a set of HTML elements, as opposed to edges, a localization was considered successful if the tool identified a node corresponding to either the source or target of the faulty edge. In the table 800 in FIG. 8, the column '#LOR' shows the localization recall of each tool, which is the percentage of output sets returned that contained the faulty element in any rank. The columns '#MEF' and '#AEF' show the median and average number of elements needed to be examined to find the KAFs for each tool.

The running time of the four known tools and the example KAFE on each subject web page was measured to determine the time the example process needs to detect and localize KAFs. For the example KAFE, the running time includes the time to start the tool, load the browser, build the models, and compute detection and localization results using the algorithms in FIGS. 4-7. For the other four tools, the running time included the time to run the tool on a subject until the output of the tool was displayed. For the QualWeb tool, this meant the time to submit a subject link for analysis until the result page was displayed. For the WAVE too, the running time included the time from the browser extension was clicked until the results were displayed. For the tabindex-counter and aria-check tools, the running time included the time of loading the page, executing the tool's unit test codes, and displaying the result. The results of running time evaluation are shown in the table 800 in FIG. 8. For each tool, the 'Average' column shows the average running time.

Figures 8, 9A:
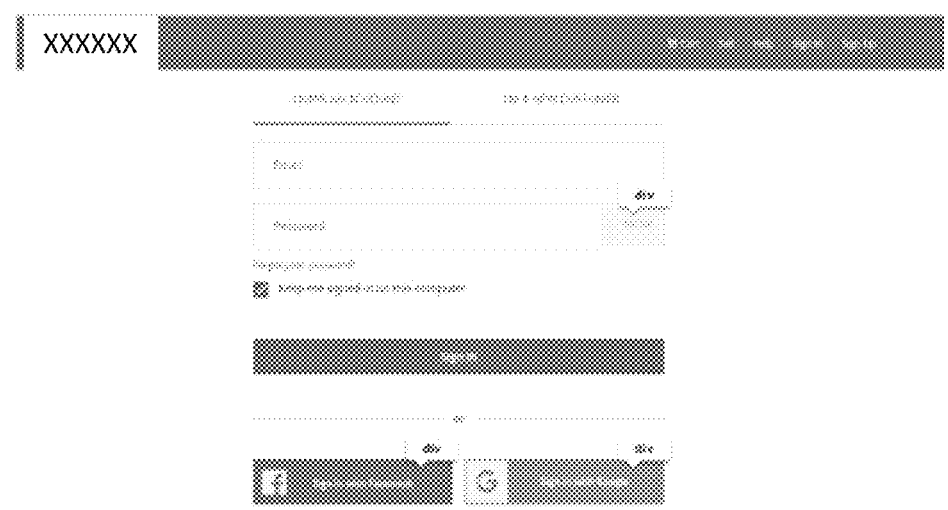
FIG. 8 is a table of the results from testing the example process, according to one or more embodiments of the present disclosure.
FIG. 9A shows an example of a keyboard accessibility failure on a web page, according to one or more embodiments of the present disclosure.

For detecting IAFs, the results in the table 800 in FIG. 8 shows that the example KAFE was able to detect IAFs in the subject applications with high accuracy. In terms of precision, the tabindex-counter tool performed better; however its recall was only 39%. From examining this result, use of the tabindex tool to detect IAFs was a very precise approach but did not detect all of the different ways KAFs could occur. In terms of recall, only the aria-check tool matched the recall of the example KAFE for IAFs. In relation to the aria-check tool, 42 subjects failed all of its 23 test cases and all of the subjects failed at least one of the test cases. This included subjects that we had verified as free of IAFs. This result indicates that failures to conform to ARIA markup structure are not sufficient to indicate the presence of IAFs. Lastly, none of the approaches, except for KAFE, were able to detect any of the KTFs. The keyboard traps were undetectable by the other tools because they focused on examining DOM based properties, but KTFs represent runtime behavior that is undetectable by examining the DOM.

In terms of the quality of the localization, KAFE performed significantly better than the other two approaches. One of the key results that show this is the localization recall (LOR). For IAFs, this metric shows that the HTML elements outputted by QualWeb contained only 6% of the faults and WAVE contained only 15% of the faults. In contrast, KAFE's output contained 94% of the faults. Significantly, the results of median rank (MEF) and average rank (AEF) show that KAFE was able to consistently highly rank the faults. In fact, across all subjects, KAFE ranked the faulty edge in the top three for 35% of the faults, and in top ten for 76% of the faults. For KTFs, the localization quality was also high, but it was not possible to compare against other approaches since none of them could detect (and therefore localize) KTFs.

The runtime of KAFE was slower than the other approaches. However, in absolute terms the average amount of time needed by KAFE, about twenty minutes, is not a significant amount of time. Furthermore, this higher time cost is offset by its much higher precision and recall than the other approaches. The runtime breakdown of each individual step in the example KAFE shows that over 99% of the total time was spent on modeling and building the graphs. The time spent crawling the KNFG* and PCNFG* was evenly split between an average of 9.9 minutes and 9.2 minutes respectively. The average times for detection and localization were 0.8 seconds and 3 seconds respectively. There was no noticeable difference between detecting and localizing IAFs (1.1 seconds) versus KTFs (2.7 seconds).

The impact of the KAFs found in the subject websites was generally quite severe. For IAFs, often core functionalities of the web page were unavailable to keyboard-based users. For example, they would be unable to log in via Google or Facebook's external authentication, unable to retrieve their password, unable to change their language/locality preference, or sometimes unable to use the "Like" Facebook plugin. FIG. 9A shows an example log in a web page 900 that shows an example KAF where the show password button is not focusable and the "Facebook" and "Google" log-in buttons are focusable but not actionable by the keyboard. The impact for KTFs was even more dramatic than IAFs. Users would get stuck when entering data into web forms with auto-tabbing scripts, preventing them from moving backwards to make corrections. This is particularly troublesome for blind users that must move backwards through the fields to verify that they correctly entered the numbers via screen readers. When stuck, they would be forced to refresh the page, or close the browser and risk losing all of the form information entered.

The subject web pages were analyzed to identify root causes of IAFs and several reoccurring patterns were found. (1) Custom UI controls based on <div>, <span>, or <li> where developers would implement mouse event handlers but not keyboard handlers. For example, 37 out of 455 buttons and 22 out of 58 dropdown-lists across our subject pool were inaccessible due to their inability to receive keyboard focus. 34 instances were found where an <a> was used to trigger JavaScript instead of having an "href" attribute. As a result, these elements were not able to receive keyboard focus. There were two instances where the developer explicitly assigned a tabindex of 0 to make a custom widget focusable but yet, without defining any keyboard event handlers, the controls were not actionable. (2) Actions triggered by mouse hovering. Overall, a remarkably high 35 of 49 menus implemented to expand when a mouse hovered over them were inaccessible. Roughly a third of those could not receive focus, and most of the others that could receive focus could not expand via a keyboard action. This problem also appeared when tooltips were implemented using custom mechanisms. (3) Overridden standard control elements. Three were six cases of checkbox/radio-button whose operations were delegated to a programmatically associated <label>. Clicking on the <label> indirectly activated the control. However, for aesthetics, the developers made these control hidden and styled its <label>'s CSS to make it appear to be a custom checkbox/radio-button. These inaccessible implementations assume that users would be able to "click" on the <label> to tick the associated control.

Figure 9B:
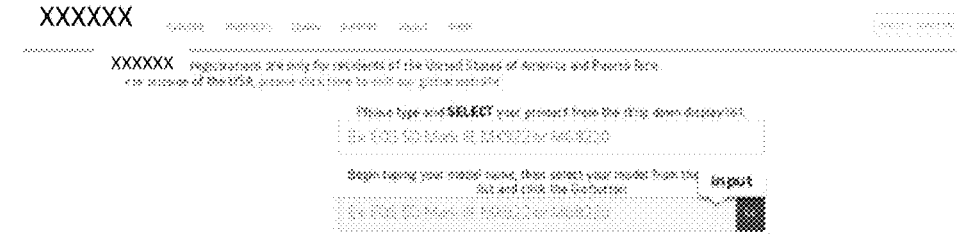
FIG. 9B shows another example of another keyboard accessibility failure on a web page, according to one or more embodiments of the present disclosure.

For root causes of KTFs, several reoccurring patterns were found. (1) Auto-advance during data entry in web forms. Over half of the of the KTFs found were due to mistakes in implementing this functionality. (2) Customized widgets bound to scripts that altered the focus or the layout of the UI. Often unintended side effects of this alteration would lead to the KTF. (3) Text input boxes with overridden keydown and keypress events. Typically, these would be used to auto-complete data entered into search boxes or to filter the contents of dropdown lists as users entered text. An example of this may be seen in a registration web page 950 shown in FIG. 9B where the keyboard focus is trapped on the input box. Mistakes in the implementation of these handlers resulted in keyboard users being unable to navigate away from the input box.

In some examples, a Selenium WebDriver may be unable to interact with some elements that it considers "NotInteractable" or when the DOM is considered "Stale." For example, when elements are obstructed by others or when the DOM is spontaneously altered caused by AJAX calls that were not triggered via our automated interaction (e.g., events automatically loaded via a timer, a slider/-carousel that constantly loads persistent streams, or asynchronous calls that implement infinite scrolling to load and populate data). In order to adjust this behavior, further web page capture and replay techniques may be updated).

In some examples, for different web browsers the KAF ground-truth may vary. These browser-specific KAFs could be easily detected by systematically running KAFE using different Selenium WebDrivers for different browsers.

The success criteria in WCAG are, by design, defined in such a way as to make it possible to objectively determine when a failure has occurred. Thus, any potential criterion validity threats may be mitigated. Further, the failures are also defined in terms of behaviors of specific elements of a UI, which makes it possible to objectively determine the faulty element that should be identified by KAFE.

Poorly designed web applications create keyboard accessibility barriers that exclude people with disabilities from interacting with its functionalities. The example process automatically detects and localizes KAFs in web pages. The example process detects and localizes keyboard failures with high precision and recall. The example process results in outputs that may assist developers to debug KAFs in web applications.

Figure 10:
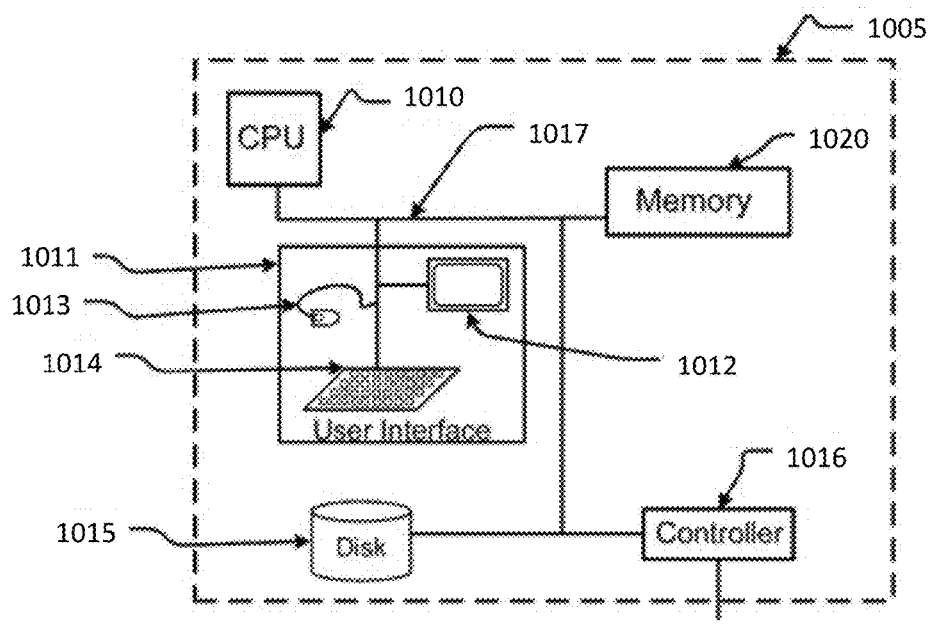
FIG. 10 shows a block diagram of an example computing system for implementing the various embodiments; according to one or more embodiments of the present disclosure.

FIG. 10 illustrates an exemplary system for implementing the various embodiments. In particular, FIG. 10 illustrates a computing system including a computing system 1005. The exemplary computing system 1005 includes a digital processor (CPU) 1010 that may be used to perform classical digital processing tasks.

Computing system 1005 may include at least one digital processor (such as central processor unit 1010 with one or more cores), at least one system memory 1020, and at least one system bus 1017 that couples various system components, including system memory 1020 to central processor unit 1010.

The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc., and/or combinations of the same.

Computing system 1005 may include a user input/output subsystem 1011. In some implementations, the user input/output subsystem includes one or more user input/output components such as a display 1012, mouse 1013, and/or keyboard 1014.

System bus 1017 can employ any known bus structures or architectures, including a memory bus with a memory controller, a peripheral bus, and a local bus. System memory 1020 may include non-volatile memory, such as read-only memory ("ROM"), static random access memory ("SRAM"), Flash NAND: and volatile memory such as random access memory ("RAM") (not shown).

Computing system 1005 may also include other non-transitory computer- or processor-readable storage media or non-volatile memory 1015. Non-volatile memory 1015 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 1015 may communicate with digital processor via system bus 1017 and may include appropriate interfaces or controllers 1016 coupled to system bus 1017. Non-volatile memory 1015 may serve as long-term storage for processor- or computer-readable instructions, data structures, or other data (sometimes called program modules) for digital computing system 1005.

Although computing system 1005 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 1020. For example, system memory 1020 may store instruction for communicating with remote clients and scheduling use of resources including resources on the computing system 1005. Also for example, system memory 1020 may store at least one of processor executable instructions or data that, when executed by at least one processor, causes the at least one processor to execute the various algorithms described elsewhere herein, including machine learning related algorithms.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices.

The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a "control system" on data stored on one or more computer-readable storage devices or received from other sources.

The term "control system" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally. a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Additional specific website accessibility issues may be identified by additional features that may be incorporated into the above description. One issue is failure based on unintuitive keyboard navigation such as Unintuitive Navigation Order, Unintuitive Change-of-Context, and Unapparent Keyboard Focus. Another issue is Responsive Accessibility Failures (RAFs), where users that rely on assistive technologies with smaller screen sizes that are unable to access certain functionalities of the web page that are otherwise available in the full-sized version. Another issue is a failure of web navigation involving the interaction of web dialog on a user interface of a web page.

Detection of Unintuitive Navigation Failures

In websites, a focus indicator allows keyboard users to know their current location on a web page. By default, a basic focus indicator is provided by web browsers and is shown as an outlined border around the focused element (a focus ring). Form fields also show a vertical bar (text cursor) inside the field during text input. An unapparent focus type keyboard navigation failure (KNF) occurs when the keyboard focus mechanism is not present or observable at all times. This prevents a user from visually locating the interactive element that is ready to be activated or manipulated. More subtle failures occur when the surrounding background is visually similar to the custom focus style on a link or other controls or if their colors have insufficient contrast to be clearly noticed.

Figures 11A, 11B:
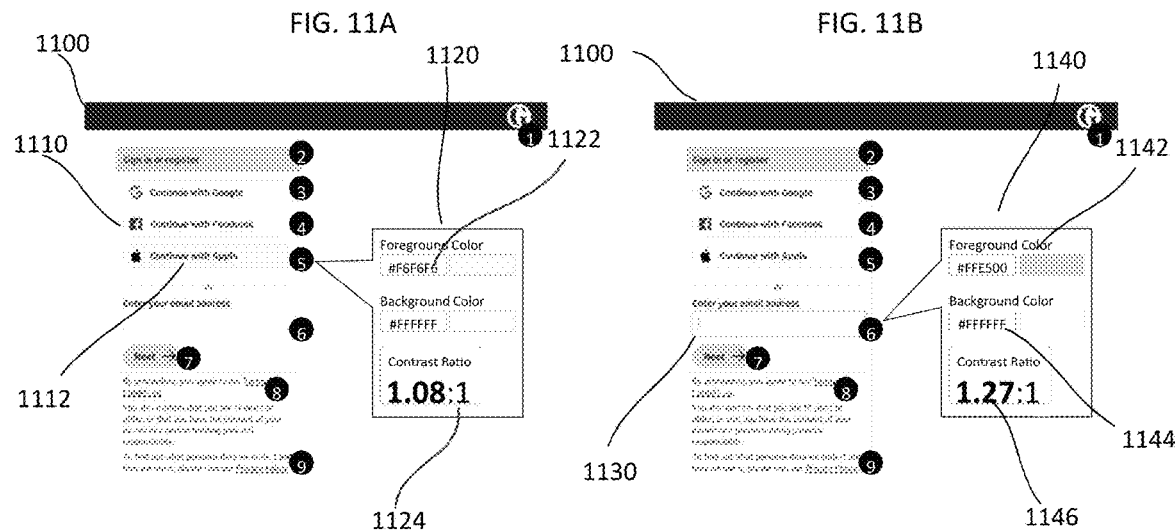
FIGS. 11A and 11B show example accessibility issues in the form of unapparent navigation failure sequences in an example web page.

FIG. 11A shows an example login web page 1100. The login page 1100 includes a series of sign in options 1110. When the keyboard focus is navigated to a "Continue with Apple" button 1112, the button is highlighted with a faint grayish color. As shown in an inset 1120 that is a pop up window showing the detailed color properties of the button 1112, a background color field 1122 has a value of #F6F6F6) that is not clearly visually distinguishable from its non-focused counterpart with a color contrast ratio of only 1.08:1 as shown by a contrast field 1124.

FIG. 11B shows the example log in web page 1100 with another unapparent keyboard focus issue with an "Enter your email address" text-field 1130. Thus, when the focus is on the "Enter your email address" text-field 1130, as shown by an inset 1140, the color contrast between the yellow focus ring of #FFE500 in a foreground color field 1142 and white background value of #FFFFFF in a background color field 1144 is only 1.27:1 as shown in a contrast field 1146.

As outlined in Success Criterion (SC) 2.4.7 any keyboard operable user interface is required to have a focus indicator that is visible. A corollary is defined that requires the visual presentation of non-text (such as the focus indicator) to have a minimum contrast ratio of 3:1 against its adjacent color(s).

A naive way to detect Unapparent-Focus keyboard navigation failures (KNF)s is to examine the CSS applied to a web page to identify styling that removes or renders the visual focus indicator non-visible. However, this is troubled by two challenges. First, the focus indicator can be achieved in many different ways other than the CSS outlines and borders properties. For example, developers can change the presentation of user interface components with inverted colors, highlights, or use JavaScript to animate the focus indicator with transitions from one element to another. Scripting can also be used to remove focus indicators upon receiving focus. This makes no determinant way to identify the visibility of focus indicators by examining specific CSS properties.

Second, the intricacies of dynamic layout rendering can behave in unintuitive ways and be affected by surrounding elements. For example, run-time z-index or outline-width behaviors can cause the focus indicator of an element to be cut of, exceed the bounds, or be overlapped by other elements. Visual rendering becomes more complicated to examine when elements are rendered over background-images or background with opacity that are visually similar for the focus indicator to be clearly noticed. The dynamic layouts can also change as the user interacts or navigates the web page. These challenges make it difficult to detect unapparent focus KNFs using traditional static program analysis techniques that rely on simply analyzing the rendered DOM of the web page when the page loads.

The present method and system for detecting unintuitive navigation failures uses the example general keyboard navigation model along with addition modeling (features) to detect unapparent navigation problems. To detect unintuitive navigation order issues, the general keyboard navigation model and a web page content segmentation technique are used to cluster similar elements together. To detect unintuitive change-of-context issues, the general keyboard navigation model with additional features is used. To detect unapparent keyboard focus issues, an example technique that captures the visual representation of the keyboard focus indicators during navigation and analyzes them using image processing techniques is used.

The goal of the example method is to automatically detect KNFs in web applications and identify the underlying faulty behaviors responsible for the failures. A key capability required to detect KNFs is to understand how the keyboard focus behaves in real-time when a keyboard user interacts with a web page. A dynamic crawling technique is used to interact with a web page by programmatically simulating user keyboard actions through the browser's keyboard API (e.g., executing Tab or Shift+Tab) and retrieving the active element that is receiving focus for every such interaction. The way the keyboard focus indicator visually transitions between interactive elements is then translated into a graph-based abstraction representing the model that is analyzed for the KAFs. The approach defines a model, called the Keyboard Focus Flow Graph (KFFG) that captures (1) the keyboard navigation allowed by the PUT from the keyboard-based users' perspective. (2) the ways the PUT is semantically structured. and (3) how the keyboard focus visually appears in the UI. These models are used later to detect the undesirable behaviors caused by KNFs.

The keyboard navigation and focus-related properties of a page under test (PUT) are represented by a Keyboard Focus Flow Graph (KFFG). The Keyboard Focus Flow Graph (KFFG) is formally represented as a graph $\langle V, V_s, E, V_f, v_0 \rangle$, where V is the set of nodes that consist of all visible elements in the user interface, $V_s \subseteq V$ represents the set of all visible elements that are also interactive, E is the set of directed edges that represents the corresponding navigation flow among the interactive elements in V based on their keyboard focus, $V_f$ represents the sets of functionally similar elements (FuncSets) that are characteristically/visually similar in the PUT, and $v_0$ is the entry node of the KFFG.

A node $v \in V_s$ in the KFFG represents a user interface element that is interactable (able to receive focus) to the keyboard that provides functionality with which the user can navigate, enter text, etc. that includes all the native control elements such as HTML links <a>, inputs and form controls <button>, <input>, <select>, and <textarea> as well as non-native control elements that have been customized with interactive characteristics (e.g., elements with a tabindex property set with a non-negative integer, or elements binded with keyboard interactive events). Each node is defined as a tuple $\langle R, I, I', x \rangle$, where R is the Minimum Bounding Rectangle (MBR) that encloses v in the page under test, I and I' are the visual representations of R the way they are rendered in the browser before and after v receives focus, and x is the XPath representing v. R is defined as a tuple $\langle x_1, y_1, x_2, y_2 \rangle$ where the coordinates $(x_1, y_1)$ and $(x_2, y_2)$ represent the upper left corner and the lower right corner of v. I' represents how the keyboard focus indicator is visually presented to the user when the focus is on v. The node $v_0 \in V_s$ represents the entry node of the graph. This is the element in the page that is the starting point for keyboard-based navigation.

A directed-edge $e \in E$ is defined as a tuple $\langle v_s, v_g, \phi \rangle$ indicating that the browser's keyboard focus shifts from a source node $v_s$ to a target node $v_t$, by pressing keystroke $\phi$ while $v_s$ is in focus. All standard keystrokes for web user interface interaction are included where $\phi$ can be from the set of navigation keystrokes {Tab, Shift+Tab}, selection keystrokes {↑, ↓, ←, →}, actuation keystrokes {Enter, Space}, and dismiss keystroke Esc. In addition to detecting focus shifts, any attempt for the page to navigate away to a different URL is detected by instrumenting the onbeforeunload JavaScript event. For such occurrences, a forward edge e is constructed from the originating node to a special node added to the KFFG called $v_{ext}$ (e.g., $\langle v_{link}, v_{ext}, \text{Enter} \rangle$).

The KFFG model first builds the node set V by rendering the page under test in the browser and then analyzing its document object model (DOM) to identify each unique HTML element. Each node is uniquely identified by its XPath in the DOM. The entry node of the graph $v_0$ is then identified by being the first element to receive focus.

The edge set E is then built by dynamically exploring the client-side user interface to identify the possible keyboard navigation. The high-level intuition of this process is to iterate over all the interactive elements in the page under test (i.e., $V_s$) and execute all the keyboard operations (i.e., $\Phi$) on each element to identify the resulting keyboard navigation. A challenge for dynamic UI exploration is its completeness. For example, during the crawling process, the keyboard focus may be obstructed by navigation behaviors, such as inaccessible custom widgets that trap navigation. This can halt the edge creation process and cause parts of the user interface to be unexplored. The example technique overcomes this challenge by starting navigation at each possible interactive node, which skips anomalous navigation behaviors (such as loops) that may obstruct the exploration and ensures there will be no unexplored UI components in the page under test.

While the keyboard navigation model provides information on how a keyboard user navigates around the user interface, the example navigation model alone cannot be used to detect all KNFs. The example method includes further models that contain: (1) information about the content of a web content required to detect when the existing focus navigation is out of order; and (2) visual representations of the elements and analyses needed to detect when the keyboard focus is visually absent during keyboard navigation.

Figures 12A, 12B:
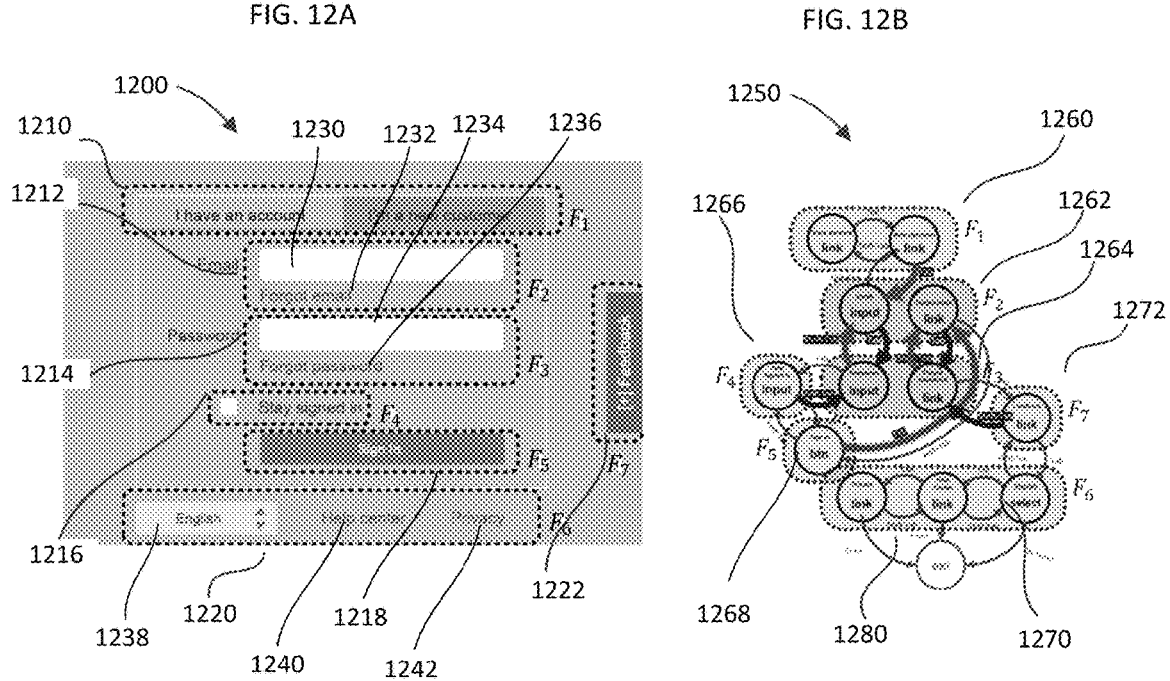
FIG. 12A is a web page with potential accessibility issues.
FIG. 12B is an example keyboard navigation flow graph (KNFG) of the web page in FIG. 12A, according to one or more embodiments of the present disclosure.

FIG. 12A shows an example web page user interface 1200. A series of boxes 1210, 1212, 1214, 1216, 1218, 1220, and 1222 that represent different features that are available from the interface 1200. FIG. 12B shows an example Keyboard Focus Flow Graph 1250 that includes clusters 1260, 1262, 1264, 1266, 1268, 1270, and 1272 that represent the features in the boxes 1210, 1212, 1214, 1216, 1218, 1220, and 1222. Individual inputs and links are shown as nodes represented by circles in each of the clusters 1260, 1262, 1264, 1266, 1268, 1270, and 1272. Arrows represent transitions from links, inputs and clusters. Other inputs such as shift+tab are shown as text labeling the arrows.

An "Email" input textbox 1230 in the box 1212 is semantically clustered with an adjacent "Forgot email" link 1232 (corresponding to the cluster 1262 in the KFFG 1250). The same applies to an "Password" input textbox 1234 and a "Forgot password" link 1236 that form their own cluster (the cluster 1264 in the KFFG 1250). An unintuitive navigation order is identified because the two Tab edges and the two Shift+Tab edges can navigate to these two clusters 1272 and 1274 in the KFFG 1250.

The example method defines the nodes in the clusters 1260, 1262, 1264, 1266, 1268, 1270, and 1272 for the example KFFG 1250 as the set of visible elements. Screen reader links that are not initially visible (e.g., skip navigation links or parallel links that are hidden for the sole purpose of providing labels for other control elements) are not used in the semantic clustering, thus, they will not be classified as KNFs.

The example method for detecting unintuitive navigation order failures identifies similar page contents via semantic clustering. In order to determine how intuitive the navigation is for the keyboard users, the example method employs segmentation on the content information of the webpage to analyze the navigation. This is done by grouping the elements in V into FuncSets $(F_1, \ldots F_n \in V_f)$ that contain visually related elements in the web page. The goal of this step is to provide an abstraction of the way the content information of the webpage is structured and presented. Related items in the page under test often exhibit consistency in visual presentation style and spatial locality that is used to depict the way users interact and navigate the web page. For example, a set of header menu, footer navigation, social media icons, or form elements that are spatially grouped together tend to be semantically oriented within the content of navigation. The example method computes the visual similarity and DOM information similarity based on a distance function that uses several metrics such as matching the width, height, alignment, locality of the elements, as well as the similarities of their XPaths, CSS properties, tag-name, and class and text attributes of the elements. The process then uses a density-based clustering technique (DB-SCAN) that puts each element into only one cluster (i.e., hard clustering). Each element $v \in V$ belongs in exactly one of the n clusters $(F_i \subseteq V)$ and all clusters are disjoint subsets of V.

The method includes generating visual representations of the keyboard focus indicators. To understand whether the keyboard cursor (e.g., a focus indicator) is apparent to keyboard users, the example method captures a set of visual representations of every node v∈V as the way they appear in a browser. This is done by capturing a screenshot that is cropped to the nodes' R region both before (I) and after (I')v is set to focus. I and I' are identical in dimension. The cropping process includes a custom adjustable pixel radius as padding to ensure thick focus rings are not cut off. This visual focus model allows the example method to retain the exact way the focus would appear to a keyboard user during navigation.

The example method detects unintuitive keyboard navigation failures by analyzing the keyboard navigation model that is constructed as described above as well as the models that characterize keyboard focus as explained above. In relation to detecting an unintuitive navigation type of KNF, the goal is to identify certain keyboard navigation patterns that represent KNFs. This general type of KNF can be either a navigation order failure, a change of context failure, or a change-of-context failure.

The navigation order failure type of unintuitive navigation failures occurs when the navigation focus order is inconsistent with the determined reading order or the visual presentation of the web page (e.g., the focus appears to jump around randomly across different sections of the page under test). To detect this type of KNF, the example method analyzes the keyboard navigation that is represented by the edges in the KFFG with respect to the FuncSets. The intuition is that the FuncSets partition the PUT's layout into segments, each representing a semantically similar relationship in functionality (e.g., address web forms, header navigation bar, social media component, footer links). Let the FuncSets $F_1, F_2, \ldots, F_n$ of V be the n partitions, such that $F_1 \cup F_2 \cup \ldots \cup F_n = V$ and $F_1 \cap F_2 \cap \ldots \cap F_n = \emptyset$, meaning that an element in the PUT can only reside in one (and only one) FuncSet. Navigation that follows sequences and relationships within the PUT's linear logical content flow should enter and exit each FuncSet exactly once. A failure (true detection) is determined by the existence of (1) more than one incoming Tab edge or (2) more than one Shift+Tab edge that enters a FuncSet Fj coming from different clusters. When more than one way to navigate to a given FuncSet exists from either navigation direction, it represents that the focus violates the sequential navigation order of that partition. Such behavior means that the way a keyboard user encounters the elements in the partition does not follow the visual linear flow of the content within the partition.

Another unintuitive navigation KNF is a change-of-context in a web page. This KNF occurs when the keyboard navigation triggers an unexpected change to the context of the page under test that lacks a prompt for users to abort the action. To detect this, the example method first examines if the special node "$v_{ext}$" in the KFFGs has any incoming edge leading to it whose action is a non-actuation key (i.e., φ=Tab, Shift+Tab, ↑, ↓, ←, →). Such an edge indicates an attempt to unload (navigate away from) the page under test through keystrokes that are not intended for activation. In accordance with standard web design practices, non-activation keys are generally not intended to execute an action that would trigger a change to the user interface or prompt a web dialog.

In the example user interface 1200 in FIG. 12A, a language selection drop-down control 1238 contains an unintuitive change-of-context KNF. The corresponding KFFG 1250 shows that three controls in the user interface (i.e., the language selection drop-down 1238, the "Help center" link 1240 and the "Privacy" link 1242) will cause a keyboard user to navigate away from the current page (as represented by the arrows 1290 from the cluster 1280). In this example, only the language selection drop-down is identified as a KNF because it has an outgoing edge whose action is a non-activation action.

The example method also allows detection of unapparent keyboard focus. To detect these KNFs, the goal is to identify those interactive elements in the page under test that lack sufficient visual change when they receive focus during keyboard navigation. The example method approach follows the focus appearance metrics as stated in the working draft of WCAG 2.2 to determine what is considered sufficient focus for users that have difficulty perceiving the focus ring of a user interface, and for the users that have difficulties perceiving the difference in contrast from the focus ring. For a given user interface element, the definition of sufficient visible focus can be represented using the following definition:

$$V_{visible} := \{v | v \in V \wedge C(v) \wedge (\mathcal{M}_1(v) \vee \mathcal{M}_2(v)) \wedge A(v) \wedge O(v)\} \quad (1)$$

Here, the predicate $C(v)$ represents the condition that satisfies a contrasting area: the predicates $\mathcal{M}_1(v)$ and $\mathcal{M}_2(v)$ represent the two conditions for a minimum area: the predicate $A(v)$ represents the condition that satisfies adjacent contrast; and the predicate $O(v)$ represents the condition that satisfies obscurity of the element.

In order for an element's focus indicator to be considered visible, there must exist an area in the focus indicator that has a sufficient contrast ratio between the colors in the focused and unfocused states. At a high level, detecting a contrasting area could be done by comparing the visual representation (screenshot) of every $v \in V$ before and after they receive focus. Differences in pixels can be used to reliably detect visual inconsistencies of HTML elements. The example method identifies the visual differences between I and I' using perceptual image differencing (PID), a computer vision based technique for image comparison. This visual difference is represented as the set of perceivable difference pixels Δ between I and I'. The PID uses a Δ parameter as a customizable tolerance level to indicate how closely I and I' must match. Parameters in related research were used to address visual differences in web applications that constitute presentation failures. If the PID determines that there is a sufficient human perceivable difference, this means there exists a set of pixels that are visually different between when the element is in focus versus not in focus (i.e., $DP_\Delta \neq \emptyset$). When such differences exist, the approach then analyzes the region of perceptual difference (i.e., $DP_\Delta$) in the focused state (i.e., $DP_\Delta \in I$) and unfocused state (i.e., $DP' \in I'$) to determine if the colors of the pixels in DP and DP' have sufficient contrast. To do this, for every pixel in DP, the corresponding pixel is found in I' and the color values of these two pixels are compared using the color contrast formula defined by WCAG.

Let $x=(x^r, x^g, x^b)$ and $=(y^r, y^g, y^b)$ be a pair of dominant colors represented in their RGB color space, where $x \in DP$ and $y \in DP'$. The contrast ratio (CR) between them is mathematically defined by the relative luminance of the lighter color over the relative luminance of the darker color, as shown in Equation 2a, where $L(x)$ is the relative luminance defined in Equation 2b and Equation 2c.

$$CR(x, y) = \frac{\max(L(x), L(y)) + 0.05}{\min(L(x), L(y)) + 0.05} \in [1, 21] \quad (2a)$$

$$L(x) = 0.2126 \cdot h(x_r) + 0.7152 \cdot h(x_g) + 0.0722 \cdot h(x_b) \quad (2b)$$

$$h(x) = \begin{cases} \dfrac{a/255}{12.92} & \text{if } a/255 \le 0.03928 \\ \left(\dfrac{a/255 + 0.055}{1.055}\right)^{2.4} & \text{otherwise} \end{cases} \quad (2c)$$

If there exists a pair of corresponding pixels that results in a Contrast Ratio (CR) of at least 3:1, then the contrast area CA is represented by the set of those pixels that satisfy the CR, otherwise, CA=∅. The predicate C(v) yields true if CA is not an empty set (CA≠∅), otherwise, false. If the predicate C(v) is false, the element is not sufficiently visible.

If there exists a contrasting area (i.e., CA≠∅), then the example method uses the two conditions to check whether the region covered by the set of pixels CA satisfies the threshold of a minimum area. The first condition (i.e., predicate $\mathcal{M}_1$ (v)) requires the area of CA to be at least as large as the area covered by the outline of a 1 CSS pixel (i.e., normatively defined as the absolute length px) thick perimeter of the MBR of the element. The second condition (i.e., $\mathcal{M}_2$ (v)) requires the area of CA to be at least as large as the area covered by a 4 CSS pixel thick line along the shortest side of the MBR of the element. In order to translate these minimum areas from web rendering metrics into actual screen pixels, the equivalent (before and after) screenshots of a dummy element are captured for each element-under-test. Such dummy elements are created by overriding the original element under-test's focus events and CSS properties to portray a visible representation of these outlines for each of the two conditions. The difference in pixels of these dummy elements before and after they receive focus is used to calculate a pixel-based threshold for the minimum area for the original element-under-test. If C(v) yields true, then the predicates $\mathcal{M}_1$ (v) and $\mathcal{M}_1$ (v) respectively represent the two true/false conditions for a minimum area. If either of the two minimum area predicates is false, the element is not sufficiently visible.

In addition to having a contrasting area CA with sufficient contrast between the colors in the focused and unfocused states (i.e., DP' and DP), the focus component of an element is also required to have sufficient contrast with respect to its surrounding color(s). In other words, DP' must satisfy CR against those pixels adjacent to the focus indicator region (i.e., DP'\ DP') in the focused state.

Finding such an adjacent contrasting area is complicated by several challenges. The first challenge is that there is no corresponding 1:1 mapping to compare colors with when the pixels in I' and I' \ DP' do not overlap each other. The second challenge is that browsers render text or shapes using anti-aliasing to smooth the color transition of edges by introducing some intermediate colors around the edges. The third challenge is that there are various styles of focus indicators (i.e., dotted lines or changes to background colors) that may consist of multiple color-related properties. These variants make checking adjacent contrasts ambiguous and difficult to achieve. To mitigate the ambiguity, the example method utilizes a color quantization method used in CV called Median Cut Quantization (MCQ) to extract the dominant color(s) to reduce color noise. The intuition is that the visual difference region can be perceived as a single or discrete set of colors based on human perception. Instead of simply taking the average of the colors in DP' and I'\DP', which may lead to an incorrect representation of colors, the example method uses Modified-MCQ (MMCQ) to identify the dominating colors for a given image region using dimensionality reduction that decreases the number of colors used to find the n=2 dominant colors in both DP' and I'\DP'. If there exists a pair of corresponding dominant colors in the set of all ordered pairs (x, y) ∈(DP'×I'\DP'), that yields a minimum CR of 3:1, then this predicate A (v) yields true, otherwise. A (v) yields false. If the predicate A (v) is false, the element is not sufficiently visible because the contrast to surrounding colors is not sufficiently visible.

The example method also checks for whether the element with focus is not fully obscured or hidden by another page content. To do this, heuristics are provided to analyze the rendering of the web page. The example heuristic first checks that the element itself is not a descendent of another element that is hidden with properties type="hidden", visibility:hidden, or display:none. Next, the example heuristic checks that the element is not obscured by another element. This is done by ensuring that the element does not collide with MBRs of any other elements where the other element is rendered above, according to "painting orders" defined by the CSS Positioned Layout [1] (i.e., the browser's rendering engine). All of these heuristics can be identified by analyzing the attributes of the elements in the DOM of the page under test when it has been rendered in the browser. The predicate O(v) yields true if the element is partially obscured or hidden, otherwise, O(v) yields false. The example method may be customized to handle full obscurity. This is done by checking if the element's MBR (i.e., R) is fully contained by another element. Let $R_{e1}$ and $R_{e2}$ be the MBRs of elements $e_1$ and $e_2$, $e_1$ is obscured (contained) by $e_2$ if $R_{e1} \cdot x_1 \le R_{e2} \cdot x_1 \wedge R_{e1} \cdot y_1 \le R_{e2} \cdot y_1 \wedge R_{e1} \cdot x_2 \ge R_{e2} \cdot x_2 \wedge R_{e1} \cdot y_2 \ge R_{e2} \cdot y_2$. Thus, if the conditions are present, the element is obscured and an unapparent keyboard focus error is present.

FIG. 13 is a process diagram of analyzing the keyboard focus for an input from user interface element. The element's unfocused (i.e., I) screenshot 1310 and focused (i.e., I') screenshot 1312 are compared and used to determine the visually perceivable difference $DP_A$ via perceptual image differencing (PID). The perceivable difference, $DP_A$ is then used as a filter (1320) to determine the area of focus in I and I', which are respectively denoted as DP 1330 and DP' 1332. The corresponding pixels in the area of focus DP and DP' are then compared for color contrast to determine whether a contrasting area 1340 exists or not. Sufficient adjacent contrast is determined in a similar way by comparing the dominant colors in DP' versus I'\ DP' using MMCQ 1350.

To assess the effectiveness of the example approach for detecting unapparent navigation problems, an empirical evaluation was conducted that focused on two research questions: RQ1: What is the accuracy of the example technique in detecting KNFs in comparison with state-of-the-art approaches?; and RQ2: How fast is the example technique in detecting KNFs?

The example method for unapparent navigation problems may be embodied in a Java-based prototype tool, called keyBoard nAviGation failurE Locator (BAGEL). The BAGEL approach used the Selenium WebDriver version 3.141.5, an automated browser testing tool to load, render, and interact with the subject web pages to build the KFFG model. In particular, the FirefoxDriver API was used to send keyboard actions to the page and to execute JavaScript-based code to capture the change to the keyboard focus of a browser. All web pages were rendered with a fixed screen resolution of 1920×1080 pixels on Firefox version 92.0. The approach also used iFix's DBScan clustering to help identify the different FuncSets in a web page. A screenshot-capturing utility, aShot, was used to capture a complete representation of the browser's viewport. BAGEL and all experiments were on a single AMD Ryzen 7 2700X 64-bit machine with 64 GB memory and Ubuntu Linux 18.04.4 LTS.

The setting used in the experiment to analyze unapparent-focus used the minimum contrast ratio of 3.1 as defined in SC 2.4.11 Focus Appearance and the partial obscurity as defined in SC 2.4.12 Focus Not Obscured, which are the minimum required levels of compliance, meaning they are the most critical thresholds to ensure websites meet the most essential needs of accessibility. The example method is fully customizable to handle higher contrast ratios (e.g., 4.5:1 or 7:1) or full obscurity for higher levels (e.g., AA or AAA) of WCAG compliance.

The evaluation of BAGEL was conducted on a set of 20 real-world subject web pages gathered from two sources. The first source was the Moz 500 top websites list and the second source was a list of randomly selected websites that offer information, products, and services. The two sources were selected because they include government, education, as well as company websites that are obligated for accessibility as mandated by the ADA's Title II and Title III regulations. The list of websites in the second source were obtained via a Google search for popular online government, university, community forums, e-commerce, and service websites. The keywords "list of [genre] websites" for the five genres were used and included those that were listed under the "featured snippets" of each search result (e.g., Science.gov. Harvard.edu, Twitch, eBay, Domino's Pizza). From these results, an initial list of 25 websites was complied. The initial list was extended using similarsites.com to randomly select two alternative websites of the same genre for each of the listed websites to ensure the population was also representative of less popular sites. Together, the second source consisted of 75 unique websites. For the selection protocol, web pages were randomly selected from the two sources. Manual interactions following the WCAG Techniques used to identify KNFs were performed to include those websites that contained at least one type of KNF. The process was repeated until 10 subjects from each source were obtained. The final set of 20 subjects did not include web pages from government and education websites because no KNFs in these types of web pages were encountered.

To provide consistency in the results, a complete version of each subject web page was captured at the time it was added to the subject pool. Mitmproxy was used to store all the page's resources coming through HTTP/HTTPS traffic, including the JavaScript that was responsible for the web pages to remain interactive. The captured HTML, CSS, JavaScript, and other binary resources were packaged as local files to be loaded and replayed back by the proxy. For the few subjects that were not able to properly cache due to extra runtime security validation, web scraping tools were used to capture the rendered resources directly from the DOM.

To compare the effectiveness of BAGEL against current accessibility approaches, available state-of-the-art tools were selected from the Web Accessibility Evaluation Tools List provided by W3C. Since there are no known tools that specifically target KNFs, prominent industry tools WAVE, ARC Toolkit, Axe DevTools Pro, Tenon Check, and a tool from the research literature, QualWeb, were compared with BAGEL. This set of tools offers the most complete analyses in handling a wide spectrum of issues that leverage analyses on the rendered DOM after scripting and CSS styling are applied.

To answer RQ1, measurements were taken of how accurately BAGEL detected KNFs in the subject web pages. The accuracy was measured in terms of precision and recall for the unintuitive-navigation-order, unintuitive change-of-context, and unapparent-focus keyboard navigation failures. To find the KNFs in each subject web page, manually interaction with the user interfaces of the web pages and their underlying functional components via the keyboard were performed to create the ground-truth. The process followed the Success Criterion defined by WCAG for each KNF type, including the testing techniques that point out objectively, the exact behaviors of the failures that a keyboard-based user would experience.

The outputs of BAGEL were analyzed to check whether identification of the actual element responsible for each KNF with respect to the ground-truth occurred. The false-positives, true-negatives, and false-negatives were calculated in an analogous way. For Unintuitive-Nav-Order detection, the faulty elements were included as all of the elements contained in those clusters (FuncSet) where the navigation enters from more than one entry point coming from different clusters. For unintuitive change-of-context detection, elements that caused the web page to navigate away when some non-activation keyboard actions were performed on them were included. For unapparent-focus detection, elements that did not have sufficient visible focus indication when receiving focus were included. These ways faulty elements were identified follow the same workload pattern that a developer would use the output of BAGEL in the form of an output list of faulty elements to debug the detected keyboard navigation failures on a web page.

To measure how well BAGEL performed against other accessibility scanners, accuracy of detection of KNFs in the subject web pages was measured for each of the five state-of-the-art tools. Since each tool has a unique way of detection reporting the outputted results were objectively interpreted based on violations to specific WCAG Success Criterion (SC). For the five tools, reports with any mention of keyboard accessibility issues related to WCAG SC 2.4.3, SC 2.4.7, SC 3.2.1, and SC 3.2.2 were considered as a KNF detection for the corresponding subject web page. These Success Criteria are the exact guidelines in which the KNFs were defined. For all five tools, the mechanism for recognizing a detection at the per-element level was consistent with the intended use and resulted in the most favorable accuracy scores for the known tools.

To answer RQ2, the time to run BAGEL on each subject web page was measured. The running time included the time to start the tool, load the browser, build the models, and compute the detection results. For WAVE, ARC Toolkit, and Axe DevTools Pro, which are browser extensions, the time from when the detection was executed until the results were displayed was determined. For Tenon Check and QualWeb, which are web-based services, the time to submit a subject link for analysis until the result page was displayed was measured.

FIG. 14A is a table that shows results of KNF detection accuracy for all tools (RQ1) and their average run-time per subject (RQ2). FIG. 14B is a table shows the detection accuracy (RQ1) and run-time (RQ2) for BAGEL detailed for each subject web page. The "n/a" represents that the precision/recall does not apply (usually due to the web page not including the specific type of KNF). Generally, BAGEL was able to detect KNFs with higher accuracy compared to the other tools. None of the other tools are capable of detecting all three types of unintuitive navigation KNFs.

The table in FIG. 14A shows that BAGEL was able to accurately detect the faulty element(s) responsible for each of the three types of KNFs with high precision and recall (with an F1 score of 93%, 83%, and 95% for the three types of KNFs). The Tenon Check tool could not detect any of the KNFs at all. Although the WAVE tool had a higher precision than BAGEL in detecting Change-Of-Context KNFs, WAVE failed to detect many change of context KNFs and therefore had a low recall. Overall, the other tools (Axe DevTools Pro, QualWeb, WAVE, and ARC Toolkit) had only an average F1 score (across the three types of KNFs) of 15%, 23%, 43%, and 15% respectively. This shows that BAGEL does a much better job in detecting elements that are responsible for KNFs in the subject web pages.

The table in FIG. 14B shows that BAGEL was able to detect all the Unintuitive-Nav-Order KNFs in the subjects, all of the Change-Of-Context KNFs in five out of six subjects that had this type of KNF, and correctly detect all Unapparent-Focus KNFs in 14 out of 20 subjects that had this type of KNF.

The known WAVE, Axe DevTools, Pro, and ARC Toolkit detect elements with Unintuitive-Nav-Order KNFs by scanning the DOM of a web page for elements with a tabindex value larger than zero. These elements are then output as potential issues. While this may be a simple proxy to detect potential order issues, a positive tabindex value does not always cause problems for page navigation. Therefore, these tools have higher rates of false-positives.

All of the elements responsible for Change-Of-Context KNFs correctly identified by WAVE were menu-items binded with the JavaScript onchange event handler that triggered a new page when an element in a menu was selected. WAVE was able to identify these KNFs by scanning the DOM and identifying any menu with such an attached event handler. However, WAVE was not able to identify other cases of Change-Of-Context where an element needs to be dynamically interacted with to trigger this faulty behavior. This under-approximation caused WAVE to miss many such KNFs. QualWeb considers any web form without a submit button to be a potential issue that impacts WCAG SC 3.2.2 and thus provides a true detection. However, using this metric, QualWeb was not able to correctly identify any element with a Change-Of-Context KNF.

In terms of the unapparent-focus KNFs, QualWeb relies on scanning the DOM and the CSS applied to a web page to identify elements that do not have visible focus indications. However, since this is not a conclusive way of detecting unapparent-focus KNFs, QualWeb displays these as a potential warning that needs to be manually examined and verified by the users. While this can be very helpful, it can lead developers to miss many instances of Unapparent-Focus and requires them to examine many false positives. In fact, QualWeb was not able to detect 101 UnapparentFocus KNFs, while 330 of the elements that QualWeb detected were false-positives.

Figure 14C:
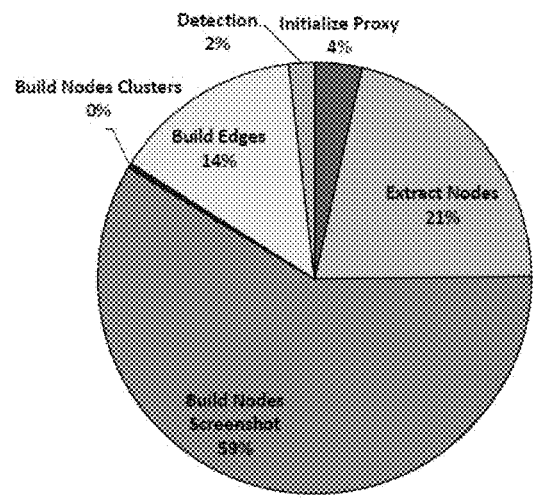
FIG. 14C is a pie chart of the time for performing tasks by a tool that incorporates the example method of detecting unapparent navigation failures, according to one or more embodiments of the present disclosure.

In relation to RQ2, the run-time of BAGEL was significantly slower than the other five approaches. It took BAGEL an average of over 7.5 minutes to complete the detection for each subject. The run-time breakdown of each individual step in BAGEL was analyzed in detail and approximately 98% of the total time was spent on modeling and building the KFFG and only 2% was spent on the detection. FIG. 14C is a pie chart showing the time BAGEL devotes by percentage to building node clusters, detection, initializing proxy, extracting nodes, and building the nodes screenshot. As shown in FIG. 14C, the KFFG construction process spent 59% of the time building the visual representation (screenshots) for the elements, 14% of the time building the keyboard navigation edges, and <1% of time performing the clustering on the elements. The average time for detecting all three KNFs was around 9 seconds (2% of total time) from the already constructed KFFGs.

BAGEL takes comparatively more time than known tools because BAGEL dynamically interacts with the subjects in the same way a keyboard user would. BAGEL takes screenshots to capture what a sighted user actually sees during their interaction. The higher time cost is offset by its higher precision and recall. Strategies to reduce the run-time include deploying and distributing Selenium's processing across multiple cloud computing instances. Since the majority of the run-time overhead lies in extracting the web elements and capturing the screenshots, future improvements to Selenium as well as alternative capturing techniques may improve the run-time.

A small user study was conducted to gather feedback from two keyboard users with disabilities. The first user (U1) is a blind user that navigates the web via a screen reader and the second user (U2) is a sighted user with a motor disability that uses the keyboard instead of a mouse. Six subject web pages (denoted as S1 to S6) were selected and U1 and U2 were given five minutes to interact with each of the web page's core functionalities. The researchers then discussed with the users whether they found any difficulties with the navigation and how they felt the usability can be improved on this web page to make it more accessible. The result shows that, in general, both U1 and U2 did not find the web pages easy to navigate.

For Unintuitive-Nav-Order KNFs, based on U1's interaction with S1 via a screen reader, he believed there was an issue with the flow, making it "not easy to understand at first". However, he does not consider the navigation a major issue because the page size of S1 is relatively small, thus it was "not that difficult to manage".

When it comes S2, U1 believed the scattered information is more severe because he had to navigate back and forth more times to fully understand the content when the page is larger and more complex. He mentioned, "there's no way to jump around, especially when there's a toolbar".

For change-of-context KNFs, U1 did not encounter the KNF on S3 because he was using the VoiceOver screen reader on an iPhone, which displayed an iOS-based dialog to override the behavior of the faulty drop-down implementation. However, after informing U1 about the KNF, he expressed that the particular issue occurred to him often when browsing the web on a computer—especially noticeable in banking sites. U1 expressed that "It's frustrating for me because when you go down and it starts loading. Usually, I don't understand what happened until like later. Uh, maybe I did something wrong or something. You think that you made a mistake". From U2's sighted user perspective, he indicated the same issue with S4, that the web page "ended up redirecting me to a page that I did not want".

For Unapparent-Focus KNFs, U2 expressed that during his interaction with S5, "It was difficult to see the highlighted areas, especially when I got to the end of the page, it was difficult to follow where the focus jumped back in the page." He further emphasized that "It slowed me down. I also needed to spend time trying to find the highlighted item". In terms of S6, where the keyboard focus indicator is completely absent visually, U2 mentioned "I did not know what was being selected on the web page. I was trying to select one of the options but not knowing where my cursor was, it was harder to know if I was selecting the correct option".

In terms of improvements, U1 and U2 generally expressed the need to circumvent the failure of each KNF, including "making the page flow more direct and to the point" for Unintuitive-NavOrder; "having a preview menu as well as being able to highlight the option without selecting it" for Change-Of-Context: and "having a noticeable, bolder highlighted areas around the selected part of the page" for Unapparent-Focus. These responses verified that what BAGEL identifies as KNFs aligns with issues faced by real-life users with disabilities that rely on keyboard navigation.

Responsive Accessibility Failures

The example method may also address the responsive accessibility failure problem when functionalities in the full-sized webpage version are not accessible in the reflow version. The new features are based on a general keyboard navigation model for a user interface of a web page rendered at both full-size and reflow versions was built. The versions were analyzed by comparing them to detect the reflow problem.

Figure 15A:
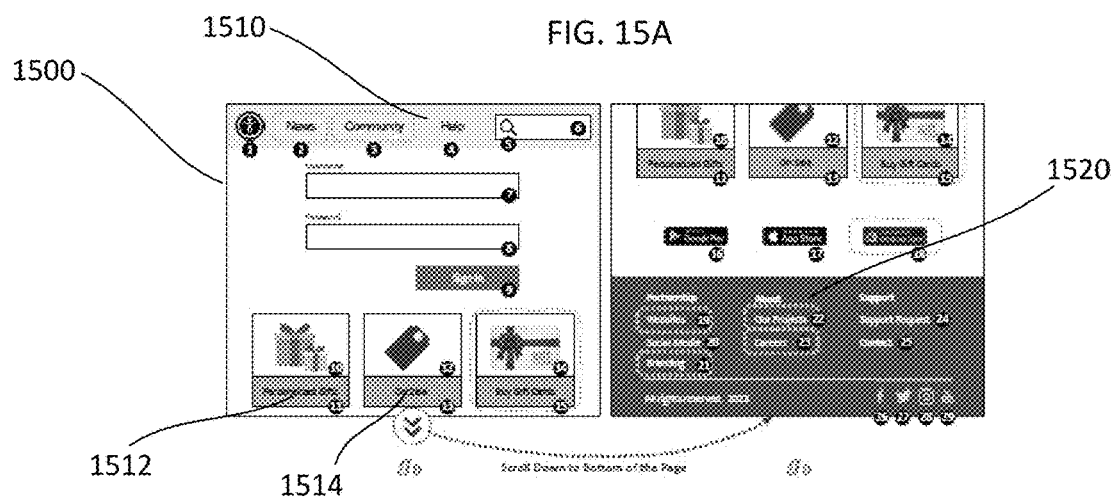
FIG. 15A shows a full sized version of an example web page.
Figure 15B:
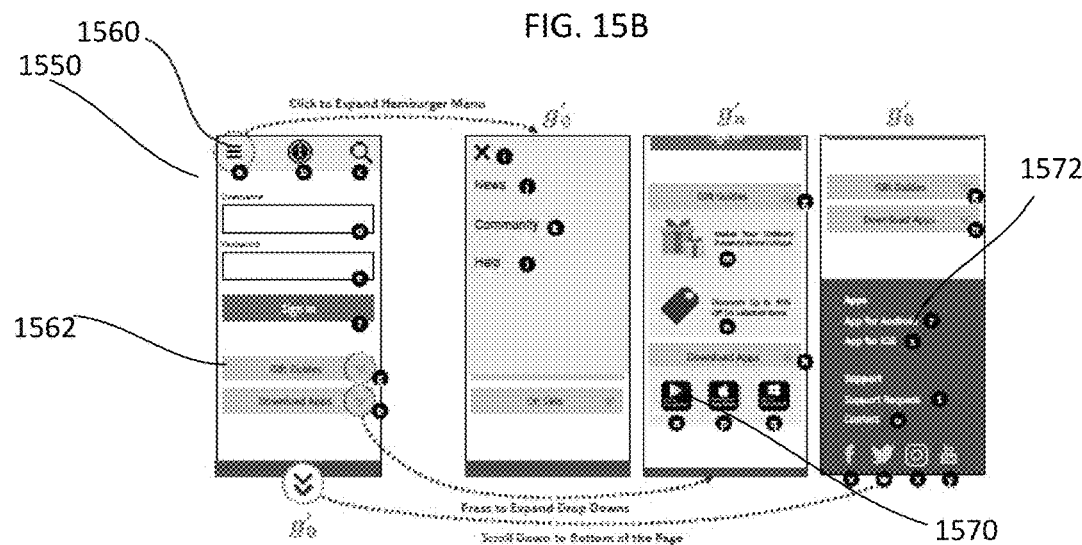
FIG. 15B shows a reflow version of the web page in FIG. 15A.

A responsive accessibility failure (RAF) occurs when functionalities in the full-sized webpage version are not accessible in the reflow version. When a responsive web page is reflowed, fully visible contents in the full-sized layout are often collapsed into fewer items to fit the smaller horizontal screen space. FIG. 15A show a full-sized version of an example web page 1500 at 1280 CSS pixels wide. FIG. 15B shows a reflow version of a webpage 1550 at 320 CSS pixels wide (400% scale). In this example, a navigation menu 1510 of a full-sized version of the web page 1500 is collapsed into a single hamburger menu button 1560 in the reflow version 1550. Similarly, a "Personalized Gifts" and "On Sale" links 1512 and 1514 are collapsed under a "Gift Guides" dropdown menu 1562. The example web page also contains responsive accessibility failure as the custom hamburger menu button 1560 is implemented using a<div> element that is not accessible to the keyboard (i.e., it cannot receive keyboard focus). Thus, the collapsed menu cannot be expanded, and the functionalities associated with the contained menu items ("News" and "Community") in the menu 1510 are unavailable to keyboard-based users.

The reflow version 1550 in FIG. 15B shows another example where a section 1520 of the footer of links in the web page 1500 completely disappears from the web page 1550 after reflow. In the reflow version, the "Websites", "Branding", "Our Projects", and "Careers" links grouped in the section 1520 are no longer present in the user interface. As a result, the functionalities associated with those links in the footer are no longer available to the users.

Detecting a responsive accessibility failure is a non-trivial task that is complicated by several challenges. First, developers must determine what functionalities are defined in a web page. This is a labor intensive process due to the user interface of modern web pages typically being complex and possibly consisting of many different states that all require exploration. Second, in addition to exploring a single user interface, developers must render the user interface in different modalities to observe the behaviors of the identified functionalities and verify whether they are in sync from one screen size to another. Lastly, even knowing the available functionalities on a page, a developer must determine whether they are accessible via assistive technologies by testing all possible ways they can be accessed by a user using assistive technologies. These challenges make it difficult for developers to thoroughly and accurately identify RAFs in their web applications.

The example method allows automatic detection of RAFs in a reflow version of a web page. Modern Rich Internet Applications (RIAs) have pages with structures and designs that complicate the automatic detection of RAFs. These web pages consist of various states, making it challenging to predict how keyboard users can navigate and determine the user interface functionalities that should be accessible. By definition, identifying RAFs involves reasoning about functionalities across different modalities (i.e., full-sized versus reflow versions). This task requires understanding the keyboard navigation and user interface functionalities, along with identifying discrepancies between the functionalities of the two versions. The example method for identifying responsive accessibility failures uses problem definition and domain-specific insights to overcome these challenges. The functionalities available in the full-sized version represent the functionalities intended by the developers and, therefore, represent the set of functionalities that should be checked for in the reflow version.

Figure 16:
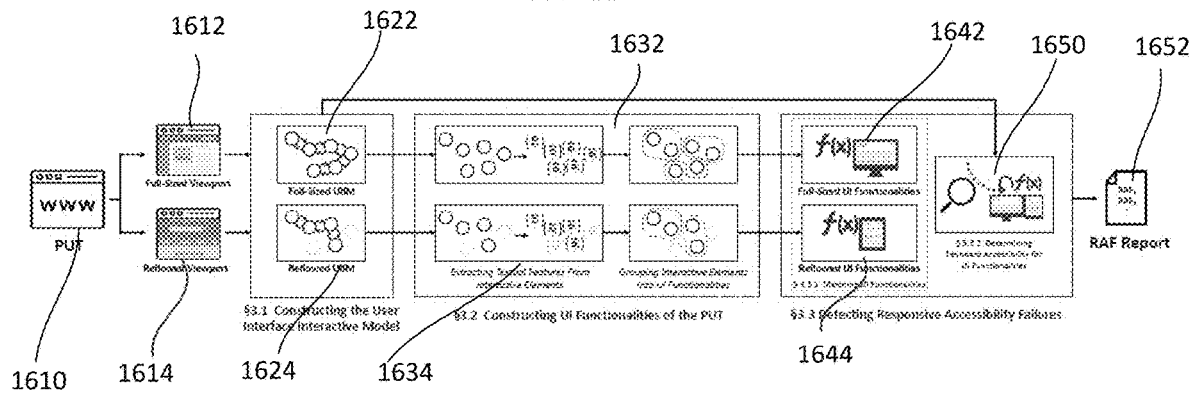
FIG. 16 is a workflow diagram of the process for detecting responsive accessibility failures from reflowed web pages, according to one or more embodiments of the present disclosure.

FIG. 16 shows a workflow overview of the example method and a more formal version is shown as the Algorithm in FIG. 18. The input is a Page Under Test (PUT) 1610 that is input into a full-sized view port 1612 and a reflowed viewport 1614. The approach begins by creating two UI interactive models: one for the full-sized user interface 1622 and one for the reflow interface 1624. Both of these models 1622 and 1624 are then processed to extract their UI functionalities by extracting textual features and grouping interactive elements into user interface functionalities 1632 and 1634. The method then compares these UI functionalities 1642 and 1644 while analyzing their UI interactive models to determine which functionalities are available via the keyboard in the full-sized but not the reflow version of the page under test (1650). The output of the example method is a list of detected RAFs 1652 for the page under test.

The example method models the keyboard interactivities of the user interface. The first step in automatically detecting RAFs is to capture how a keyboard user can interact with a user interface of a web page via the keyboard. A challenge in capturing such keyboard interactions is that the way a web page behaves in response to keyboard inputs may not be apparent via the source code. Instead, it requires observing how the page reacts to different keystrokes' actions at different states of the user interface. To overcome this challenge, the example method uses dynamic crawling techniques as explained herein to build a similar interactive model called the User Interface Interactive Model (UIIM). The UIIM represents the user interface and possible behaviors based on run-time interactions of a user using the keyboard.

The UIIM is formally defined as G, a set of user interface states the page under test can be in based on a keyboard input. Each user interface state of the page under test $g \in G$ is itself a graph representing both the HTML elements available to a user and the way a user can navigate among them using the keyboard. Formally, a UI state g is defined as a directed graph of the form $\langle V, E, v_0, \Phi \rangle$, where V is the set of nodes that represent elements with interactive behaviors in the state; E is the set of directed edges that represent the corresponding navigation flow among the interactive elements in V; $v_0$ represents the entry node, which is the element that receives the initial keyboard focus in the state: and $\Phi$ is the set of keystroke actions that could be carried out by a keyboard-based user to navigate the UI, which includes {Tab, Shift+Tab, ↑, ↓, ←, →, Enter, Space, Esc} as specified by the W3C Authoring Practices. Each UI state is uniquely identified by its set of nodes in the UI (i.e., g·V).

A node $v \in V$ is an element in the page under test that the user can interact with (i.e., navigate, activate, enter text, or provide input to). These interactive user interface elements include: (1) all the native control elements, such as HTML links, inputs, and form controls (i.e., <a>, <button>, <input>, <select>, and <textarea>) as well as (2) non-native control elements that have been customized with interactivity (e.g., customized buttons that are implemented using <div> or <span>).

A directed-edge e∈E is defined as a tuple ⟨$v_s$, ϕ, $v_t$, δ⟩ (where $v_s$, $v_t$∈g·V), indicating that when a source node $v_s$ is in focus, the keyboard focus of the browser shifts to a target node $v_t$ by pressing key ϕ∈Φ. In cases where the key press causes new nodes to become present (or existing nodes to become absent) in the UI, the edge is characterized as an inter-state edge, since the key press also causes the user to transition to a new UI state. In other words, an inter-state edge has the property vs∈$g_s$·V, $v_t$∈$g_t$.V where $g_s$ and $g_t$ represent the old and new UI states respectively. In addition to focus transition, the δ Boolean property is used to represent whether the key ϕ causes any visible changes to the user interface.

Figure 17A:
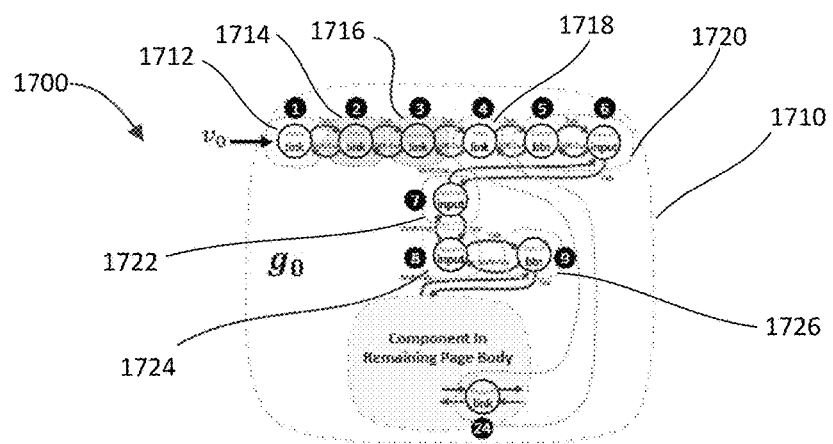
FIG. 17A is an example User Interface Interactive model of the full sized version of the web page in FIG. 15A according to one or more embodiments of the present disclosure.
Figure 17B:
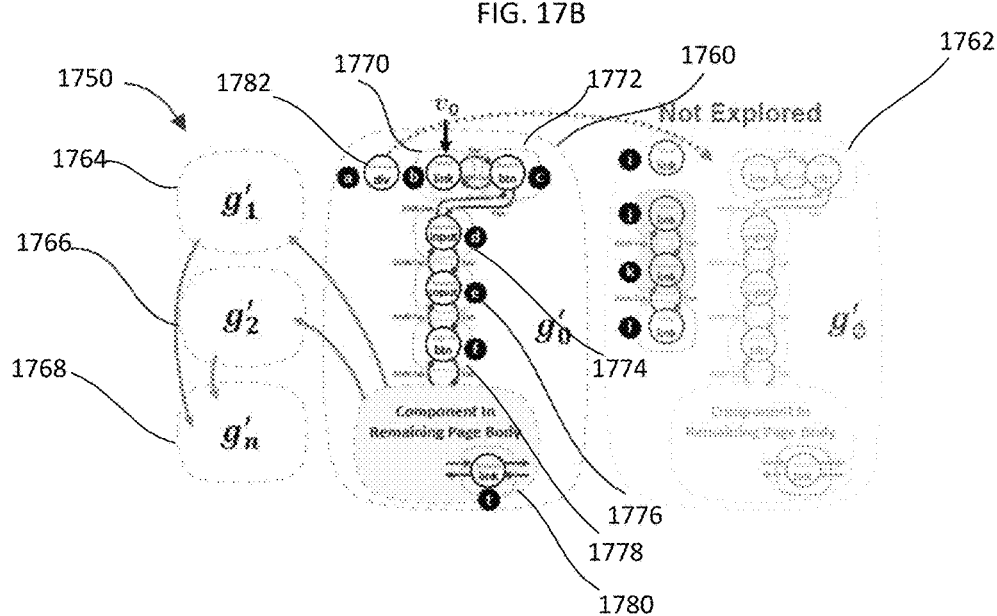
FIG. 17B is an example User Interface Interactive model of the reflow version of the web page in FIG. 15B, according to one or more embodiments of the present disclosure.

FIG. 17A shows an example User Interface Interactive Model (UIIM) 1700 of the full sized web page 1500 in FIG. 15A. FIG. 17B shows an example UIIM 1750 of the reflow web page 1550 in FIG. 15B. The UIIMs 1700 and 1750 are shown as graphs where UI elements are nodes (solid circles), and the edges are arrows between each node, showing how the keyboard focus transitions from one element to the next during keyboard navigation. A UI state (i.e., g) is a dotted bubble such as the dotted bubble 1710 in FIG. 17A and bubbles 1760, 1762, 1764, 1766, and 1768 in FIG. 17B. As shown in FIG. 17B, the model of the reflow web page 1750 requires multiple interface states based on the reflow as compared to the full sized version in FIG. 17A. Intra-state edges (arrows within the state) are those whose endpoints belong in the same UI state, and inter-state edges (arrows between bubbles) cross UI states that occur when its keyboard action changes the UI.

The construction of the UIIM dynamically explores the client-side UI using keyboard interaction. The approach first identifies the nodes (i.e., V) by rendering the PUT in a browser, then analyzing its Document Object Model (DOM) to identify each unique interactive element.

The example method then executes all the keyboard operations (i.e., Ø) on each interactive element v∈V to identify the resulting keyboard navigation. After each action, a check whether a change in focus occurred is performed by querying the browser to identify the element currently receiving focus in the PUT. In addition to identifying focus transition, the DOM is queried to check if the action resulted in a new UI state. Intra-state edges are created for actions that transition focus without a change of state and inter-state edges are created for those that change states (i.e., $g_s$≠$g_t$). For all the new UI states explored, the construction described above is repeated until no new navigation or UI state is found (i.e., the graph has reached a fixed point). In the case where the web page dynamically loads in content forever (e.g., infinite scrolling), the example method can be customized with an upper bound on the maximum depth of exploration to limit the number of new states to explore. A δ property of an edge is defined to be true if the keyboard action ϕ triggered any visual changes to the DOM that are unrelated to changing the UI state. The UIIM for the PUT rendered at both the full-sized version (i.e., G) and the reflow version (i.e., G') is built, which is shown in lines 2 and 3 of the Algorithm in FIG. 18.

The second step in automatically detecting RAFs is to understand what UI functionalities are present in the PUT. Knowing the functionalities of the PUT is a key capability required in detecting RAFs because the approach must have a concrete idea of "what" component needs to be (or is not) accessible in the full-sized UI in order to compare with those components in the reflow UI. At a high level, "UI functionalities" are introduced to represent user operation(s) that accomplish a unique task when interacting with the PUT's UI. The example approach defines a UI functionality (i.e., f) as a set of interactive elements that perform a similar task (e.g., buttons with similar Javascript function calls, dropdowns that contain similar content, or links that navigate to similar pages with different API parameters). The primary challenge in identifying UI functionalities is determining similar interactive elements. This is because multiple interactive elements can achieve the same functionality, but each may be implemented differently. For example, in the example in FIG. 15B, both a Google Play store icon 1570 and the "App for Android" link 1572 serve the same functionality of taking the user to the page to download the Android app. However, the icon 1570 is a customized <div> button that calls for a JavaScript function to navigate to the download site as opposed to a link. Simply relying on interactive elements ids or labels alone is not enough to identify or differentiate functionalities.

To overcome these challenges, the additional textual attributes associated with the elements were examined to express the task being performed. The performed task is often depicted as the "action" defined by the associated attributes and text content description. Therefore, an interactive element is formally defined as the tuple ⟨x, $S_{fun}$, $S_{tag}$, $S_{inp}$, $S_{lab}$, $S_{txt}$⟩ where x is the XPath that uniquely identifies the element in the DOM and $S_{fun}$, $S_{tag}$, $S_{inp}$, $S_{lab}$, $S_{txt}$ each are a set of strings that represents one of the five types of textual attributes associated to the element. The five types of textual attributes were chosen (referred to as "features") that comprise all of the properties that are defined in HTML form control documentation as the following:

(1) function—the destination directed by a link element (i.e., href attribute) or the event handler JavaScript function call signature of links and controls (e.g., buttons).

(2) tagtype—the type of element such as <a>, <button>, <select>, <input>, etc.

(3) input attributes—the attributes of input controls including general attributes i.e., id, type, name, value; boolean attributes i.e., readonly, disabled, multiple, required, autofocus, autocomplete; value attributes i.e., size, maxlength, min, max, pattern, placeholder, step, list; and form attributes i.e., form, formaction, formenctype, formmethod, formtarget, formnovalidate, novalidate.

(4) labels—the descriptive labels associated with the element.

(5) textual properties—text-based DOM (type 3) nodes wrapped inside of the element. (e.g., text of buttons or custom controls).

The example method constructs functionalities of the PUT by analyzing the full-sized and the reflow UIIMs and identifying the available functionalities in their UIs. To do this, a function 𝓕 : G→F is defined that takes a UIIM (i.e., G) as the input and identifies all of the functionalities in it. The output is a set of functionalities across all the possible UI states of the PUT for G. The function 𝓕 is shown in lines 16 to 36 in the Algorithm in FIG. 18.

The function 𝓕 starts by analyzing the dynamically rendered DOM at every explored UI state of the UIIM, which allows getting accurate run-time properties that represent exactly what the users would see as they interact with the PUT. The function first analyzes the DOM representation of each UI state (i.e., g∈G) and iterates over all their interactive elements to create a set of unique interactive elements (i.e., $V_G$) based on their XPaths. Next, the function groups interactive elements that perform similar tasks together as the same UI functionality (i.e., $V_{sim}$). This is done by using a function S (shown in Equation (4) below, used on line 26 of the Algorithm in FIG. 18 that takes a pair of interactive elements (i.e., ($v_a$, $v_b$)) to determine if they have equivalent features. The result of this step (i.e., $\mathscr{F}$ ) is the set of functionalities available across all of the states in the full-sized UI (i.e., $F_G$) and those of the reflow (i.e., $F_G'$) UI of the PUT.

In FIG. 17A, a functionality is shown as dotted ovals 1712, 1714, 1716, 1718, 1720, 1722, 1724, and 1726 within a UI that groups node(s) (i.e., interactive element(s)) together. For example, in the initial UI state of the full-size UIIM 1700 (i.e., $g_0$ represented by the bubble 1710), the "Help" and "Support Request" links are grouped together in the functionality oval 1718 because they are considered a single functionality that takes the user to the help/support page. Given the reflow, there are comparatively fewer functionalities represented by dotted ovals 1770, 1772, 1774, 1776, 1778, and 1780 in the reflow UIIM 1750 in FIG. 17B.

The example method then identifies interactive elements that perform similar tasks. To determine which interactive elements perform similar tasks, NLP techniques are used (e.g., the Word2Vec model) to capture the context from associated features of the interactive elements. A characteristic of Word2Vec is that semantically related words are close together in terms of their cosine similarity. A similarity function sim ($v_a$, $v_b$) is defined that returns an overall similarity score between a given pair of interactive elements. The function first computes the cosine similarity between each pair of corresponding features (e.g., $i_a$, $S_{lab}$ and $i_b$, $S_{lab}$). The function then assigns a weight to each of the five features based on the relative importance of the feature.

In the context of web applications, interactive elements that achieve the same task may share commonalities in certain features over others. For example, the "function" and "tag type" features would be considered to have more weight than the "input attributes" feature. The reason is that in design, a link (or input field) is more likely to be implemented as the same type of element or with the same actions/function-calls.

The overall similarity score is then calculated by computing the weighted average of the cosine similarities across the five feature vectors as shown in Equation (3) below. In the equation, the respective weights of the five features (i.e., $W_k$) are multiplied by their corresponding cosine similarities and then divided by the sum of all the weights. The approach defines the helper function S and uses a threshold θ to determine if the two interactive elements (i.e., $v_a$ and $v_b$) are similar enough to be equivalent. $v_a$ and $v_b$ do not have equivalent semantics if their overall similarity is less than θ.

$$sim(v_a, v_b) = \frac{\sum_{k\in\{fun,tag,inp,lab,txt\}} [w_k \cdot sim_{cos}(S_k \in v_a, S_k \in v_b)]}{\sum_{k\in\{fun,tag,inp,lab,txt\}} w_k} \quad (3)$$

$$S(v_a, v_b) \begin{cases} \text{true} & \text{if } sim(v_a, v_b) \geq \theta \\ \text{false} & \text{otherwise} \end{cases} \quad (4)$$

The example method fits the feature weights and similarity threshold. To determine the weight of each feature and the value θ, experiments were conducted a small sample of web pages on the Internet. Websites returned from Discuvver.com (a service that returns a random website) were examined and selected 150 websites that implement responsive web design. For each page, all interactive UI elements (e.g., buttons, inputs, links, drop-down menus) that achieve the same functions on the page, such as links with the same destination were manually identified and groups. These groups were considered the ground truth, representing elements serving the same functionality. The similarity function S was applied to these elements to categorize them into functional groups within the UI. The accuracy of how well the groups identified by S matched the manually determined ground truth was measured. With over a thousand groupings, the weights associated with computing the similarity score (Equation (3)) and the similarity threshold (Equation (4)) were tuned for an optimal accuracy of approximately 97%. To help account for the functionalities whose textual features may slightly differ from the change in design in responsive web design, the groupings also included those with the same functionalities across their respective full-sized and reflow versions. The specific numerical values for the weight of each feature set and the similarity threshold θ are described below.

Detecting responsive accessibility failures is performed by analyzing and comparing the constructed UIIMs (i.e., G and G') and the identified set of functionalities (i.e., $F_G$ and $F_{G'}$) for the PUT. An RAF is defined as those functionalities that are keyboard accessible in the full-sized version but not in the reflow version. The Algorithm in FIG. 18 shows the detection process from line 6 to line 14.

The approach first checks if each functionality $f_G \in F_G$ can be accessed via the keyboard. Those that are keyboard accessible represent the functionalities "available" to keyboard users in the full-sized UI. For each of these "available" functionalities, the example method further analyzes to check if the functionality is also keyboard accessible in the reflow user interface. To do this, the example method first identifies the functionality in the reflow UI (i.e., $f_{G'} \in F_{G'}$) that corresponds to the "available" functionality $f_G$ by matching any functionality that has equivalent features. The equivalent functionality (i.e., $f_{G'}$) is called the counterpart of $f_G$. The example method then checks if this counterpart $f_{G'}$ is keyboard accessible. For those "available" functionalities $f_G \in F_G$ that either have no equivalent counterpart, or whose equivalent counterpart f G is not keyboard accessible, are considered as RAFs.

To determine if a functionality present in the full-sized user interface is also present in the reflow interface, it is necessary to identify the same functionality across these different versions of user interfaces. Automatically identifying the same functionalities across the full-sized and the reflow version of a web page is non-trivial because functionalities in $F_G$ and $F_{G'}$ are, by nature, displayed in different screen modalities. Traditional web analysis techniques have used XPaths as identifiers for elements in the user interfaces. However, because the reflow version may differ in layout and have completely different DOM tree structures, the same functionality can result in different XPaths. Therefore once the UI undergoes reflow and the design changes to another version, certain properties (e.g., XPath, label text, visibility, CSS appearances, etc.) can no longer be relied on to identify the functionalities. In the example reflow detection method, the textual attributes associated with interactive elements of a function are leveraged. The syntax of interactive elements usually remains similar despite changes to its visual-related layout properties after reflow. The example method matches equivalent functionalities between the full-sized and reflow user interfaces using a mechanism similar to the mechanism that matches similar interactive elements, as described in Equation (3).

The approach defines a function S, shown in Equation (5) below, to check if two functionalities (e.g., $f_a$ and $f_b$) are equivalent regardless of which UI they reside in. The function examines the set of interactive elements in the two functionalities (i.e., respectively $V_{sim}^a$, and $V_{sim}^b$) and performs a pairwise matching using the function sim $(v_a, v_b)$ in Equation (3) to check if they are equivalent. The equivalence is determined by checking if the highest similarity score between all the interactive element pairs (i.e., all the ordered pairs $(v_a, v_b)$ in the Cartesian product of $V_{sim}^a$ and $\text{Very}_{sim}^b$) is greater than the value θ.

$$\hat{S}(f_a, f_b) = \begin{cases} \text{true}, & \text{if } \left( \max_{(v_a,v_b) \in V_{sim}^a \times V_{sim}^b} sim(v_a, v_b) \right) > \theta \\ \text{false}, & \text{otherwise} \end{cases} \quad (5)$$

The approach uses this function $\hat{S}$ in line 10 of the Algorithm in FIG. 18 to find $f_G$'s corresponding counterpart in the reflow UI (i.e., $f_{G'} \in F_{G'}$) to further check if $f_{G'}$ is keyboard accessible.

To determine keyboard accessibilities for user interface functionalities, a KeyboardAccessible procedure (line 38 to line 48) in the Algorithm in FIG. 18 is used. The procedure takes a functionality (i.e., f) as the input and examines all associated interactive elements (i.e., $v \in V_{sim}$) to see if any associated interactive elements satisfy the two conditions that make them keyboard accessible. The functionality is classified as accessible if there exists at least one interactive element that passes both conditions below, representing that a keyboard-based user would be able to focus on and activate the given functionality via that element. The two conditions are focusability and actionability.

For focusability, the example procedure first checks if an interactive element is included in the keyboard navigation of the page under test (lines 41 to 43 of the algorithm in FIG. 18). The UIIM is constructed by crawling the user interface with all the possible navigation keystrokes to explore new states. Each time a new state is explored, the approach repeats the analysis to build the sets of nodes and edges (i.e., V and E) for this new state. Therefore, reachability from a UI state's $v_0$ would indicate that a keyboard user can use the standard keyboard navigation keys to put the keyboard focus on the interactive element to access its associated functionality. The procedure performs a reachability analysis on the UI state (i.e., g) where the given functionality's associated interactive element (i.e., v) resides. The analysis examines if v is reachable from the starting point of navigation for keyboard users of the UI state (i.e., $v \in g.V$ can be reachable through the set of directed edges g.E starting from $g.v_0$).

For actionability, an inter-active element v to be accessible is for it to be actionable through the keyboard. A naive way to check this would be to examine if v has a keyboard event handler associated with it. However, it is difficult to correctly identify whether the event-handling function contributes to activating the element to make something happen. The example method overcomes this difficulty by analyzing the UI state and its DOM. During the crawling, any activation can be represented by a change to the visible attributes of the page under test and reflected through the δ Boolean property of the edge. In lines 46 and 47 of the algorithm in FIG. 18, the procedure checks whether executing keystrokes Enter or Space, would also cause such a change to δ. An edge whose ϕ is either Enter or Space, with a δ=true indicates that after the focus is set on the element, a keyboard user can activate their underlying functionalities to trigger a reaction using these activation keystrokes.

In FIG. 17A, the RAFs in the header of the page are represented by the shaded dotted ovals 1714 and 1716 (i.e., the functionalities associated with "News" and "Community"). While these functionalities are reachable from the starting navigation point (i.e., $v_0$) in the full-size UIIM 1700, they are not reachable in the reflow UIIM 1750 in FIG. 17B. This is because the hamburger menu element represented by an oval 1782 is not accessible; therefore, the derived UI state designated as the large bubble 1762 ($g_\phi$) (where these functionalities reside) is never explored via the keyboard. Although the help/support functionality is also under this unexplored UI state 1762, it can be reached via the "Support Request" (equivalent in gØ) link and is not a RAF.

To assess the effectiveness and usefulness of the example reflow detection method, an evaluation focusing on the following three research questions was conducted: RQ1. What is the accuracy of the example method in detecting RAFs in web pages?; RQ2. How fast is example method at detecting RAFs?; and RQ3. How impactful are the RAFs that were detected?

The example method may be embodied as a Java-based prototype tool called responsive Accessibility failure Detector (SALAD). The example tool utilized the Selenium (ver. 3.141.5) WebDriver API to drive a Firefox browser (ver. 92.0) to render the page under test in different display modalities. The full-sized version of the PUT is rendered by setting Firefox's viewport dimension to 1280×1024, while the reflow version of the PUT is rendered at the viewport dimension of 320×1024. Evaluating at viewports of 1280px and 320px follows the WCAG evaluation protocol and is considered the industrial standard in testing for SC 1.4.10 (i.e., reflow) violations.

The Selenium WebDriver was used to (1) execute keyboard-based actions to interact with the rendered PUT and (2) execute JavaScript to analyze the functionalities' properties from the user interface of the page under test, to construct the UIIMs. For the UI exploration, a maximum depth of five was set to terminate the crawling process for the practicality of evaluation. The weights for the similarity function presented in Equation (3) and the similarity threshold (i.e., θ) in Equation (4) used in the paper's evaluation were the following: $w_{fun}=0.45$, $w_{tag}=0.14$, $w_{inp}=0.18$, $w_{lab}=0.14$, and $w_{txt}=0.09$. θ=0.98. These values were found most effective and were determined via the experiment. The setting is configurable, allowing the user of SALAD to select a threshold that best fits the desired trade-off between the number of false positives and true negatives reported by the tool.

The approach made use of the deeplearning4j (dl4j) library to carry out NLP-based operations (e.g., pre-processing the extracted textual data using tokenization and stopword elimination) and build a Word2Vec model, which is then used to measure the co-sine similarities between functionalities. The evaluation was run on an AMD Ryzen Threadripper 2990WX with 64 GB memory running 64-bit Ubuntu Linux 18.04.4 LTS.

The evaluation was conducted on a dataset of 62 subject web pages selected from the Moz Top 500 most visited website list and the artifacts of two related works: ReDeCheck and KAFE. The subject web pages from the Moz Top 500 were randomly selected based on the WCAG-EM sampling strategy, with an aim to collect a representative sample of real-world, live web pages. The identified set of sample web pages includes common web pages of the websites with varying styles, layouts, structures, and essential functionalities. Page size averaged 273 UI elements with a minimum, maximum, and median of 19, 4013, and 165 elements, respectively. An initial set of 126 web pages from the three sources were gathered, with 40 subjects being acquired from the Moz Top 500, 26 from ReDeCheck's evaluation dataset, and 60 from KAFE's evaluation dataset. From the initial set, 7 subjects were filtered out that were either not designed according to responsive design principles, falling outside the scope of the study, or could not be executed due to issues with the cached versions of the subjects from the related works. From the filtered set of 119 subjects, 47 subjects were selected that were found to contain RAFs. An additional 19 subjects without any RAFs were selected from the filtered set to account for potential false positives. Lastly, from the chosen set of 66 subjects, 4 subjects on which SALAD could not be run due to issues with the Selenium WebDriver API being unable to properly interact with the web page were excluded. Thus, the finalized resultant set of subjects consisted of 62 web pages: 19 from the Moz Top 500, 9 from the evaluation of ReDeCheck, and 34 from the evaluation of KAFE.

The ground truth for a given subject web page was built by following the testing procedure described in WCAG Technique F102. In particular, manual interaction with the full-sized and the reflow versions of the web page was performed and functionalities that existed in the full-sized version but were either absent or inaccessible in the reflow version were identified. Any such functionalities were recorded as RAFs. After the two independent sets of ground truths were completed, the discrepancies between their respective sets were identified by researchers. The two researchers had a high agreement (99%), with only five discrepancies being identified where a third researcher acted as a validator to resolve these discrepancies. In total, the subjects contained 559 RAFs, with an average of 13 RAFs per subject that was found to have contained RAFs.

Four state-of-the-art tools, ReDeCheck, KAFE, Qualweb, and WAVE, were compared for performance evaluation of the example SALAD tool. ReDeCheck, KAFE, and Qualweb were selected from popular accessibility testing tools described in previous literature, and WAVE was selected from the Web Accessibility Evaluation Tools List.

Since none of the four known tools directly detected RAFs, the results from the known tools were interpreted in a way that would be most successful in detecting RAFs while not including in the accuracy calculation, detections of other types of accessibility issues that could, by definition, not be RAFs. Since ReDeCheck reports relative layout failures at different viewports, the results at the viewport equal to the reflow version (i.e., 320 pixels) were considered, and then evaluated reported failures against the RAF ground truth. For KAFE, which detects specific types of keyboard accessibility issues, all issues reported by the tool were evaluated against the RAF ground truth. Finally, for Qualweb and WAVE, only the results for the subset of WCAG guideline checks that dealt with keyboard or reflow-related accessibility failures were evaluated.

The effectiveness of SALAD was measured by evaluating how accurate, in terms of precision and recall, SALAD was in identifying RAFs and comparing the results against those of the ReDeCheck, KAFE, Qualweb, and WAVE tools. Precision was calculated by dividing the total number of correctly identified RAFs by the total number of RAFs that the tool identified. Recall was calculated by dividing the total number of correctly identified RAFs by the total number of RAFs in the ground truth for the tool.

Figures 19, 20:
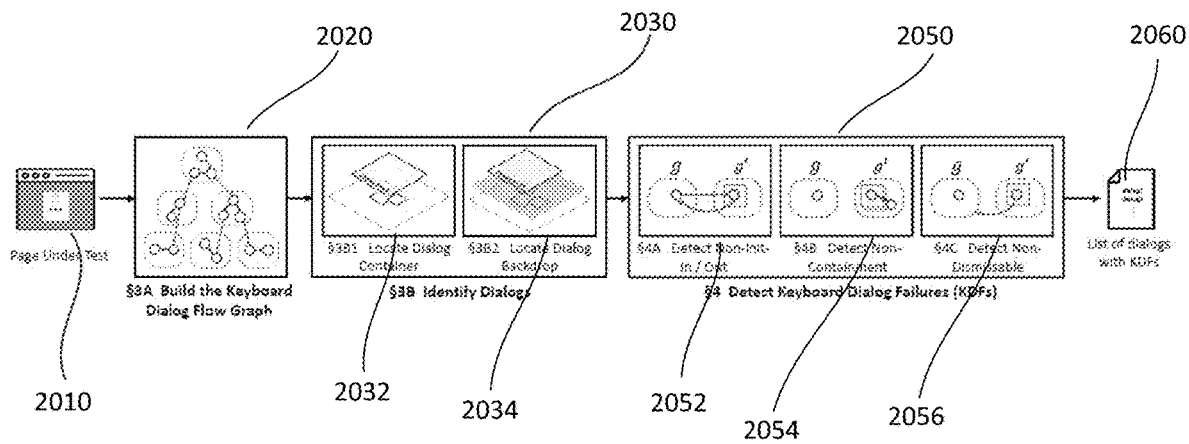
FIG. 19 shows tables with results of the evaluation of the example reflow accessibility failure detection method.
FIG. 20 is a workflow diagram of the process for detecting dialog accessibility failures, according to one or more embodiments of the present disclosure.

FIG. 19 shows a table 1900 that summarizes the precision and accuracy of SALAD against the four known tools. SALAD achieved a precision of 85% and a recall of 94%, which outperforms the other four evaluated state-of-the-art tools. Out of the total 559 RAFs in the subjects, SALAD was able to correctly detect 526 (94% of all RAFs). ReDeCheck and KAFE failed to produce an output on a number of different subject web pages, 5 and 6, respectively. Thus, their precision and recall are derived solely from the results of the subjects on which the tools could produce an output.

To answer the RQ2, the running time of all the tools on each subject web page was measured. The running time of SALAD, ReDeCheck, and KAFE included the time required to input a subject and run the respective tool. The running time of WAVE and Qualweb consisted of the time elapsed from the initial interaction with the respective tools browser extension to when the results were displayed. FIG. 19 shows a table 1950 that shows the runtime performance for the example SALAD tool compared with the other four tools with each cell representing the average and median runtime per subject. For the results for SALAD and KAFE, the runtime was split into two parts. A "Modeling" row 1952 represents the time spent constructing the UIIM and exacting the contained interactive semantics of all interactive elements on the web page. A "Detection" row 1954 refers to the time spent on analyzing keyboard accessibility, loading the language model, grouping the interactive semantics into functionalities, and matching the available functionalities across the two versions of the UI. The other tools do not build models but, instead, statically analyze the web page. Thus, their time spent on modeling is marked as "n/a." SALAD has the slowest runtime with an overall average of 62:55 minutes and a median of 24:32 minutes per subject.

The run-time of SALAD was slower than the other approaches due to the overhead of initializing the necessary environment for its analyses. Approximately 85% of the total time was spent on the modeling phase, and only 15% was on the detection phase. The run-time breakdown of each step in SALAD was analyzed finding that the model construction spent an average of 67% (26 mins) of the time initializing the subject proxy and WebDrivers; 3% (1 min) of the time extracting and building nodes from UI elements; 26% (10 mins) of the time crawling the UI to build navigation edges; and 5% (2 mins) of the time extracting the semantics of UI functionalities. For the detection phase, 92% (2.5 mins) of the time was spent loading and initializing the language model.

Since SALAD is fully automated, it can be optimized by running unattended on multiple machines or deploying Selenium's processing across multiple cloud computing instances. The longer runtime of SALAD is a tradeoff for a significant improvement in its detection accuracy and its ability to find a much larger number of issues.

To address RQ3, the impact of the detected RAFs was examined from two perspectives: (1) how essential an identified missing functionality is to the overall usage of a subject web page (referred to as essentiality) and (2) how the RAFs manifested in a subject web page (referred to as manifestation). To determine the essentiality, two researchers examined the functionality associated with each RAF and determined how essential it was to the scope of the subject. The scope of a subject was determined by following Step 1.a of the WCAG-EM. RAFs were classified into one of three categories: supportive, important, or crucial. The supportive category included functionalities that directly provide access to additional information to the user, such as a link to privacy policy or the ability to share content on a social media platform. The important category included functionalities that provide an essential function or information to the user but are not necessary to meet the designated purpose of the web page. An example of an important RAF is a "Get Help" button or a link to the homepage of a website. Lastly, the crucial category included functionalities that may prevent the primary purpose of the web page from being fully achieved if absent. For example, an RAF consisting of the functionality that allows a user to log in is categorized as crucial. If any discrepancies in the essentiality categorization procedure arose between the two researchers, then a third researcher was consulted until a consensus could be reached.

To determine manifestation, every RAF detected by SALAD was manually examined and categorized into one of two categories: completely-missing or inaccessible. The completely-missing category included functionalities from the full-sized UI that were found to be absent in the reflow UI. The inaccessible category included functionalities from the full-sized UI that also exist in the reflow UI, but were not accessible via the keyboard.

The results of the essentiality categorization are the following: 29 crucial, 189 important, and 308 supportive RAFs. The functionalities of the crucial RAFs varied based on the purpose of the containing web page, but included functionalities, such as search and login, that could have a significant impact on the user experience. For example, a crucial RAF in the subject discordapp removes the ability to log in. Specifically, the login feature is unavailable to a keyboard-based user in the reflow version due to the associating elements completely disappearing from the UI. This prevents users from accessing the web page's primary goal of sending messages, which can only be done once logged into their account. Another example of a crucial RAF is in the subject wiktionary where users navigating the page via the keyboard cannot search for a dictionary of a specific language of their choosing. The loss of the language search functionality makes finding a dictionary of a language other than English much more time-consuming and tedious.

RAFs in the important category many times prevented people who use keyboard-based assistive technologies from accessing useful information. For instance, a keyboard-based user navigating the reflow version of the subject web page raise is unable to access the FAQ page, which includes answers to commonly asked questions by new users and other important information such as the ability to contact support related to the website's usage. Another example involves the shutterstock subject web page, where direct access to information concerning different paid plans disappears in the reflow version.

Most of the RAFs detected by SALAD fell into the supportive category. Despite being supportive in nature, the absence of supportive functionalities can hinder disabled users from accessing the same level of information and services as their able-bodied counterparts. For example, access to the data and privacy policy is entirely missing from the reflow version of the subject venmo web page. Similarly, access to valuable educational information about earthquakes is entirely missing in the reflow version of the subject usgsgov web page.

For the manifestation categorization, 403 (77%) of the detected RAFs by SALAD manifested as completely-missing and 123 (13%) manifested as inaccessible. Upon further investigation, completely-missing RAFs typically occur when the browser rendering engine switches to a CSS style sheet specified for the reflow viewport, where the rendering engine then hides the associated interactive element(s) via the display:none property. This, in addition to the prevalence of completely-missing RAFs, suggests that, whether intentional or not, additional screen space is favored over the inclusion of more features, which can frequently lead to violations of WCAG success criterion 1.4.10. For example, in the subject cloudflare, the functionality to change languages completely disappears from the UI in favor of a clear header bar. Regarding the inaccessible category, a little over 95% of the inaccessible RAFs still exist on the web page but are simply hidden under an inaccessible drop-down menu. For example, all of the RAFs detected in the subject gizmodo are inaccessible due to a non-keyboard navigatable hamburger button, which appears in the reflow version as a substitute for the full-sized header bar. Furthermore, in almost all cases of inaccessible RAFs, the inaccessible elements that cannot be navigated also lack keyboard event handlers to make them actionable, which may imply that developers often overlook keyboard accessibility completely during implementation.

Detecting Dialog Failures

Another feature of the example method is detection of dialog related accessibility errors. There are three types of problems: non-initialization-in dialogs/non-initialization-out dialogs; non-containment dialogs; and non-dismissible dialogs. The general keyboard navigation model is used along with modeling (features) to detect these dialog related problems. User interface states are determined and the keyboard navigation is analyzed whenever there is a change to the UI state. The visual properties of UI states are modeled and heuristics are used to identify which of the UI state changes are.

As explained above, keyboard usage is one of the foundational requirements for web accessibility and is reflected in W3C Web Accessibility Initiative (WAI)'s Web Content Accessibility Guidelines (WCAG) 2.1. When interacting with a web page using a point-and-click (PNC) device, every web control element. (i.e., a hyperlink) is available to be accessed randomly. However, when interacting a web page using a keyboard-based device, such access is sequential and depends on the keyboard navigation sequence. For example, during keyboard navigation, the user executes the Tab command to advance the keyboard focus to the next (or Shift+Tab to go back to the previous) control element. The actuation keys (Space or Enter) are then used to activate the element that is currently in focus (e.g., tick a checkbox or activate a dialog). When a user prompt or dialog is activated, the Esc key is then used to exit/dismiss the active dialog.

A dialog informs users about a task and can contain critical information or require decisions. It is commonly used in modern single-page applications (SPAs) to display information on the same web page without unnecessary page reloads. Based on UI/UX design principle, a dialog can be classified as either a modal or a modeless dialog. A modal dialog is defined when the current UI is in a special state/mode that disables the main page content outside of the active modal dialog window until it is attended to. For web modal dialogs, the common UI pattern design visually obscures or dims the background page beneath. On the other hand, a modeless dialog's design does not obscure the background because it allows users to continue interacting with the background page content while the dialog is open.

Web dialogs can be triggered via keyboard navigation as well as via PNC navigation. However, due to the sequential (non-random) nature of keyboard-based navigation, the way a dialog's content is added/removed to/from the keyboard navigation flow (with respect to the entirety of the page) needs to be seamless and intuitive. Incorrect implementations of dialogs can break the linearity of keyboard interaction and result in a navigation that is not sequentially consistent or intuitive with the meaning of the content. According to W3C. losing one's place in the content during navigation can negatively affect users who have limited short-term memory, perceive a narrow field of vision, use a screen magnifier, or require a physically challenging way to perform keyboard actions, such as using their eyes or tongue.

The example method for detection of keyboard dialog failures (KDF)s addresses the three types of dialog KDFs that are defined under WCAG Success Criterion (SC) 2.4.3 and ARIA Authoring Practices Guide (APG). These are all of the KDFs defined by W3C. None of these KDFs have been directly addressed by state of the practice or state-of-the-art tools.

The first type of KDF is focus non-initialization in/out dialog. This KDF occurs in general when dialogs are introduced or discarded during keyboard navigation and the keyboard focus is not positioned with respect to the control that activated the dialog. According to WCAG, the position of dialog in keyboard navigation has to be adjacent to its trigger control in the sequential navigation order.

Non-initialization-in KDFs manifest when the focus is not set to an interactive element contained in a dialog when the dialog is activated. For example, a modal dialog may be triggered by a "Sign In" button. However, instead of automatically directing the keyboard focus to the "Username or email" input upon triggering the dialog, the focus continues to follow the subsequent elements in the background page, following the trigger element in the Document Object Model (DOM).

Non-initialization-out KDFs manifest when the focus is not returned to the element that invoked the dialog after the dialog is dismissed. For example, when dialog is dismissed, the keyboard focus should automatically return back to the element that triggered the dialog. However, in certain web pages, the immediate element to receive focus after dismissing the dialog is the page icon at the beginning of the page's DOM. When the focus is not directed to/from the dialog when it is inserted to the web page's navigation, the linearity of the flow is violated, which can confuse non-sighted keyboard users.

A second type of KDF is non-containment dialog that occurs during keyboard navigation when the keyboard focus is not limited to the elements within an activated modal dialog. Modal dialogs are designed to overlay and interrupt the current web application process to prompt users for a required response. Thus, modal dialogs prevent users from interacting with the content behind the modal dialog until it is dismissed. According to W3C, modal dialogs should not provide means for moving keyboard focus outside the dialog window without closing the dialog. For example, modal dialog may be triggered by a "Log In" button. Upon activating the dialog, the keyboard focus is automatically set to the first interactive element inside the dialog (in some web pages, a focus non-initialization KDF does not exist). However, the focus navigation is not confined within the dialog itself. When the user navigates forward via Tab through the contained elements, instead of looping from the last focusable element in the dialog to the first focusable element in the dialog, the focus continues to follow the elements in the DOM, exits the dialog, and loops back to the beginning of the background page to the page icon (first focusable element), all while the dialog is still open. Such non-containment KDFs may cause screen-reader keyboard users to become disoriented or confused when the content can be read from behind a modal dialog window.

A third type of KDF is non-dismissible dialog that occurs during keyboard navigation when a dialog cannot be dismissed after it is activated. According to W3C, a dialog should be dismissible via either activating Esc or a designated button in the dialog. There are two possible ways a non-dismissible KDF can manifest. The first way is when a keyboard user cannot dismiss the dialog by pressing Esc when navigating inside the dialog. The second way is when a designated user interface control that is used to dismiss the dialog is not accessible to the keyboard. For example a modal dialog's customized dismiss button may be implemented using a<span> element, which is by default, not accessible to the keyboard. While a PNC user can dismiss the dialog by mouse-clicking on it, a keyboard-based user would not be able to do so via a keyboard. In addition, in this example, no mechanism is implemented to dismiss the dialog (e.g., pressing Esc on the elements within the dialog). This modal dialog therefore, remains open and can trap the keyboard focus, which prevents the user from returning to the main page's content.

FIG. 20 is a workflow diagram of the example method for determining dialog type keyboard failures. A page under test (PUT) 2010 is provided. The PUT 2010 is analyzed to construct a model of keyboard navigation and dialog flow called the Keyboard Dialog Flow Graph (KDFG) (2020). The KDFG represents the different ways a keyboard user can navigate a web page's UI. The KDFG is then analyzed to identify dialogs that can appear in the PUT. The method then identifies dialogs from the KDFG (2030). Specifically, the dialog container is located (2032) and the dialog backdrop is located (2034). The routine then detects keyboard dialog failures from the model and located dialogs and backdrops (2050). Specifically, the routine determines non-initialization in/out failures (2052), non-containment failures (2054), and non-dismissible failures (2056). The routine outputs a list of dialogs with the failures (2060).

Figure 21A:
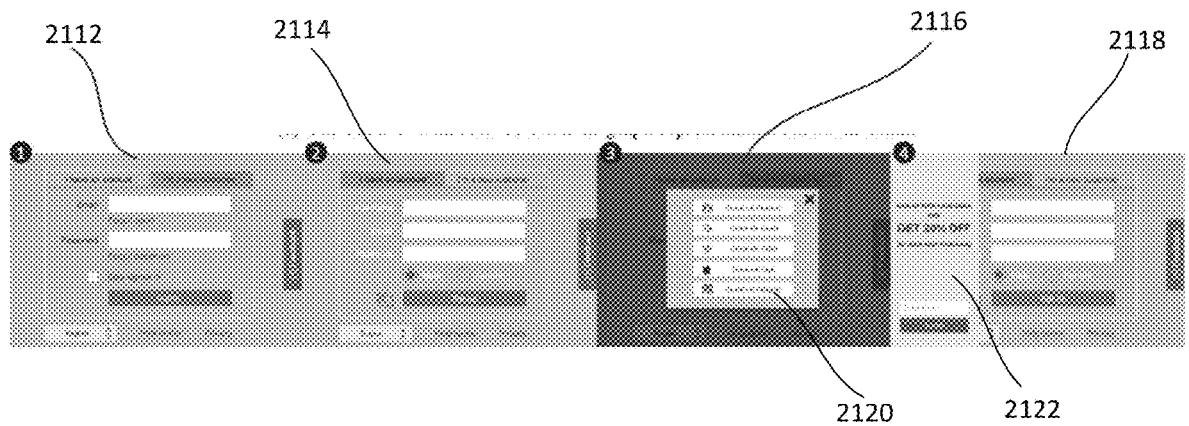
FIG. 21A is a series of screen shots of user interfaces with potential dialog accessibility failures.
Figure 21B:
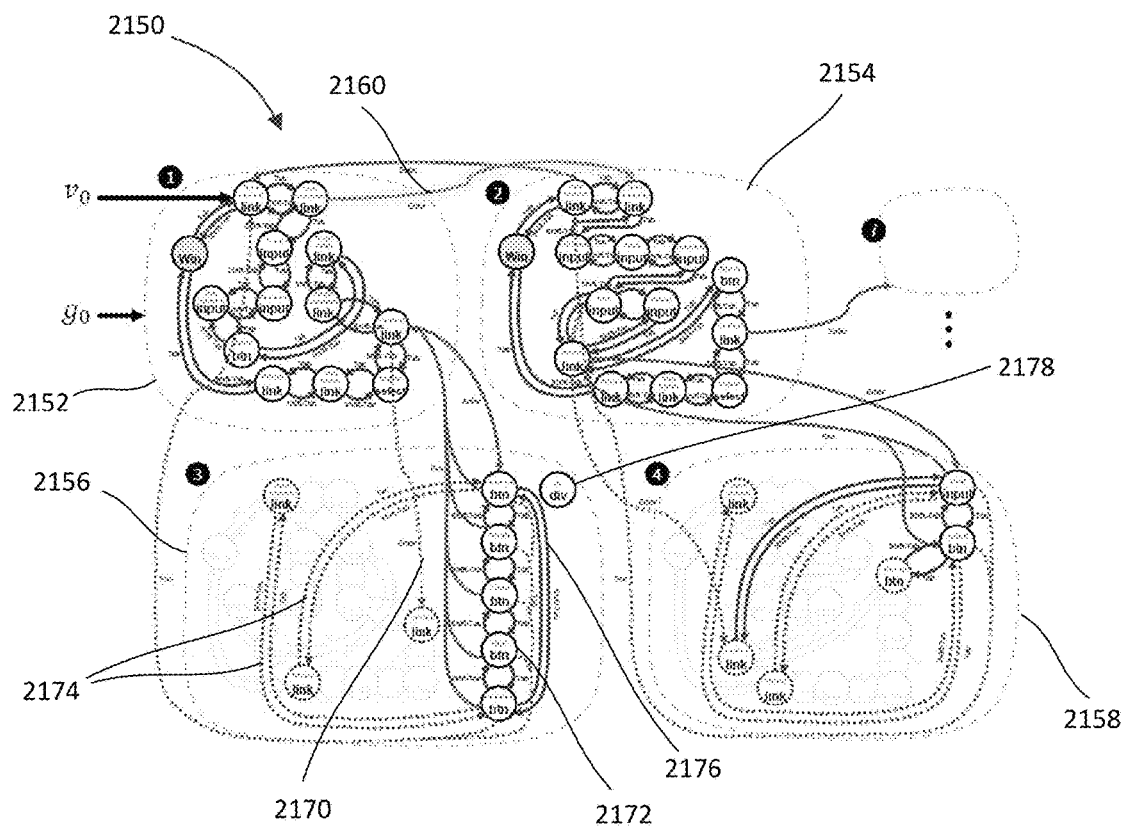
FIG. 21B is a model keyboard dialog flow graph of the user interfaces in FIG. 21A, according to one or more embodiments of the present disclosure.

FIG. 21A shows an example web page with four user interfaces 2112, 2114, 2116, and 2118. FIG. 21B shows a simplified version of a KDFG 2150 of the user interfaces 2112, 2114, 2116, and 2118 in FIG. 21A. The KDFG 2150 shows the corresponding states of the user interfaces 2112, 2114, 2116, and 2118 in respective dashed bubbles 2152, 2154, 2156, and 2158. Intra-state edges are shown in solid lines within the bubbles 2152, 2154, 2156, and 2158 and inter-state edges are shown in solid lines between the bubbles 2152, 2154, 2156, and 2158. The bubble 2152 state ($g_0$) and the bubble 2154 represents states with no dialogs as shown in the interfaces 2112 and 2114 in FIG. 21A. The state represented by the bubble 2156 contains a modal dialog as shown in a dialog popup window 2120 displayed on the interface 2116. The state represented by the bubble 2158 contains a modeless navigation drawer type dialog 2122 that permits interaction with other elements in the interface 2118. For example, the UI state represented by the bubble 2152, in which users can activate the "I'm a new customer" tab menu in the interface 2112 via Enter to expose a new set of controls (i.e., "Full Name" text input, etc.). The appearance of these new controls means a new interstate edge has been identified that connects the link element New Customer in the state 2152 to the link element New Customer in the state 2154 and places the focus on the tab menu in the new state. This example particular inter-state edge is shown as a highlighted line 2160.

The keyboard navigation and dialog-related properties of a PUT are represented by the Keyboard Dialog Flow Graph (KDFG) such as the KDFG 2150. A KDFG is formally defined as a tuple $\langle G, v_0, \Phi \rangle$. In this tuple, G represents the set of keyboard navigation states the PUT can be in based on a user's keyboard inputs, $v_0$ represents the entry node of the PUT, which is the HTML element that receives the initial keyboard focus when the PUT is rendered in the browser, and $\Phi$ is the set of actions that could be carried out by a keyboard-based user (i.e., {Tab, Shift+Tab, Enter, Space, Esc}). The example method does not define complex actions, such as inputting alphanumeric strings. These are not defined as part of the standardized keyboard accessibility testing process. Each keyboard navigation state of the PUT $g \in G$ is itself a graph that represents both the HTML elements available to a user and the way a user can navigate among them using the keyboard. Formally, the state is defined as a directed graph of the form $\langle V, E \rangle$, where V, the node set, represents the HTML elements visible in the state and E, the edge set, represents the corresponding keyboard navigation flow among the interactive elements in V.

A directed-edge $e \in E$ is defined as a tuple $\langle v_s, \phi, v_t \rangle$, indicating that when a source node $v_s$ is in focus, the browser's keyboard focus shifts to a target node $v_t$ by pressing key $\phi \in \Phi$. In the case where no new UI state results from executing the key press $\phi$, the edge is an intra-state edge. In cases where $\phi$ causes a new set of HTML elements to be visible, the edge is an inter-state edge since the action also causes the user to transition to a new keyboard navigation state. Formally, the symbol $p(v)$ is used to represent the containing state of a node $v$, so $g=p(v)$ if $v \in g \cdot V$. In the case of an inter-state edge $p(v_s) \neq p(v_t)$. The KDFG can be constructed using standard client-side crawlers that can support keyboard actions.

Automating identification of dialogs in a page under test is challenging because there is no standardized way to implement dialogs in web pages. Dialogs can be implemented in a variety of ways, such as Bootstrap's modal, various lightbox plugins, the HTML5<dialog> element, or static custom scripted content. Since each framework uses its own technology and code structure, there are no implementation patterns that can be readily identified using static analysis techniques. Therefore, the example method for detection of dialog KDFs defines mechanisms for identifying visual properties that are common to dialogs regardless of their underlying implementation mechanism.

The example method analyzes the KDFG generated from the web page and produces a mapping D(g) that maps each user interface state g to the set of dialogs contained in that state. To compute this mapping, a breadth-first traversal is performed through all of the inter-state edges in the KDFG. The example method iterates over only the inter-state edges because, by definition, the appearance of a dialog causes new elements to become visible, meaning that a new state has been defined. For every inter-state edge e, the new HTML elements that have become visible are identified. The new elements are analyzed to see if they define a dialog and if so, then the dialog and page are analyzed to see if the dialog is modal or modeless. By comparing the states of each inter-state edge, the example method can identify whether a dialog has been added or removed from the user interface and use that information to define the mapping, D(g).

The example method identifies overlapping dialog containers by analyzing a set of elements that have been added to the page to determine if they represent a dialog. There are two parts to this analysis. In the first part, whether a candidate dialog container has appeared is identified. A dialog container is an element that is able to contain the visual elements of a dialog. In the second part, whether the candidate dialog container overlays (i.e., appears in front of) the other elements in the user interface are determined.

The example method then identifies the candidate dialog container (2032). This is based on the fact that regardless of the underlying framework used to implement a dialog, the end result must cause an HTML element (e.g., div or iframe) to appear that itself contains the visual elements of a dialog. This element must also become (in)visible to make the dialog (dis)appear. In HTML/CSS, such elements will have certain properties that may be leveraged to identify the dialog container. The first such property is that a dialog container must have a block-based property. Such a property renders a container-like structure that has properties like width, margin, border, height, and padding, which specifies the display behavior of a dialog. Therefore, (1) any element that changes visibility whose display property changes from hidden to block may be identified, or (2) any block-based element whose hidden property changes from true to false may be identified. Since there may be multiple such block-level elements within a dialog (depending on the web implementation), the candidate dialog container with the largest Minimum Bounding Rectangle (MBR) is taken. This ensures the container is the container that encloses all of the content inside of the dialog.

The example method checks whether the rendering overlays the other elements in the page after identifying a potential dialog container. This check takes advantage of the almost universal practice of rendering dialogs in front of other elements. Simply analyzing the container's z-index property is insufficient because the painting orders defined by the CSS Positioned Layout do not necessarily render elements with larger z-indexes above lower ones. Therefore, a process is used that models the way a browser's rendering engine draws the layers of visible elements on the screen. This model is called the Stacking Model (SM). At a high level, the stacking model represents the standard stacking rules used to create a hierarchy of available stacking contexts for the user interface. Given two elements, the SM determines which element dominates (renders above) the other by comparing their stacking order with respect to their stacking contexts formed along the way up the DOM tree structure. The example method first identifies those elements in the preceding UI state whose MBR collides with the container's MBR in the succeeding UI state. The SM is used to determine if the newly visible elements in the container are stacked on top. If an element in the container is rendered on top of another element that is at its location, then the container is considered to be a dialog.

The example method checks whether a dialog backdrop exists (2034) to determine whether an inserted dialog is a modal or a modeless type dialog. Most implementations of modal dialogs follow the UI/UX design principle of rendering a modal dialog in front of a semitransparent backdrop that overlays the browser's viewport. The intent of a backdrop is to completely fade out all elements of the page to provide a visual cue that a modal dialog requires an action in order for the page to proceed. The example method identifies a backdrop if it satisfies the size and transparency properties described below.

Since a backdrop will obscure all elements of a page, the MBR of a backdrop element will cover almost the entire browser viewport. Therefore, each potential backdrop element is examined to see if its size is within a threshold of the browser's viewport size. A threshold is utilized to account for when (1) scroll bars may still be visible in the browser, and (2) when the backdrop element is set to full-width to fit within a max-width container of a navigation panel. 100 web pages with modal dialogs were examined, and based on the examination standard scrollbars typically take up 2% of the width/height of a page and customized scrollbars take up to 4-5% of a page. Therefore, 90% was chosen as a safe upper bound of the maximum width/height, which did not introduce any inaccuracy into the analysis.

The example method also checks whether a possible backdrop element is a UI component that visually exhibits semi-transparency. By design convention, a modal dialog's backdrop is semi-transparent in order for the obscured background UI to be semi-visible. Based on the rules of web rendering, an element can be transparent if it has a final computed CSS (1) opacity property or (2) background-color property with an RGBA alpha value of less than 1.0 (100%). In most cases, the transparency of an element can be detected by these two CSS attributes. However, developers may also use CSS transitions to animate the backdrop's transparent appearance over a time interval to exhibit a fading effect. Thus, the example method also checks for CSS properties, such as will-change and transition-property: that alter the element's opacity during the state transition.

To perform the detection of Keyboard Dialog Failures (KDFs) (2050) in FIG. 20, the approach analyzes the keyboard navigation based on a KDFG model and the dialogs identified based on the mapping. The example method uses a formalized non-initialization-in/out detection algorithm shown in FIG. 22 to detect non-initialization type KDFs. Non-initialization type KDFs can be either "non-initialization-in" or "non-initialization-out" failures. The types of KDFs represent when the keyboard focus is not directed into or from a dialog when a dialog is inserted or removed from the keyboard navigation of the page under test.

To identify "non-initialization-in" failures, the intuition is to see if the keyboard focus does not move inside of the dialog after it is activated. In order for an "non-initialization-in" failure to occur, three conditions must hold true. The first condition is that a dialog has to appear in the UI. Thus, those edges that represent a UI state transition where a dialog is added are examined. These edges are identified where the number of dialogs in its target state is more than those in its source state (line 4) of the algorithm in FIG. 22. The second condition is that the focus after the dialog appears is not on a node that is inside of the dialog. Thus, the newly inserted dialog d is identified by taking the difference between the set of dialogs in the target state with those in the source state (line 7 of the algorithm in FIG. 22). Once d is identified, all the nodes that are inside (i.e., $V_d$) are found, and a check is performed whether the target node of the edge that triggered the dialog state is in $V_d$ (line 10 in the algorithm in FIG. 22). Per W3C, if the focus does not automatically shift onto a dialog node, it is still considered accessible as long as the user can navigate sequentially onto a dialog node. Therefore, the third condition is for the focus not to be in the dialog after advancing the focus in the sequential navigation via Tab. This condition is checked by examining the target node of the UI transition edge to see if it does not have an outgoing edge with $\phi$=Tab whose target node is inside $V_d$ (line 12 in FIG. 22). If all three conditions apply, then the inserted dialog is considered to have an "non-init-in" type failure (line 13) in FIG. 22.

To identify "non-initialization-out" failures, the intuition is to check, after the dialog is dismissed, if the focus does not return to the original trigger that activated the dialog. In order for an "non-init-out" failure to occur, three conditions must hold true. The first condition is that a dialog has to be dismissed in the UI. This behavior can be identified by examining those edges that represent a UI state transition where a dialog is removed when the number of dialogs in its source state is more than those in its target state (line 5 in the algorithm in FIG. 22). The second condition is for the focus not to return to the trigger node that originally opened the dialog that is dismissed. To check for this, the algorithm first identifies the edge that originally inserted the dialog as $e_\phi$ (line 15). The goal of finding $e_\phi$ is to find the original trigger node $v_\phi$ that activated the dialog. $v_v$ is identified as the source node of $e_\phi$ (line 17 in the algorithm in FIG. 22). The algorithm in FIG. 22 checks if the target node of the edge that dismissed the dialog is not $v_\phi$, which implies that the returned focus is not on the original trigger node (line 19). In the case where multiple cascading dialogs may be dismissed with one action, the approach selects the first inserted dialog as the one to check for. This is because this first dialog's trigger node is the point of return into the main page for the set of these multiple cascading dialogs. Following W3C's principle, the third condition is for the focus not to be put on ve after advancing the focus backward in the sequential navigation order via Shift+Tab. In other words, it checks if the element in focus after the dialog is dismissed (i.e., $e_{out} \cdot v_t$) does not have an outgoing edge with $\phi$=Shift+Tab whose target node is $v_\phi$ (line 21). A dismissed dialog is considered to have an "non-init-out" type failure if it satisfies all three conditions (line 22 in the algorithm in FIG. 22).

In FIG. 21B, non-initialization KDF edges are portrayed with dotted inter-state lines (e.g., a dotted line 2170 between state 2152 and state 2156) that either do not direct the focus from the dialog trigger $v_{feedback}$ in state 2152 into one of the six elements 2172 in the dialog in state 2156 or vice versa. Thus, the dotted line 2170 represents a non-initialization-in KDF. The example inter-state edges, shown in solid lines between the state 2152 and the state 2156, represent the ideal conforming behavior where the focus is properly initiated inside of the dialog and out back onto the dialog trigger.

To detect non-containment type KDFs, the goal is to identify whether the keyboard focus is not confined to the elements within an activated modal dialog during keyboard navigation. The formalized non-containment detection algorithm is shown in Algorithm 2 in FIG. 23. In order for a non-containment type KDF to occur, two conditions must hold true. The first condition is for a modal dialog to exist. To check for this, all of the interstate edges that add a dialog to the UI as a result of their state transition are identified (this is the same set of edges that is found in line 4 of the algorithm in FIG. 22). For every such inserted dialog d, the example method checks for the existence of a backdrop to determine if it is a modal dialog (line 6 of the algorithm in FIG. 23). The second condition is whether a navigation that would take the keyboard focus from a node within the dialog to a node that is outside of the dialog exists. To check for this condition, the set of nodes $V_d$ that are contained in the modal dialog is identified (line 7 in the algorithm in FIG. 23). The set of complementary nodes $\overline{V_d}$ in the UI state are found by taking the difference between the set of nodes in the visible state and those that are in the dialog (i.e., $V_d$) (line 8 in the algorithm in FIG. 23). $\overline{V_d}$ represents the set of nodes outside the modal dialog. Next, the example method iterates through the edge set of this modal dialog's state to identify those intra-state edges whose source node is in $V_d$ and whose target node is in $\overline{V_d}$ (lines 10-12 in the algorithm in FIG. 23). Any such edge exemplifies that the keyboard focus is not bounded within the dialog's control elements, thus a non-containment failure.

In FIG. 21B, non-containment KDF edges are portrayed as the dashed lines 2174 for intra-state edges in state 2156 that cross the focus from the first/last node inside the dialog into a node in the background page (i.e., $\nabla_d$). The solid intra-state edges represented by solid lines 2176 between the nodes $v_{facebook}$ and $v_{instagram}$ represent the ideal conforming behavior where the focus loops within the content of the modal dialog.

To detect non-dismissible type KDFs (2056), the goal is to identify whether an activated dialog can be dismissed via keyboard navigation. The formalized detection algorithm is shown in a non-dismissible detection algorithm in FIG. 24. In order for a non-dismissible type KDF to occur, two conditions must hold true. The first condition is for there to be an existing dialog. This can be identified via an inter-state edge that inserts a dialog as in line 4 of the algorithm in FIG. 22. The second condition is to check if the existing dialog can be dismissed. The dialogs in each UI state g are represented by the set D =D(g). The goal is to find if there exists a way to navigate from the UI state of an inserted dialog d to another UI state where d no longer exists in that state's D. To check for this, the target node of the inter-state edge, which is the initial node to receive focus in the dialog state is denoted as $v_{d0}$ (line 6 of the algorithm in FIG. 24). The approach then employs a graph reachability analysis to check if there exists a navigation path in the KDFG that can lead the keyboard focus from $v_{d0}$ to a UI state in which the inserted dialog is removed. Thus, the example method approach examines if there exists a node that is reachable from $v_{d0}$ that also resides in a state in which the corresponding dialog is not present (lines 9-10 in the algorithm in FIG. 24). A dialog d is considered dismissed from a state g if it is no longer present in the state's set of dialogs D.

In FIG. 21B, a dismissal node (i.e., $v_{[x]}$) 2178 in the state 2156 does not have navigation that can facilitate returning the focus from the state 2156 back to the state 2152. This is because the $v_{[x]}$ node 2178 is both (1) unable to receive keyboard focus (i.e., not reachable via navigation); and (2) lacking the appropriate keyboard event handling that activates the dialog's dismissal (i.e., no outgoing edge with actions Enter or Esc coming out of $v_{[x]}$ node 2178 that transitions to a state where the dialog is dismissed). The state 2156 can contain a non-dismissible type KDF if its set of six dialog nodes 2172 do not include any of the either dotted or solid inter-state edges whose $\phi$=Esc. The lack of these edges would indicate that the user would also not be able to dismiss the dialog via Esc to transition the UI out of the dialog state.

To assess the effectiveness of the example detection method for dialog related failures, an empirical evaluation was conducted that focused on four research questions (RQs): RQ1 What is the accuracy of the example method in detecting and classifying the type of dialogs in web applications?; RQ2 What is the accuracy of the example method in detecting KDFs?; RQ3 How fast is the example method in detecting KDFs?; and RQ4 What is the impact of the KDFs that the example method detected?

The example method was embodied in a Java-based prototype tool called diaLOg accessibiliTy failUres inSpector (LOTUS). The tool employed Selenium (version 3.141.5) to build the KDFG model using Firefox 92.0. The WebDriver API was used to simulate keyboard-based actions to interact with the running web page. To extract the web dialogs properties from the UI. JavaScript through WebDriver was executed and employed the Intersection Observer API to effectively capture the visible DOM at any point during runtime. The XPERT DOM model was used to help build the UI representation used to construct a Stacking Model in order to determine the browser's painting operations. The evaluation was performed on an AMD Ryzen Threadripper 2990WX with 64 GB memory running 64-bit Ubuntu Linux 18.04.4 LTS.

The evaluation was conducted on a set of real-world subject web pages selected from both the Moz 500 top websites and websites that are similar to the Moz 500 (e.g., sites returned from similarsites.com). The selection of these two sources obtained a diverse set of sites that use different web technologies. Manual interaction was performed with the web pages of random websites selected from these two sources to create the ground truth of dialogs and KDFs. Interaction with these pages was performed until 30 pages that contained a KDF were found and 30 that did not. Out of the 60 subjects, 44 contained at least one dialog and the remaining 16 did not. Subjects were included that did not contain dialogs or KDFs to help measure the false-positive detection rate for RQ1 and RQ2. Overall, the 60 subject web pages contained a total of 88 dialogs and represent 44 non-init-in/non-init-out, 43 non-containment, and 12 non-dismissible KDFs, as well as 35 dialogs with no KDFs. Some dialogs had more than one KDF, which is why the sum of the KDFs is greater than the total number of dialogs.

For building the dialog ground truth, researchers interacted with each element to determine if it could trigger a UI change, and then determined, based on the W3C WAI definitions/examples, if the UI change was a dialog and its type. For building the KDF ground truth, the researchers interacted with all of the dialog triggers to activate the dialogs. For non-initialization-in KDFs, it was observed whether the keyboard focus (1) was immediately set to an element that was inside the dialog or (2) was going to be set to an element that is inside the dialog after navigating forward. For non-inititialization-out KDFs, it was checked whether an open dialog, after being dismissed, returned the keyboard focus (1) immediately back to the trigger element or (2) back to the trigger element after navigating backward. For non-dismissible KDFs, an open dialog could be dismissed via either a dismiss button or the Esc key. If the dialog contained a non-initialization-in KDF, where the focus was not automatically set into the dialog, then the focus was manually set to a random element that was inside the dialog to proceed with testing the dismissal. For non-containment KDFs, the focus was set to a random element inside modal dialogs and navigation continued forward or backward to observe whether the focus looped back into the dialog elements. The above process follows WCAG Techniques as outlined in SC 2.4.3, which specifies the exact behaviors of the failures that a keyboard-based user would experience. Both sets of ground truths were defined independently by the first two researchers and there was no disagreement.

The goal of the first research question, accuracy of detecting and classifying Web dialogs was to assess the effectiveness of the example method in detecting and classifying dialogs. For dialog detection. LOTUS was run on all of the subjects and precision and recall were calculated with respect to the ground truth of dialogs. For dialog classification, the precision and recall of LOTUS was computed in determining if the identified dialogs were modal or modeless.

The results for RQ1 showed that the heuristics of the example method accurately detects and classifies dialogs. Overall, LOTUS correctly identified dialogs across all of the subject web pages with 90% precision and 89% recall. Among those identified dialogs, LOTUS was able to correctly classify modal dialogs with 97% precision and 98% recall and modeless dialogs with 92% precision and 86% recall. In general, the example method was able to identify dialogs in the subject web pages with high accuracy.

The goal of RQ2 and RQ3 is to evaluate the accuracy and runtime of the example method in detecting KDFs. FIG. 25 is a table that shows results for KDF detection accuracy (RQ2) and run time (RQ3). In relation to RQ2 and RQ3, LOTUS was run against all of the subject web apps and precision and recall was computed for each of the four types of KDFs, and also the time required to perform the detection was measured. To provide context for our results, the results from LOTUS were compared against a well-known and popular accessibility auditing tool, Axe DevTools Pro (Axe), which is a state-of-the-art technique capable of detecting some types of KDFs. To ensure other tools weren't overlooked for comparison purposes, tools listed on W3C's Web Accessibility Evaluation Tools List as well as prior web accessibility literature were examined for additional tools for comparison. Based on this investigation, three tools, WAVE, QualWeb, and SortSite, based on their descriptions indicated they might be able to detect some KDF related issues were examined. The three tools were run on the subject web pages and none of them were able to detect KDFs. Instead, these tools could only display ARIA based warnings to indicate that the page contained dialog accessibility support for screen-readers.

The comparison against Axe (version axe-core 4.4.3) added some additional steps to the evaluation protocol. These were necessary to account for the fact that Axe is not fully automated and requires interventions by the developers to perform KDF detection. Specifically, Axe requires developers to provide it with the trigger node in a page's UI that causes the dialog to appear. Axe then triggers the dialog and interacts with it to determine if it has a KDF. In some cases when Axe is not able to find the dialog after activating the trigger nodes, it prompts the developer to highlight the specific parts of the UI that represent the dialog. To address this, three additional sets of results were added to the evaluation. In the first set, denoted as Axe full manual, interaction with Axe was performed to completely and accurately provide trigger nodes and then manually and accurately identified the dialog if the trigger node based identification failed. In the second set, denoted as Axe trigger only, only the trigger node was provided and then did not provide further dialog identification assistance. For LOTUS results that showed its detection accuracy if it could assume that its dialog detection heuristics were accurate (i.e., 100% precision and recall) were added so detection accuracy could be more directly compared against Axe (i.e., Axe full manual). These results are denoted as LOTUS perfect. Since Axe requires developers to provide the dialog to be tested, it did not have means to evaluate Axe on the 16 subjects with no dialogs. Therefore, the precision and recall are only computed on the 44 subjects that contained dialogs. Also Axe does not detect noninit-out nor non-dismissible KDFs, therefore these results are counted as 0%. All results for RQ2 are shown in the table in FIG. 25. The columns "Non-Init-In", "Non-Init-Out", "Non-Containment", and "Non-Dismissible" show the average precision (P) and recall (R) across the set of all dialogs for each type of KDF for each of the four results.

The results for RQ2 show that the example method had high detection accuracy for all types of KDFs and its accuracy was significantly higher than Axe. The accuracy of LOTUS had an average F-score of 72% across the four types of KDFs for fully automated detection and this rose to 83% if the example method could assume perfect detection of the underlying dialogs. In contrast, for the scenario with fully accurate and complete manual intervention, Axe had an average F-score of 55% and 61% for the two types of KDFs it could detect. For those specific KDF types, the F-score was 79% and 81% for the fully automated scenario, and 92% and 89% if the approach could assume perfect dialog detection.

The results for RQ3, runtime of the analysis per subject, are also shown in the table in FIG. 25. For LOTUS the runtime was broken down into two parts "Model Building", which is roughly the time spent doing the construction of the KDFG and identifying the dialogs the KDFG contains, and "Detection", which is the time to analyze the models and find the KDFs. For Axe, the dialog detection is done by the developers so the time for model building was marked as "n/a." Overall, the LOTUS detection is very fast and compares well with Axe. However, the model building time takes almost 27 minutes. Comparing this directly to Axe could be misleading, since the comparable time in the Axe detection process depends on how long a developer takes to identify each dialog in a subject and provide all of the corresponding trigger nodes. Unless the developer is completely familiar with the subject app, this task requires them to interact with every element in the PUT to locate dialog triggers as well as the dialog frames. For this reason, we conclude that the results of RQ3 show a reasonable runtime for our approach and would not be a barrier to its adoption.

The fourth research question relates to the impact of the detected KDFs to better understand how the observed KDFs impact the ability of keyboard users to interact with web pages. To measure the impact of the KDFs, a common approach in the accessibility research community was employed based on measuring the amount of effort necessary to work around, if possible, the accessibility issue. For non-init-in, non-init-out, and non-containment type KDFs the workaround can be quantified and corresponds to how many times a keyboard-based user would need to press Tab or Shift+Tab to return to the right spot in the page's navigation. For non-dismissible dialog failures, the impact was high since no workaround was possible.

To measure the impact of non-init-in and non-init-out KDFs, the number of additional steps that it took for the keyboard focus to reach the dialog or return to the correct trigger element was measured. Across the subjects, users would need an average of 27 extra keyboard steps (with a min, median, and max of 1, 14, and 82) to find a dialog after triggering it and 32 steps (with a min, median, and max of 1, 25, and 156) before they returned to the part of the page they were in before interacting with a dialog. For example, in the subject TikTok, after activating the "Log in" modal dialog, users had to sequentially Tab over 33 times through the page's interactive content in order to reach the dialog to log in.

To measure the impact of non-containment KDFs, the number of steps for the focus to loop back into the dialog in either direction was measured. Based on the results, it took an average of 54 extra keyboard steps (with a min, median, and max of 2, 55, and 161) to return to the dialog. In one particular example, the subject Vimeo required over 161 Tab actions after the keyboard focus unexpectedly exited a noncontained "Create an account" dialog.

It was not possible for keyboard-based users to circumvent non-dismissible KDFs, which could limit users' ability to access core functionalities. For example, in the subject OfferUp, an auction e-commerce page, after a user downloaded the OfferUp app from a non-dismissible modal dialog, they were not able to return to the main page to list an item for sale.

The invention claimed is:

1. A method for detecting keyboard accessibility failures (KAFs), the method comprising:
reading a document object model of a web page;
generating, via a processor of a computing system, a keyboard navigation flow model from the document object model of the web page based on interactions of a user with the web page, wherein the keyboard navigation flow model includes states representing user interfaces displayed by the web page, nodes representing keyboard inputs in the states, and edges representing transitions that occur in the web page between the nodes;
detecting one or more KAFs based on an analysis of the keyboard navigation flow model; and
producing a report of the detected one or more KAFs on the web page.

2. The method of claim 1, further comprising modifying the document object model of the web page to eliminate the detected one or more KAFs.

3. The method of claim 1, wherein the one or more KAFs include an unintuitive navigation failure.

4. The method of claim 3, wherein the unintuitive navigation failure is a navigation order failure, and wherein the method further comprises:
clustering visual user interface elements of the web page from the keyboard navigation flow model by corresponding similar functions in functional sets; and
determining whether there are more than one incoming edge entering each of the functional sets to indicate the navigation order failure.

5. The method of claim 3, wherein the unintuitive navigation failure is a change of context failure, wherein the method further comprises determining an outgoing edge from a node whose corresponding action is a non-activation action.

6. The method of claim 3, wherein the unintuitive navigation failure is an unapparent keyboard focus failure, wherein the method further comprises:
capturing a screenshot of a focus indicator of a node in a focused state;
capturing a screenshot of the focus indicator in an unfocused state;
comparing a contrast area of the screenshots of the focus indicator to determine the contrast ratio between the focused and unfocused states; and
determining the unapparent keyboard focus failure based on the contrast ratio.

7. The method of claim 6, further comprising determining whether the contrast area satisfies a minimal area.

8. The method of claim 6, further comprising:
determining surrounding colors of the contrast area of the screenshots of the focus indicator to determine the contrast ratio of the surrounding colors between the focused and unfocused states; and
determining the unapparent keyboard focus failure based on the contrast ratio of the surrounding colors.

9. The method of claim 6, further determining whether the focus indicator is not obscured by content.

10. The method of claim 1, wherein the one or more KAFs include a responsive accessibility failure from a reflow version of the web page.

11. The method of claim 10, wherein the keyboard navigation flow model is generated from a full size of the web page, wherein the method further comprises generating a keyboard navigation flow model of a reflow version of the web page.

12. The method of claim 11, further comprising:
executing all possible keyboard operations on the web page from the models;
determining whether a change of state occurs for the keyboard operations; and
comparing functionalities to determine which are available via the keyboard for the full size web page and not available in the reflow web page from the models to determine the responsive accessibility failure.

13. The method of claim 1, wherein the one or more KAFs include a dialog related failure.

14. The method of claim 13, further comprising:
mapping sets of dialogs contained in each interface from the keyboard navigation flow model;
identifying dialog from the sets of dialog; and
identifying elements in an identified interface that change property.

15. The method of claim 13, wherein the dialog related failure is a non-initialization-in dialog, and wherein the method further comprises:
determining a dialog appears in a user interface in the model;
determining whether a focus after the dialog appears is not on a node inside the dialog; and
determining whether the focus is not on the dialog after advancing from the node.

16. The method of claim 13, wherein the dialog related failure is a non-initialization-out dialog, and wherein the method further comprises:
determining if a dialog is dismissed in the user interface in the model;
determining whether a focus does not return to a trigger node of the dialog; and
determining if an element is in focus after the dialog is dismissed.

17. The method of claim 13, wherein the dialog related failure is a non-containment dialog, wherein the method further comprises:
determining whether a modal dialog exists in the model; and
determining whether navigation takes a focus from a node within the modal dialog to a node outside of the modal dialog.

18. The method of claim 13, wherein the dialog related failure is a non-dismissible dialog, wherein the method further comprises:
determining whether there is an existing dialog; and
determining if the existing dialog can be dismissed by determining whether navigation is possible away from the dialog display.

19. A system for detecting and/or localizing a keyboard accessibility failure (KAF) comprising:
a control system comprising one or more processors and at least one non-transitory memory; and
a keyboard;
wherein the control system is configured to execute the machine executable code stored in the non-transitory memory to cause the control system to:
read a document object model of a web page;
generate a keyboard navigation flow model from the document object model of the web page based on interactions of a user with the web page, wherein the keyboard navigation flow model includes states representing user interfaces displayed by the web page, nodes representing keyboard inputs in the states, and edges representing transitions that occur in the web page between the nodes;

detect one or more KAFs based on an analysis of the keyboard navigation flow model; and produce a report of the detected one or more KAFs on the web page.

20. A non-transitory machine readable medium having stored thereon instructions for performing a method comprising machine executable code which when executed by at least one machine, causes the machine to:

read a document object model of a web page;

generate a keyboard navigation flow model from the document object model of the web page based on interactions of a user with the web page, wherein the model includes states representing user interfaces displayed by the web page, nodes representing keyboard inputs in the states, and edges representing transitions that occur in the web page between the nodes;

detect one or more keyboard accessibility failures (KAF)s based on an analysis of the keyboard navigation flow model; and produce a report of the detected one or more KAFs on the web page.

\* \* \* \* \*